US007545278B2

(12) United States Patent
Okamoto et al.

(10) Patent No.: US 7,545,278 B2
(45) Date of Patent: Jun. 9, 2009

(54) ARTICLE POSITION ESTIMATING APPARATUS, METHOD OF ESTIMATING ARTICLE POSITION, ARTICLE SEARCH SYSTEM, AND ARTICLE POSITION ESTIMATING PROGRAM

(75) Inventors: Shusaku Okamoto, Kanagawa (JP); Osamu Yamada, Nara (JP); Tomonobu Naruoka, Kyoto (JP); Toru Tanigawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 69 days.

(21) Appl. No.: 11/796,047

(22) Filed: Apr. 26, 2007

(65) Prior Publication Data

US 2007/0247321 A1  Oct. 25, 2007

Related U.S. Application Data

(63) Continuation of application No. PCT/JP2006/305401, filed on Mar. 17, 2006.

(30) Foreign Application Priority Data

Apr. 1, 2005  (JP)  ............................. 2005-105923

(51) Int. Cl.
G08B 13/14  (2006.01)
(52) U.S. Cl. .............. 340/572.1; 340/572.2; 340/572.4; 340/571; 340/539.1; 340/539.13; 340/825.49; 235/385
(58) Field of Classification Search .............. 340/572.1, 340/573.1, 573.4, 539.1, 539.13, 539.15, 340/540, 568.1, 522, 10.1, 10.5, 825.49; 726/26, 35; 700/216, 221, 224; 705/28; 235/375–385, 492; 707/2, 5, E17.059, E17.061, 707/E17.066, E17.096
See application file for complete search history.

(56) References Cited

U.S. PATENT DOCUMENTS

| 6,084,517 | A  | * | 7/2000 | Rabanne et al. | ........... 340/573.4 |
| 6,154,139 | A  | * | 11/2000 | Heller | ...................... 340/573.4 |
| 6,300,872 | B1 | * | 10/2001 | Mathias et al. | ............... 340/540 |
| 6,344,794 | B1 | * | 2/2002 | Ulrich et al. | ........... 340/539.16 |
| 6,492,905 | B2 | * | 12/2002 | Mathias et al. | ............... 340/540 |
| 6,933,849 | B2 | * | 8/2005 | Sawyer | ..................... 340/572.4 |
| 2002/0041234 | A1 | * | 4/2002 | Kuzma et al. | ............ 340/572.8 |
| 2002/0183979 | A1 | * | 12/2002 | Wildman | .................... 702/188 |

FOREIGN PATENT DOCUMENTS

| JP | 07-146362 | | 6/1995 |
| JP | 2000-357251 | | 12/2000 |
| JP | 2003-233715 | A | 8/2003 |
| JP | 2004-249389 | A | 9/2004 |
| JP | 2005-037365 | A | 2/2005 |

* cited by examiner

*Primary Examiner*—Benjamin C Lee
*Assistant Examiner*—Sisay Yacob
(74) *Attorney, Agent, or Firm*—Harness, Dickey & Pierce, PLC

(57) ABSTRACT

An article present region estimating means references information on location and time of an article detected in an article detecting device and stored in an article management database and information on location and time of a person detected in a person detecting device and stored in a person management database to estimate a location where the article is most likely to be present. An article position candidate weighting means may be perform weighting based on information such as movement of the person, location where the article is normally placed.

11 Claims, 38 Drawing Sheets

Fig.5A

| ARTICLE | DETECTED LOCATION | TIME |
|---|---|---|
| BOOK | : | : |
| | PORCH | 19:29 |
| | LIVING ROOM | 19:30 |
| | LIVING ROOM | 23:01 |
| | STUDY ROOM | 23:02 |

Fig.5B

| ARTICLE | DETECTED LOCATION | TIME |
|---|---|---|
| JUICE | : | : |
| | PORCH | 19:29 |
| | LIVING ROOM | 19:30 |

IMAGED IMAGE

BACKGROUND IMAGE

SUBTRACTION IMAGE

Fig.11A

| PERSON | DETECTED LOCATION | TIME | HISTORY |
|---|---|---|---|
| FATHER | PORCH | 19:29 | MF-Data01 |
| | LIVING ROOM | 19:30 | MF-Data02 |
| | LIVING ROOM | 22:29 | MF-Data03 |
| | BATH ROOM | 22:30 | MF-Data04 |
| | BATH ROOM | 22:59 | MF-Data05 |
| | LIVING ROOM | 23:00 | MF-Data06 |
| | LIVING ROOM | 23:01 | MF-Data07 |
| | STUDY ROOM | 23:02 | MF-Data08 |
| | STUDY ROOM | 23:29 | MF-Data09 |
| | LIVING ROOM | 23:30 | MF-Data10 |
| | LIVING ROOM | 23:50 | MF-Data11 |
| | : | : | : |

Fig.11B

| PERSON | DETECTED LOCATION | TIME | HISTORY |
|---|---|---|---|
| MOTHER | PORCH | 19:29 | MM-Data01 |
| | BEDROOM | 19:30 | MM-Data02 |
| | BEDROOM | 22:29 | MM-Data03 |
| | BATH ROOM | 23:00 | MM-Data04 |
| | BATH ROOM | 23:29 | MM-Data05 |
| | LIVING ROOM | 23:30 | MM-Data06 |
| | LIVING ROOM | 23:50 | MM-Data07 |
| | : | : | : |

Fig.12

| TIME | X | Y | TIME | X | Y | TIME | X | Y |
|---|---|---|---|---|---|---|---|---|
| 1 | 5766 | 2304 | 21 | 2075 | 3042 | 41 | 4426 | 5063 |
| 2 | 5853 | 3050 | 22 | 2460 | 3283 | 42 | 4426 | 5082 |
| 3 | 5776 | 3185 | 23 | 2355 | 4660 | 43 | 4787 | 5064 |
| 4 | 5687 | 3195 | 24 | 2405 | 5132 | 44 | 5110 | 4994 |
| 5 | 5406 | 3259 | 25 | 2565 | 4930 | 45 | 5242 | 4830 |
| 6 | 4984 | 3392 | 26 | 2575 | 4211 | 46 | 5259 | 4829 |
| 7 | 3589 | 3069 | 27 | 2547 | 3877 | 47 | 5315 | 4829 |
| 8 | 2921 | 2764 | 28 | 2605 | 3407 | 48 | 5181 | 4673 |
| 9 | 2715 | 2568 | 29 | 3074 | 3109 | 49 | 5186 | 4054 |
| 10 | 2451 | 684 | 30 | 3653 | 3062 | 50 | 5151 | 3558 |
| 11 | 2350 | 3161 | 31 | 4415 | 3216 | 51 | 5313 | 3397 |
| 12 | 1692 | 2966 | 32 | 4581 | 3424 | 52 | 5730 | 3461 |
| 13 | 1309 | 2943 | 33 | 4685 | 3890 | 53 | 4948 | 3400 |
| 14 | 1242 | 2942 | 34 | 4588 | 4458 | 54 | 3211 | 3486 |
| 15 | 1210 | 2948 | 35 | 4540 | 4759 | 55 | 2983 | 2316 |
| 16 | 1210 | 2934 | 36 | 4532 | 5032 | 56 | 2847 | 1951 |
| 17 | 1195 | 2937 | 37 | 4561 | 5031 | 57 | 2828 | 1928 |
| 18 | 1212 | 2944 | 38 | 4498 | 5026 | : | : | : |
| 19 | 1218 | 2940 | 39 | 4478 | 5026 | | | |
| 20 | 1439 | 2942 | 40 | 4439 | 5062 | | | |

*Fig.16A*

| EQUIPMENT | OPERATION TIME | STATE |
|---|---|---|
| BOOKSHELF | : | : |
| | 19:31 | OPEN |
| | 19:32 | CLOSE |
| | : | : |

Fig.16B

| EQUIPMENT | OPERATION TIME | STATE |
|---|---|---|
| REFRIGERATOR | : | : |
| | 19:32 | OPEN |
| | 19:33 | CLOSE |
| | : | : |

Fig.17

```
         ┌─ START ─┐
              │
S1701  SPECIFY ARTICLE TO PERFORM
       POSITION DETECTION
              │
S1702  ACQUIRE TIME AND LOCATION AT WHEN
       THE ARTICLE IS DETECTED LAST
              │
S1703  ACQUIRE ALL PEOPLE DETECTED AT THE
       LOCATION WITHIN A PREDETERMINED TIME
       FROM THE TIME, AS CANDIDATE OF HANDLER
              │
S1704  ACQUIRE HISTORY DATA FOR
       ALL CANDIDATES
              │
          ┌─ END ─┐
```

Fig.18

| ARTICLE | TIME | DETECTED LOCATION | CANDIDATE PERSON OF HANDLER | HISTORY DATA |
|---|---|---|---|---|
| JUICE | 19:30 | LIVING ROOM | FATHER | MF-Data02 |

| AVERAGE MOVEMENT SPEED (m/sec) | CENTER POSITIONAL COORDINATE | LOCATION | WEIGHTING RESULT |
|---|---|---|---|
| 0.1 | (1500, 2950) | BOOKSHELF | 1 |
| 0.11 | (5000, 4900) | REFRIGERATOR | 2 |
| 0.15 | (2800, 1950) | SOFA 1 | 3 |

| NAME | COORDINATE OF UPPER LEFT POSITION | COORDINATE OF LOWER RIGHT POSITION |
|---|---|---|
| REFRIGERATOR | (4100, 6000) | (4950, 5300) |
| BOOKSHELF | (0, 4000) | (900, 1850) |
| ⋮ | ⋮ | ⋮ |

| CENTER POSITION COORDINATE | NAME OF EQUIPMENT | DISTANCE | WEIGHTING RESULT |
|---|---|---|---|
| (x1, y1) | EQUIPMENT 3 | $r_1$ | 1 |
| (x2, y2) | EQUIPMENT 2 | $r_2$ | 2 |
| (x1, y1) | EQUIPMENT 1 | $r_3$ | 3 |

Fig.31

| ARTICLE | TAG ID |
|---------|-----------|
| JUICE | FOOD_0001 |
| BOOK | BOOK_0001 |
|  | : |

| ARTICLE | OWNER | | |
|---|---|---|---|
| | FATHER | MOTHER | DAUGHTER |
| CLASSICAL MUSIC CD | 0% | 100% | 0% |
| BOOK RELATED TO TECHNOLOGY | 100% | 0% | 0% |
| BOOK ON FASHION | 0% | 40% | 60% |
| : | : | : | : |

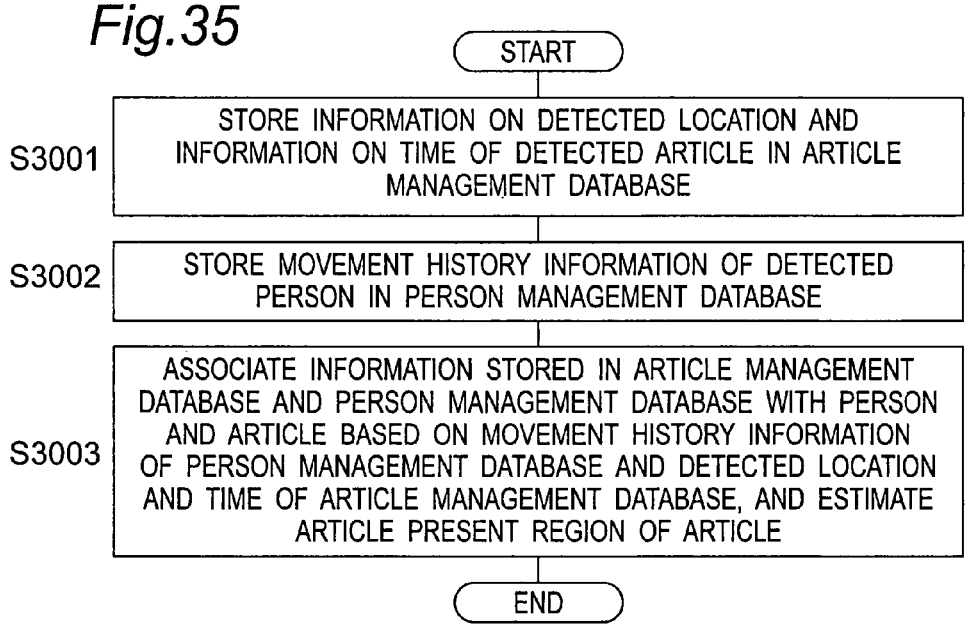
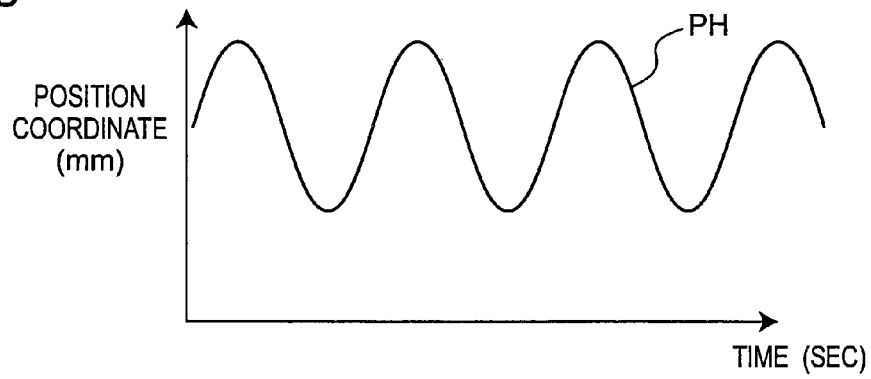
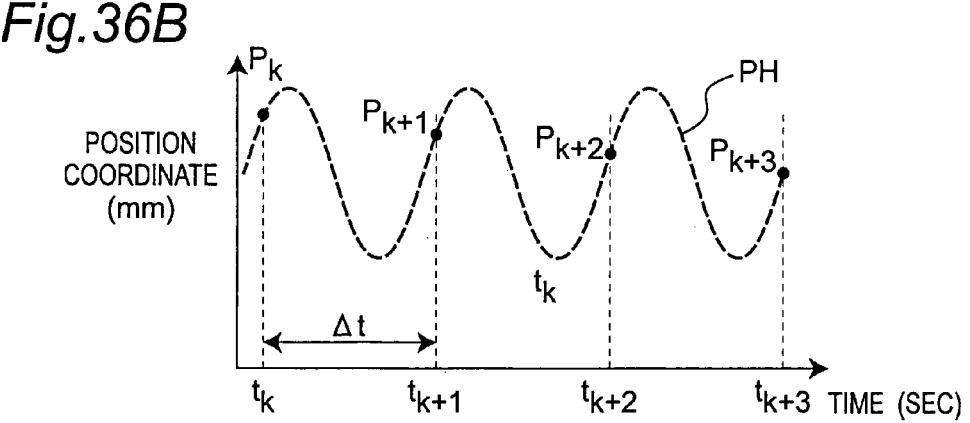

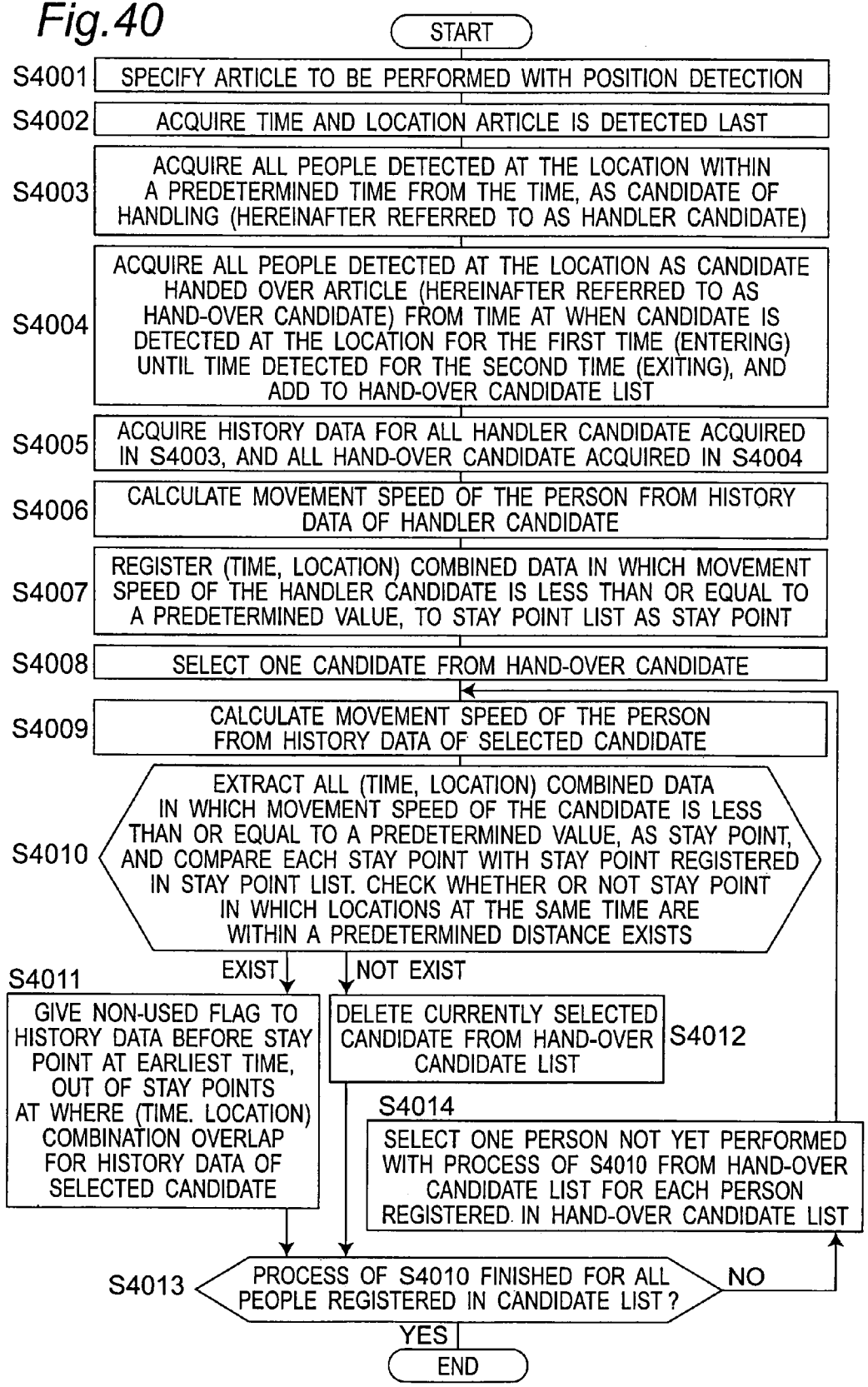

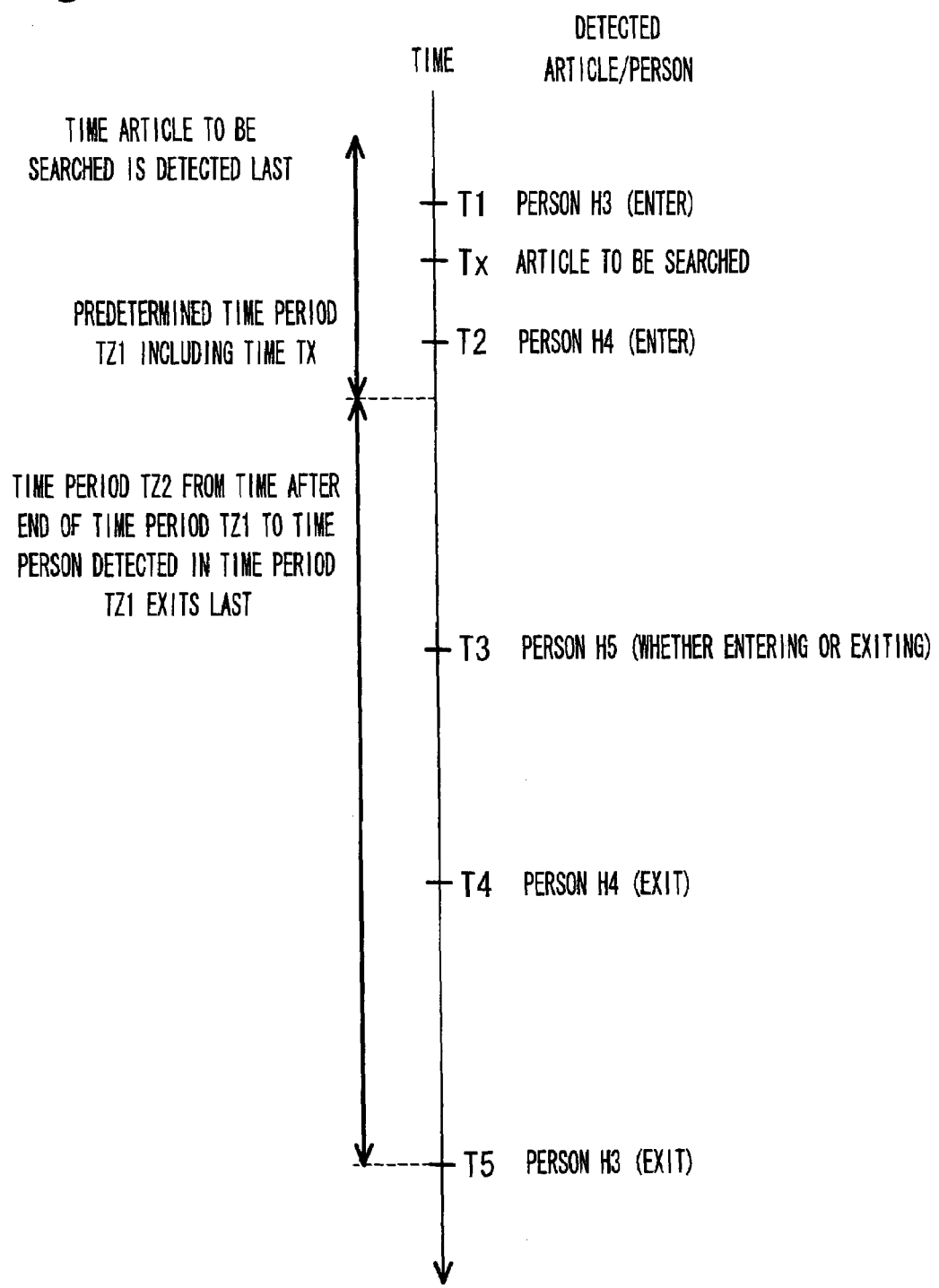

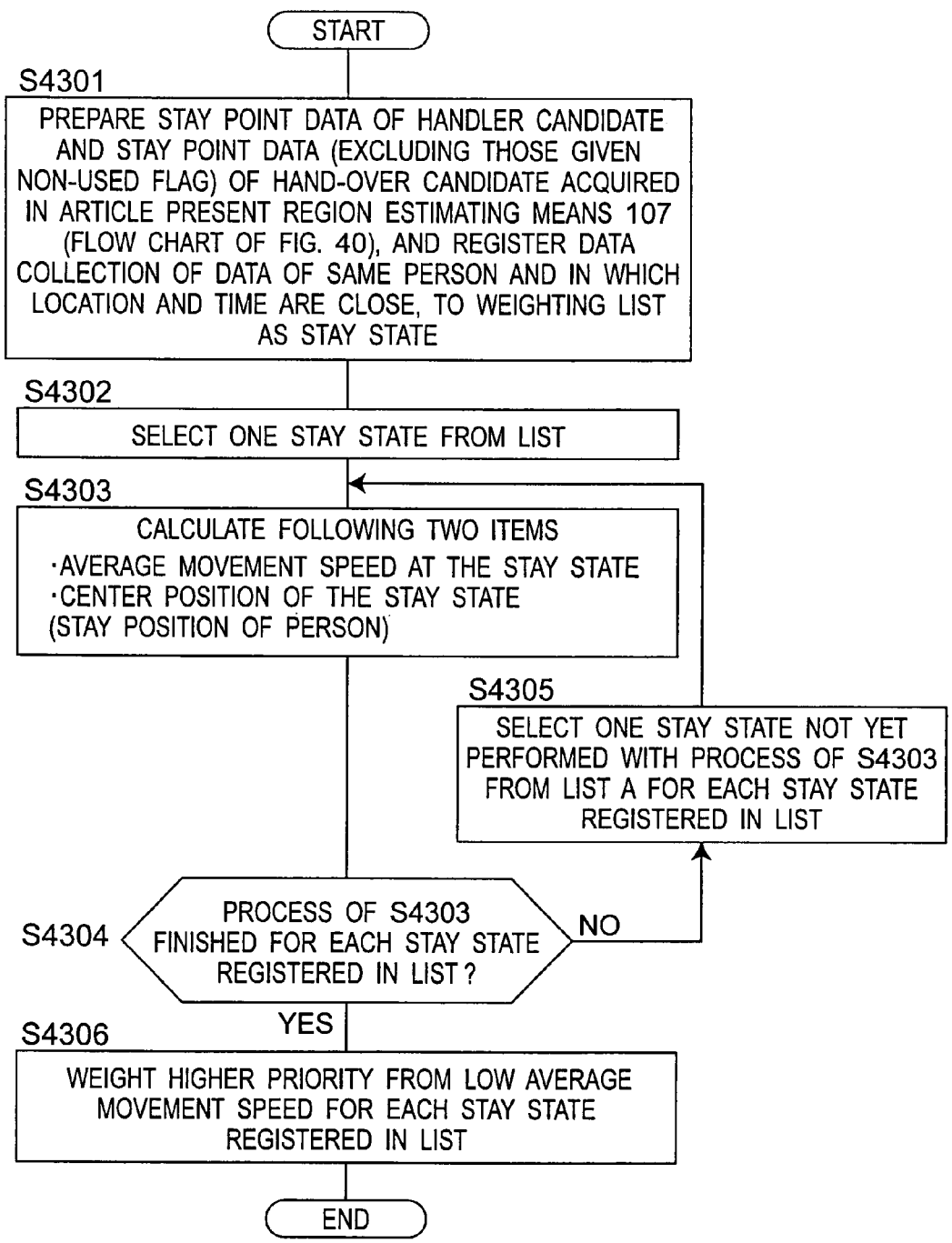

Fig. 45A
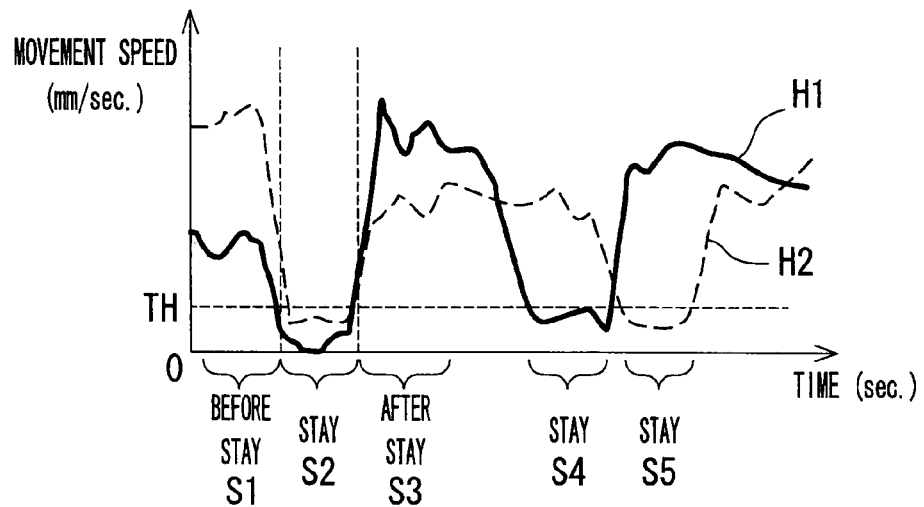
Fig. 45B
|  |  | S1 | S2 | S3 | S4 | S5 |
|---|---|---|---|---|---|---|
| AVERAGE MOVEMENT SPEED (mm/sec.) | PERSON H1 | $V_{H1, S1}$ | $V_{H1, S2}$ | $V_{H1, S3}$ | $V_{H1, S4}$ | $V_{H1, S5}$ |
|  | PERSON H2 | $V_{H2, S1}$ | $V_{H2, S2}$ | $V_{H2, S3}$ | $V_{H2, S4}$ | $V_{H2, S5}$ |
Fig. 45C
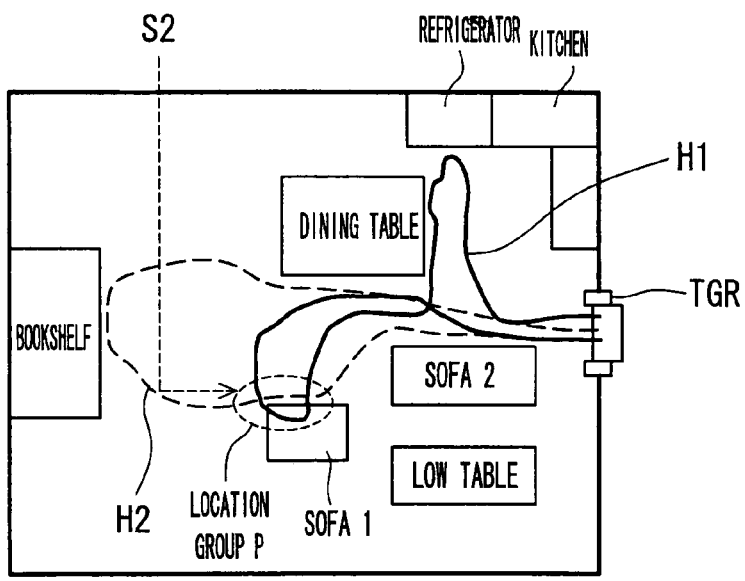

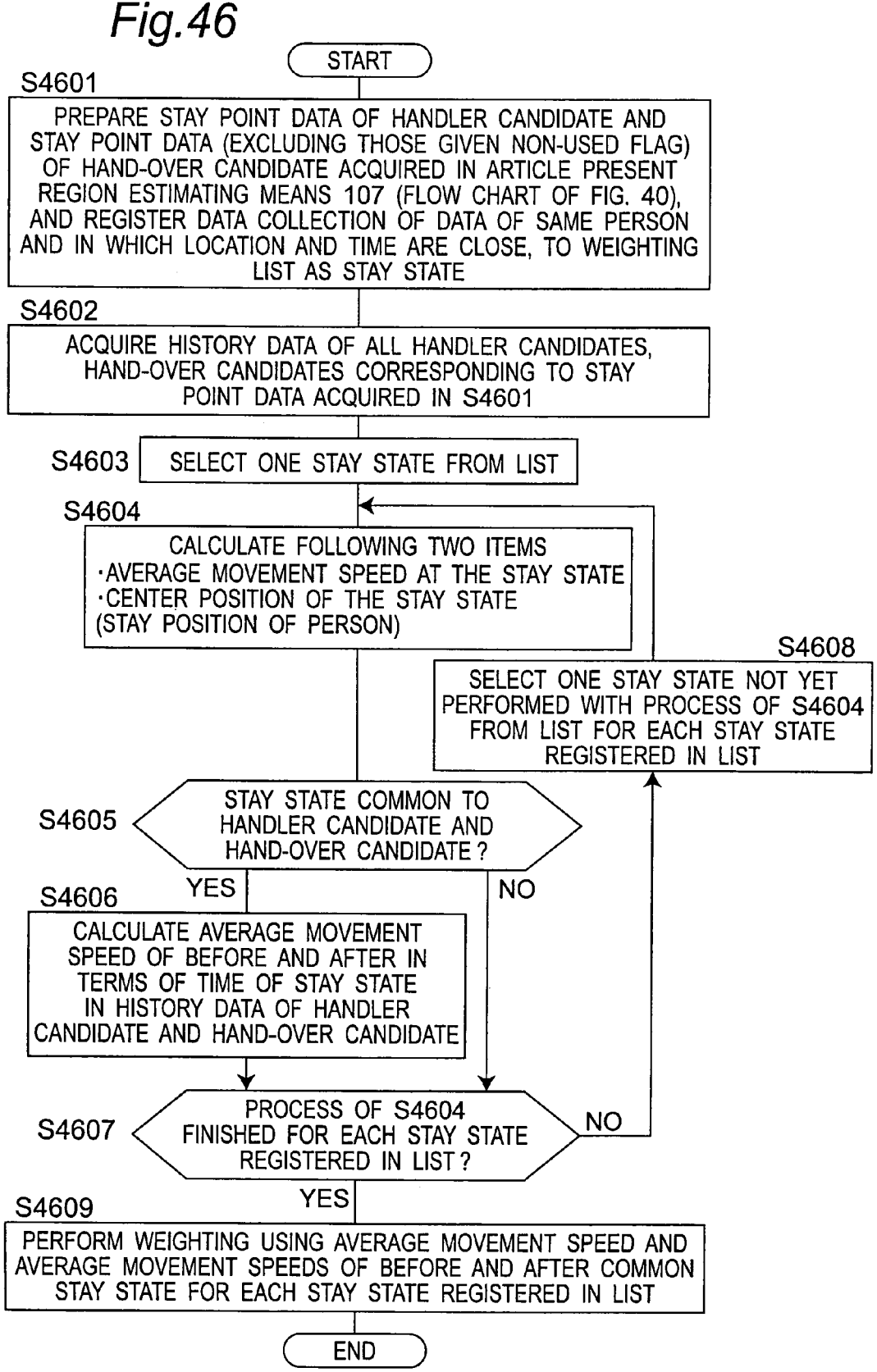

ARTICLE POSITION ESTIMATING APPARATUS, METHOD OF ESTIMATING ARTICLE POSITION, ARTICLE SEARCH SYSTEM, AND ARTICLE POSITION ESTIMATING PROGRAM

This is a continuation application of International Application No. PCT/JP2006/305401, filed Mar. 17, 2006.

BACKGROUND OF THE INVENTION

The present invention relates to an article position estimating apparatus, a method of estimating article position, and an article search system for managing articles in a general house or office, and particularly, relates to an article position estimating apparatus, a method of estimating article position, and an article search system for appropriately showing the position of the article being looked for when inquired for the lost article by the user, when the positions of various articles such as daily necessities used for living in the general house, portable articles used in offices or the like are managed through an RFID tag technique or the like.

Recently, technical development in automation of article management including inventory management is advancing focusing on the business field of physical distribution or the like by the network technique, information processing technique, or the RFID tag technical development for automatically managing the article.

Patent document 1 (Japanese Unexamined Patent Publication No. 07-146362) is a prior art illustrating the general configuration example of the article search system. In this example, the RFID tags (hereinafter referred to as tags) are given to the articles, tag reading devices (hereinafter referred to as a tag reader) are scattered in the environment, and a terminal for performing article search is arranged. When the article looking for is specified from the terminal, each tag reader attempts to establish a communication with the tags given to the articles, and the location of the tag reader that has received a response from the tag of the article looking for is assumed as the location of the article looking for.

The above configuration may be applied in managing books in the library or the like. That is, the tags are given to books to be managed, and the tag reader is arranged on each shelf of the book shelf of the library. When the user inputs the book to search for from the terminal or the like, each tag reader looks for the tag having the ID of the book being searched. When the response is not made from the tag with respect to the inquiry from the tag reader, the book is assumed to be not in a communicating range of the relevant tag reader. When the response is made from the tag with respect to the tag reader, the book being looked for is assumed to be found, where the location of the tag reader that has received the response from the tag is assumed as the approximate location of the book being looked for. The user then moves to the location of the reader and only looks for the books around the relevant reader to obtain the target book.

The conventional system is starting to be used in various fields mainly for business since the location of the article can be managed with a very simple configuration. However, the issue accompanied therewith is that the tag readers must be closely arranged to an extent the tags given to the articles can communicate with one of the tag readers at any place in the environment where the articles are being managed to enhance the precision of the searched position. Therefore, the system may be used in business where a cost can be increased to a certain extent but cannot be used in houses where cost is an essential issue.

Patent document 2 (Japanese Unexamined Patent Publication No. 2000-357251) is a prior art that aims to manage the articles in the house, wherein one method of avoiding the above issue is disclosed. In patent document 2, the article managing device, a plurality of sensor units (tag readers), and tag units given to the articles are arranged, and the specification or estimation of the position of the articles becomes possible and current positions of a plurality of articles are found by managing the reception sensitivity at the article managing device of when receiving the tag information transmitted from the tag units through the plurality of sensor units. In this technique, active tags with built-in batteries are used since the electric waves of the tags must reach the plurality of sensor units that are relatively distant from each other. A method of transmitting at a timing (once a day to once a month) defined in advance is adopted to suppress consumption of battery.

Similarly, in Patent document 3 (Japanese Unexamined Patent Publication No. 2003-233715) that is a prior art that aims to manage the articles in the house, observing instruments (tag readers) are arranged at four corners etc. of the ceiling to collect and manage the living information such as behaviour history of a person in the room, positional information on the objects to be managed and the like. The data tags are attached to the objects to be managed, and the person carries a personal tag on his finger tips. The data tags and the personal tag hold the identifying information on the objects to be managed or the person, so that wireless information communication with the observing instruments becomes possible at a plurality of communication distances.

Patent document 1: Japanese Unexamined Patent Publication No. 07-146362

Patent document 2: Japanese Unexamined Patent Publication No. 2000-357251

Patent document 3: Japanese Unexamined Patent Publication No. 2003-233715

In patent document 2, the position of the article is determined based on the record of the last communication between the tag given to the article and the tag reader since the tag only transmits at the timing defined in advance. Therefore, after the tag communicates with the tag reader, to where the article with the tag is carried to is not known until the relevant tag establishes the next communication with the tag reader. Further, as more time elapses from the last communication with the tag reader, the possibility that the article with the tag is near the tag reader that was communicating last lowers, needless to say. Thus, for the user to find the article by means of such system, the user himself must recall the memory and bring back the memory of where he moved to, where he placed the article and the like from the location of the article provided in response to the inquiry of the search, and thus the article may not necessarily be easily found. This is a large issue in the prior art. In addition, since a plurality of tag readers must be arranged in the room for measuring the article position, it is a disadvantage in terms of cost. Moreover, the size of the tag itself becomes large and becomes difficult to be mounted on a small article, and the cost of the tag itself increases since the active tag with built-in battery is used. If a great number of articles with the tag are arranged in the room, it becomes difficult to control the transmission timing of each tag in order to sense all the tags.

In patent document 3, a plurality of tag readers must be arranged in the room and thus is disadvantageous in terms of cost, similar to patent document 2. Further, the size of the tag itself becomes large and the cost increases since the data tag and the personal tag also perform wireless transmission.

Therefore, the present invention aims to provide an article position estimating apparatus, a method of estimating article position, an article search system, and an article position estimating program that does not require the idea of recalling the memory when the user looks for the article based on a simple configuration of the prior art, that is, the configuration in which the tag is given to the article, the minimum number of tag readers are arranged in the environment where the article is managed, and the relevant information is recorded only when the tag passes through the communication range of the tag reader.

SUMMARY OF THE INVENTION

The inventors of the present invention focus on the fact that an important correlation exists between the movement of the person and the article present location since the people living in the house or the people working at the office or the like mainly handle the articles in the house or in the office. Therefore, if the information on the movement of the person can be acquired by some means, the article present location can be narrowed down using the relevant information.

The present invention relates to a technique that embodies the above idea in an aim to solve the conventional issues.

According to a first aspect of the present invention, there is provided an article position estimating apparatus comprising:

an article detecting device, arranged in a vicinity of an entrance of a room through which at least persons enter and exit, for identifying and detecting different articles so as to distinguish the different articles;

an article management database for storing identification information, information on detected locations, and information on detected times of the articles detected in the article detecting device, as article management information;

a person detecting device for distinguishing and detecting positions of the persons in the room for each individual;

a person management database for storing person movement history information of the persons detected in the person detecting device; and an article present region estimating means for specifying the person detected within a predetermined time including the detected time of the article using the information on the detected times of the articles stored in the article management database and the movement history information of the persons stored in the person management database, and for estimating, when the person and the article are simultaneously detected by the person detecting device and the article detecting device based on the movement history information of the specified person of the person management database, a subsequent movement region of the detected person as an article present region of the article.

According to the present invention, an article search system comprising:

an input device for inputting an article to be searched;

an article position estimating apparatus for estimating the article present regions of the articles in the article present region estimating means and for searching for the article to be searched input by the input device from the articles performed with estimating process; and a display device for displaying the article present region where the article to be searched is present using the estimation result in the article present region estimating means, or the article present region estimating means and the article position candidate weighting means is provided.

According to the article search system of the present invention, the article detecting device detects the articles, and the locations and the times thereof are stored in the article management database. The person detecting device detects a person, and information on the location thereof and the information on the time thereof are stored in the person management database. The article present region estimating means estimates the location where the article is likely to be present out of the path where the person has moved as the article present region with reference to the information stored in the article management database and the information stored in the person management database. The article position candidate weighting means may weight high possibility of present for each location the article may be present by using the history data of the movement of the person, operation information of the equipment, or the like, as necessary. The user of the system references the weighted article present location to give priority to the location to be looked for and the article to be searched is looked for in the order from higher priority.

The user is able to easily and rapidly look for the article being looked for by the article position estimating apparatus and method, as well as the article search system, and the article position estimating program of the present invention. That is, since the article is detected only in the detecting range of the article detecting device in the conventional article search system, if the article is at some other location, a task requiring thinking of looking for the article while recalling the location of the article by looking at the detection result of the article detecting device was forced on the user. However, in the present invention, the article present location is further narrowed, and weighting can be performed indicating the high possibility of the presence of the article at the narrowed location, as necessary. Therefore, the user is not forced with the task of thinking of recalling the behavior of the past as in the prior art, and the target article can be looked for more easily and rapidly. Further, if the article detection for detecting the article is performed in the vicinity of the entrance of the room where at least a person can pass through, and a plurality of article detecting devices do not need to be arranged in one room, and thus the number of article detecting device is suppressed to a minimum, and the entire cost is reduced, thereby preventing interference between the article detecting devices.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5A is a view showing in tabular form an example of article management information contained in the article management database of the article search system;

FIG. 5B is a view showing in tabular form an example of the article management information contained in the article management database;

FIG. 11A is a view showing in tabular form an example of the person management information contained in the person management database in the article search system;

FIG. 11B is a view showing in tabular form an example of the person management information contained in the person management database in the article search system;

FIG. 12 is a view showing, in tabular form, an example of person movement history information in the article search system;

FIG. 16A is a view showing in tabular form an example of equipment management information contained in equipment management database in the article search system;

FIG. 16B is a view showing in tabular form an example of equipment management information contained in equipment management database in the article search system;

FIG. 17 is a flow chart showing the flow of process in an article present region estimating means in the article search system;

FIG. 18 is a view showing in tabular form a processing result in the article present region estimating means in the article search system;

FIG. 31 is an explanatory view of the information accumulated in the article management database where the article name and the ID of the tag given to the article are made into pairs in the article search system of the first embodiment;

FIG. 35 is a flow chart of article position estimating program for realizing a part of the article search system;

FIG. 36A is a graph showing the relationship between the time and the actual position of the person at the time;

FIG. 36B is a graph showing a position $P_K$ of the person recorded at time interval $\Delta t$;

FIG. 40 is a flow chart explaining the process in the article present region estimating means taking the hand over into consideration;

FIG. 41 is a view showing data used in performing the process in the article present region estimating means taking the hand over into consideration;

FIG. 43 is a flow chart showing the process in the article position candidate weighting means that takes the possibility of the hand over into consideration;

FIG. 45A is a graph showing the time change in the movement speed of two people H1, H2;

FIG. 45B is a view showing a table calculating the average movement speed in the time period S1 to S5 based on the graph of FIG. 45A;

FIG. 45C is a view showing the movement trajectory of two people H1, H2 on the floor plan of the room; and FIG. 46 is a flow chart showing the process of reflecting the change in the movement speed of before and after the stay state on weighting.

DETAILED DESCRIPTION OF THE PREFERRED EMBODIMENTS

Figure 1:
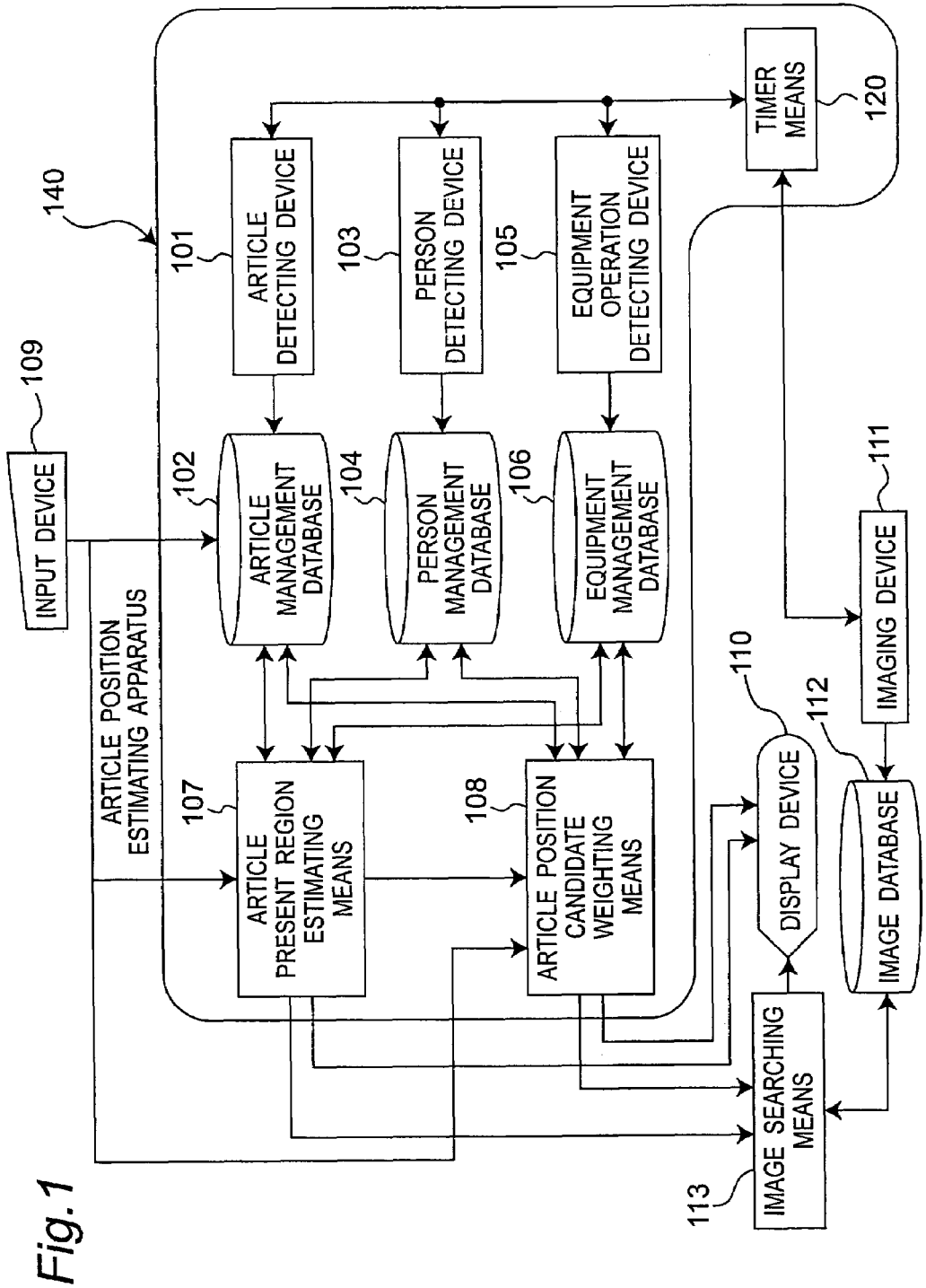
FIG. 1 is a block diagram showing an exemplary configuration example of an article search system according to first and second embodiments of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided an article position estimating apparatus comprising:
an article detecting device, arranged in a vicinity of an entrance of a room through which at least persons enter and exit, for identifying and detecting different articles so as to distinguish the different articles (e.g., different types of article);
an article management database for storing identification information, information on detected locations, and information on detected times of the articles detected in the article detecting device as article management information;
a person detecting device for distinguishing and detecting positions of the persons in the room for each individual;
a person management database for storing person movement history information of the persons detected in the person detecting device; and
an article present region estimating means for specifying the person detected within a predetermined time (the predetermined time refers to a time set in advance for article present region estimation) including the detected time of the article using the information on the detected times of the articles stored in the article management database and the movement history information of the persons stored in the person management database, and when the person and the article are simultaneously detected by the person detecting device and the article detecting device based on the movement history information of the person of the person management database, for estimating a subsequent movement region of the detected person as an article present region of the article.

According to a second aspect of the present invention, there is provided the article position estimating apparatus according to the first aspect, wherein the article present region estimating means estimates the article present region of the article through change in movement speed of the person obtained with reference to the movement history information stored in the person management database.

According to a third aspect of the present invention, there is provided the article position estimating apparatus according to the first aspect, further comprising an article position candidate weighting means for performing weighting so that a weight of the article present region where the article is likely to be present is high based on possibility that the article is present with respect to a plurality of estimated article present regions with reference to the information stored in the article management database or the person management database.

According to a fourth aspect of the present invention, there is provided the article position estimating apparatus according to the third aspect, wherein the article position candidate weighting means extracts information on a detected location and information on a detected time out of the movement history information in which the movement speed is less than or equal to a predetermined value (value set in advance to determine stay state) set in advance in the movement history information of the person, respectively as stay state, and performs weighting so that the weight of the article present region where the article is likely to be present is high for a region in which an average value of the movement speed of the person is low using the average value of the movement speed of the person obtained with reference to each information configuring the stay state.

According to a fifth aspect of the present invention, there is provided the article position estimating apparatus according to the third aspect, wherein the article position candidate weighting means extracts, as stay state, information on a detected location and information on a detected time out of the movement history information in which the movement speed is less than or equal to a predetermined value (value set in advance to determine stay state) set in advance in the movement history information of the person, and performs weighting so that the article present region where the article is likely to be present is high using change in the movement speed of the person obtained with reference to the information on the detected locations and the information on the detected times before and after the stay time.

According to a sixth aspect of the present invention, there is provided the article position estimating apparatus according to the fourth aspect, wherein the article position candidate weighting means performs weighting so that a weight of the article present region where the article is likely to be present is high by also using a time in which the stay state continues when performing weighting of possibility the article is present.

According to a seventh aspect of the present invention, there is provided the article position estimating apparatus according to any one of second to sixth aspects, wherein the article present region estimating means extracts, as stay state, information on a detected location and information on a detected time out of the movement history information in which a movement speed is less than or equal to a predetermined value (value set in advance to determine stay state) set in advance in the movement history information of the person, and estimates the article present region in consideration of a hand-over of the article between a plurality of persons by the relationship between the stay states with respect to the plurality of persons.

According to an eighth aspect of the present invention, there is provided the article position estimating apparatus according to the third aspect, comprising:

an equipment operation detecting device for detecting equipment operations of equipments for accommodating and managing the article; and an equipment management database for storing the operation information of each equipment detected in the equipment operation detecting device; wherein a high weighting is performed on the equipment of an article position candidate so that the weight of the equipment used is high based on presence of the operation of the equipment in the operation information stored in the equipment management database.

According to a ninth aspect of the present invention, there is provided the article position estimating apparatus according to the first aspect, wherein the article present region estimating means estimates, subsequent to when the person and the article are simultaneously detected at the person detecting device and the article management device, a movement region of the detected person as the article present region of the article, and stops the estimation of the article present region of the article after the detected person exits the room.

According to a tenth aspect of the present invention, there is provided an article search system comprising:

an input device for inputting an article to be searched;

the article position estimating apparatus according to any one of first to ninth aspects for estimating the article present region of the article in the article present region estimating means and for searching for the article to be searched input by the input device from articles performed with estimating process; and a display device for displaying the article present region where the article to be searched is present using estimation result in the article present region estimating means or, the article present region estimating means and the article position candidate weighting means.

According to an eleventh aspect of the present invention, there is provided the article search system according to the tenth aspect, comprising:

an imaging device for imaging an environment where article search is performed;

an image database for accumulating image information imaged in the imaging device; and an image searching means for estimating a location and a time at where the article to be searched is assumed to have been placed with the article present region estimating means or, the article present region estimating means and the article position candidate weighting means, and extracting the image information imaging the location and including the time from the image database using estimation result; wherein the display device displays the image information searched in the image searching means.

According to a twelfth aspect of the present invention, there is provided a method of estimating article position, the method comprising of:

identifying and detecting different articles with an article detecting device so as to distinguish the different articles (e.g., different types of article) in a vicinity of an entrance of a room through which at least persons enter and exit;

storing information on detected locations, and information on detected times of the articles detected in the article detecting device in an article management database;

distinguishing and detecting positions of the persons in the room for each individual with a person detecting device;

storing movement history information of the persons detected in the person detecting device in a person management database; and specifying the person detected within a predetermined time (predetermined time refers to time defined in advance for article present region estimation) including the detected time of the article using the information on the detected times of the articles stored in the article management database and the movement history information of the persons stored in the person management database, and when the person and the article are simultaneously detected by the person detecting device and the article detecting device based on the movement history information of the specified person of the person management database, estimating a subsequent movement region of the detected person as the article present region of the article.

According to a thirteenth aspect of the present invention, there is provided the method of estimating article position according to the twelfth aspect, further comprising performing weighting so that the article present region where the article is most likely to be present is high based on possibility that the article is present with respect to a plurality of estimated article present regions estimated in estimating the article present region with reference to the information stored in the article management database or the person management database.

According to a fourteenth aspect of the present invention, there is provided an article position estimating program executed by a computer, the program comprising of:

storing information on detected locations and information on detected times of different articles identified and detected in an article detecting device so as to distinguish the different articles (e.g., different types of article) in a vicinity of an entrance of a room through which at least persons enter and exit in an article management database;

storing movement history information of the persons detected in the person detecting device distinguishing positions of the persons in the room for each individual in a person management database; and specifying the person detected within a predetermined time (predetermined time refers to time defined in advance for article present region estimation) including the detected time of the article using the information on the detected times of the articles stored in the article management database and the movement history information of the persons stored in the person management database, and when the person and the article are simultaneously detected by the person detecting device and the article detecting device based on the movement history information of the specified person of the person management database, estimating a subsequent movement region of the detected person as the article present region of the article.

According to a fifteenth aspect of the present invention, there is provided an article position estimating apparatus, comprising:

an article detecting device, arranged in a vicinity of an entrance of a room through which at least persons enter and exit, for identifying and detecting different articles so as to distinguish the different articles (e.g., different types of article);

a person detecting device for distinguishing and detecting positions of the persons for each individual in the room; and an article present region estimating means for specifying the person detected within a predetermined time (predetermined time refers to time defined in advance for article present region estimation) including the detected time of the article using the information on the detected times of the articles stored in the article management database and movement history information of the persons stored in the person management database, and when the person and the article are simultaneously detected by the person detecting device and the article detecting device based on the movement history information of the specified person of the person management database, for estimating a subsequent movement region of the detected person as an article present region of the article.

The embodiments of the present invention will now be described in detail based on the figures.

First, the entire configuration and each component of the article search system according to the present invention will be explained.

FIG. 1 is a block diagram showing an exemplary configuration of the article search system according to a first embodiment of the present invention, where all the means and devices described in various aspects of the present invention are illustrated in FIG. 1. The article search system according to the first embodiment of the present invention is configured basically by three sections, that is, an input device 109 for inputting an article to be searched;

an article position estimating apparatus 140 for performing the process of estimating the position of the article and for searching for the article to be searched input by the input device 109 from the articles performed with estimating process; and a display device 110 for displaying the location where the article to be searched input by the input device 109 is located using an estimating process result by the article position estimating apparatus 140.

In FIG. 1, when the user searches for the article, the information on time can also be searched at the article position estimating apparatus 140 in addition to the information on the article to be searched input from the input device. Specifically, as hereinafter described as a second embodiment of the present invention, a configuration including three components characterizing the eleventh aspect of the present invention is shown in FIG. 1, that is, an imaging device 111, into which the information on time output from a timer means 120 is input, for imaging the environment where the relevant article search is performed;

an image database 112 for accumulating the image information imaged by the imaging device 111 along with the information on time; and an image searching means 113 for estimating the location and time at where it is estimated that the article to be searched is placed using the process result in an article present region estimating means or an article position candidate weighting means, to be hereinafter described, based on the image information accumulated in the image database 112, imaging the location, and extracting the image information including the time from the accumulated image information in the image database 112.

Each component of the article position estimating apparatus according to the first embodiment of the present invention and a process of article position estimation using the device will now be explained.

The section 140 surrounded by a solid line in FIG. 1 is a block diagram corresponding to the article position estimating apparatus 140 according to the first embodiment of the present invention, which article position estimating apparatus 140 has a configuration including all the means or devices and various databases described in first to fifteenth aspects of the present invention, or includes, a timer means 120 for outputting the information on current time;

an article detecting device 101, into which the times output from the timer means 120, for identifying and detecting articles so as to distinguish the different articles;

an article management database 102 for storing identification information (ID) of the articles detected in the article detecting device 101, information on the detected locations of the articles, and information (detected time information) of the times output from the timer means 120 in detection as article management information for each article detection;

a person detecting device 103, into which the information on times output from the timer means 120, for distinguishing and detecting the positions of persons for each individual;

a person management database 104 for storing identification information (ID) of the persons detected in the person detecting device 103, information on the detected locations of the persons, and information (detected time information) of the times output from the timer means 120 in detection as person management information (person movement history information) for every unit of time;

an equipment operation detecting device 105, input with the information on times output from the timer means 120, for detecting equipment operations;

an equipment management database 106 for storing identification information (ID) of each equipment detected in the equipment operation detecting device 105, information (operation information) of the operating state of the equipment, and information (operation time information) of the times output from the timer means 120 in equipment operations as equipment management information for each equipment operation detection;

an article present region estimating means 107 for estimating the article present regions of the articles with reference to the information stored in the article management database 102 and the person management database 104 (equipment management information stored in the equipment management database 106, as necessary), and searching for the article to be searched input by the input device 109 from the articles which article present region has been estimated; and an article position candidate weighting means 108 for weighting the region where the article is most likely to be present out of the plurality of article present regions estimated by the article present region estimating means 107 with reference to the information stored in the article management database 102, the person management database 104 or the equipment management database 106.

Details of each component will now be explained.

<<Article Detecting Device 101>>

The article detecting device 101, into which the information on time (detected time information) output from the timer means 120 is input, identifies and detects articles so as to distinguish the different articles, and outputs the identifying information (ID) of the detected articles, the information on detected locations of the articles, and the information (detected time information) on time output from the timer means 120 in detection to the article management database 102 for each article detection. Various methods can be considered in identifying and detecting the articles so as to distinguish the articles, and a method of using a tag system, which has priority in terms of the identifying ability of the article and the cost and which is the most popular method in recent years in the physical distribution business, will be described in the first embodiment.

Figure 2:
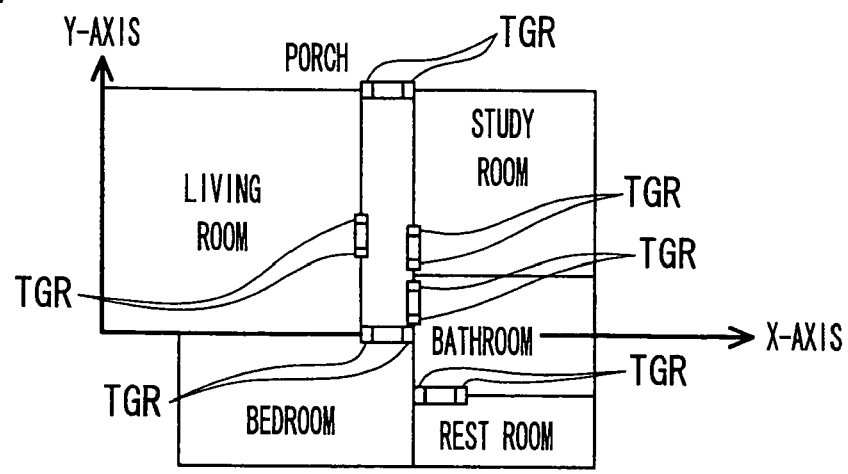
FIG. 2 is a floor plan showing an example of an environment in which a tag reader serving as one example of an article detecting device of the article search system according to the first embodiment of the present invention is arranged at the entrance of each room.
Figure 3:
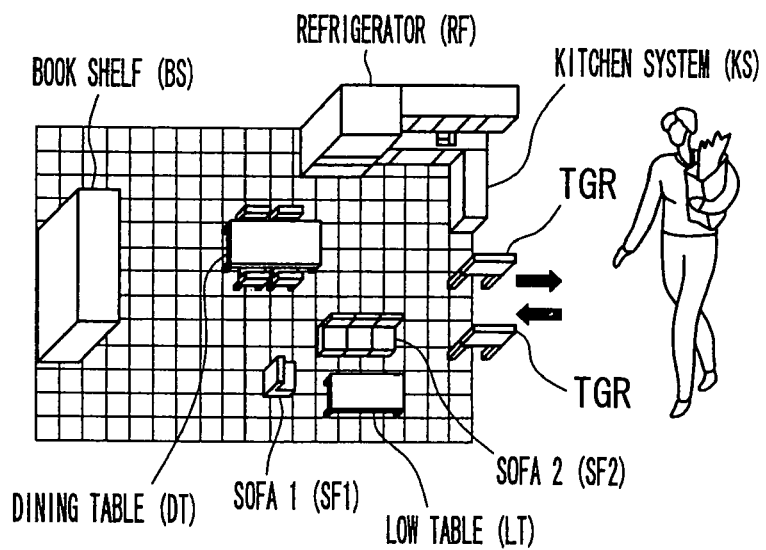
FIG. 3 is an explanatory view showing an example in which a gate type tag reader serving as one example of the article detecting device is arranged at the entrance of the "living room"

FIG. 2 is a floor plan showing an example (example of a room of a house in a general household) of an environment where the article detecting device 101 is arranged. For the convenience of the following explanation, an X-Y coordinate system where the vertical direction is the Y-axis and the transverse direction is the X-axis of FIG. 2 is set as shown in the figure. In FIG. 2, the portion written as TGR is a tag reader serving as one example of the article detecting device 101, and is arranged near each entrance of "porch", "living room", "study room", "bathroom", "powder room", and "bedroom". If the tag reader serving as one example of the article detecting device 101 is arranged near the entrance of a room through which at least the persons enter and exit, the number of article detecting device 101 can be made as few as possible and the entire cost becomes inexpensive, and further, interference between the article detecting devices 101 is prevented. An example in which the gate type tag reader TGR is arranged in the vicinity of the entrance of the "living room" through which the person enters and exits is shown in FIG. 3 as a more detailed example of arranging the tag reader TGR. Although the gate type tag reader TGR may function alone, an example in which the gate type tag readers TGR are arranged in pairs facing with respect to each other to prevent reading mistakes of the tag TG as much as possible is shown in FIG. 3.

Figure 4A:
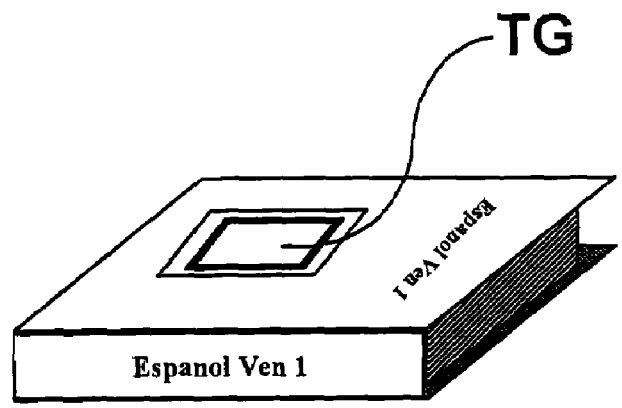
FIG. 4A is a schematic view showing an example in which a tag is given to a book serving as one example of the article.
Figure 4B:
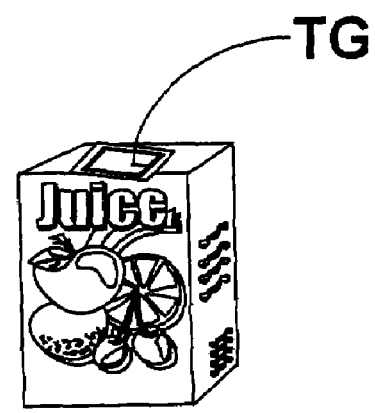
FIG. 4B is a schematic view showing an example in which a tag is given to juice serving as another example of the article.

In order to detect the article using the tag system, a tag TG must be given to the articles handled in the environment (e.g., passive tag that is only detected in a relatively close distance (e.g., in the vicinity of entrance)). FIG. 4A and FIG. 4B are both schematic views showing an example in which the tag TG is given to the article, where FIG. 4A shows an example in which the tag TG is given to a "book", and FIG. 4B shows an example in which the tag TG is given to "juice". When the user moves around the environment holding the article with tag TG and passes through the gate of the gate type tag reader TG, the tag reader TGR automatically reads the tag TG given to the article, whereby the information on the read tag TG is accumulated in the article management database 102 along with the read time. For the sake of convenience of the following description, a book shelf (BS), a refrigerator (RF), a kitchen system (KS), a dining table (DT), a sofa 1 (SF1), a sofa 2 (SF2), and a low table (LT) are arranged in the "living room" of FIG. 3, as shown in FIG. 3.

With regards to the article with tag, the article name and the ID of the tag are formed into pairs and stored in the article management database 102, as shown in FIG. 31. With reference to the article management database 102, when the ID of the tag TG is read by the tag reader TGR, determination is made on what article corresponds to the relevant ID. Of course, other information may be additionally accumulated in the article management database 102. Other information includes information on category, weight, shape, color and the like of the relevant article.

<<Article Management Database 102>>

The article management database 102 stores the identification information (ID) of the articles detected in the article detecting device 101, the information on the detected locations (detected position in the room) of the articles, and the information (detected time information) on the time output from the timer means 120 in detection as the article management information for each article detection. FIG. 5A and FIG. 5B are views showing, in tabular form, an example of the article management information contained in the article management database 102 according to the first embodiment of the present invention, where the article management database 102 is a collection of the article management information. The term "article" used herein refers to the portable article used in daily life by the user (or portable article normally used in office and the like), and thus furniture, electronics or the like in the house (or desks and shelves in the office etc.) are not articles and are distinguished from "article" by being referred to as "equipment" or "installation".

In FIG. 5A and FIG. 5B, the article management information each corresponding to the "book" of FIG. 4A and the "juice" of FIG. 4B are shown. For instance, with regards to the article management information related to the "book" of FIG. 4A, the fact that the "book" is detected at tag reader TGR of the "porch" at time 19:29;

tag reader TGR of the "living room" at time 19:30;

tag reader TGR of the "living room" at time 23:01;

tag reader TGR of the "study room" at time 23:02 is accumulated. With regards to the article management information related to the "juice" of FIG. 5B, the fact that the "juice" is detected at tag reader TGR of the "porch" at time 19:29;
tag reader TGR of the "living room" at time 19:30 is accumulated. Identification is performed on what article corresponds to the ID of the tag TG with reference to the correspondence information on the correspondence relationship database (see FIG. 31) of the ID of the tag TG and the article obtained when each tag reader TGR detects the tag TG of each article, and the ID of the tag TG and the article are made into pairs each time the tag reader TGR acquires the ID of the article, and the result of the identification is written to the article management database 102 along with the time. The correspondence relationship database of the ID of the tag TG and the article only needs to be provided so as to be referenced by the tag reader TGR, and may be provided separately from the article management database 102, or may be provided in a region or portion different from the region or portion for storing the article management information in the article management database 102. If a new article is brought into the environment from the outside, the correspondence information corresponding to the new article is newly formed in the article management database 102. The new formation may be performed by hand by the user using the input device 109. Although the detailed description is omitted, the newly forming operation may be automated due to advancement in the technology of recent tag system. On the other hand, if the existing article is recognized as being discarded, the article management information corresponding to the article is deleted from the article management database 102. The deletion of the article management information may be performed by hand using the input device 109, or a tag reader TGR may be arranged on a garbage can, and the article management information corresponding to the tag TG may be deleted from the article management database 102 by the tag reader TGR when the tag reader TGR detects the tag TG.

<<Person Detecting Device 103>>

The person detecting device 103, into which information on time output from the timer means 120 is input, distinguishes and detects the positions of the persons so as to distinguish the persons, and as a result outputs the identification information (ID) of the detected persons, the information on the detected locations of the persons, and the information (detected time information) on the time output from the timer means 120 in detection to the person management database 103 for every unit time. Generally, detection of the person can be cutting out the person from the image, obtaining the location in a certain environment of the person in the environment, or the like, but in the present example, refers to obtaining the position coordinate of the person in the environment. Thus, although various detecting methods are proposed, three types of methods, or a method using a weighing sensor, a method using a tag TG and a method using an image will be described in the first embodiment.

<Method Using Weighing Sensor>

Figure 6:
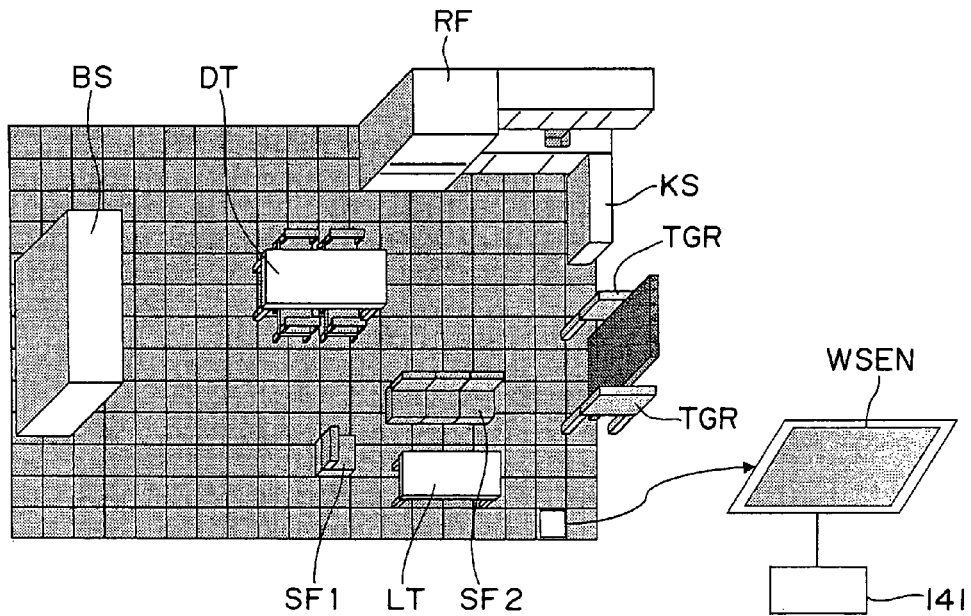
FIG. 6 is a schematic view showing a system configuration for detecting the position of a person using a weighing sensor serving as one example of the person detecting device of the article search system.
Figures 32, 33:
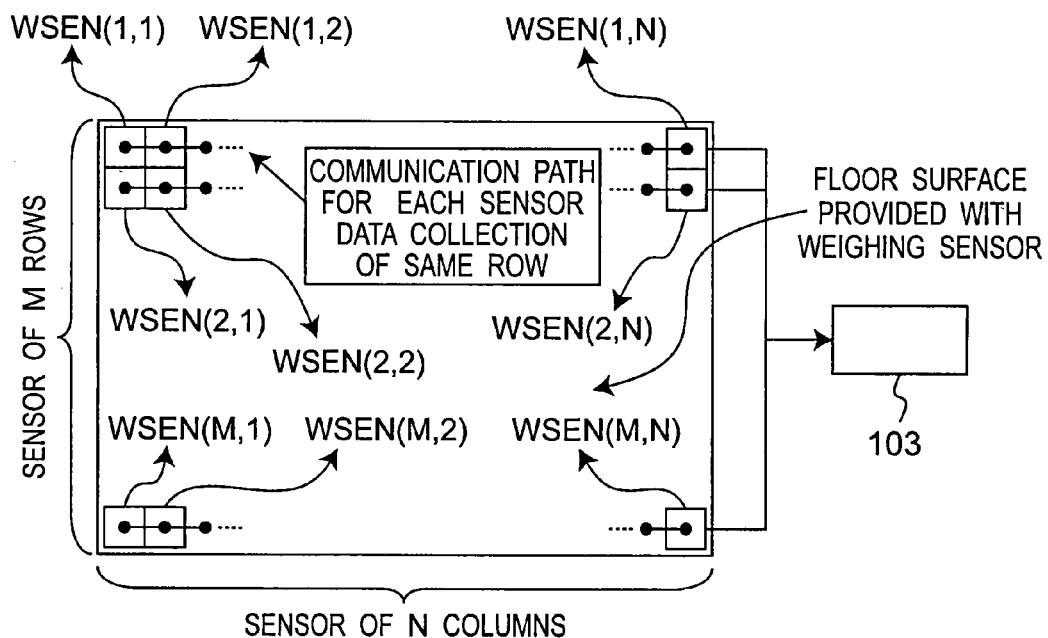
FIG. 32 is a schematic view showing a system configuration for detecting the position of a person using a weighing sensor serving as one example of the person detecting device of the article search system of the first embodiment.
FIG. 33 is an explanatory view of article owner information in the article search system of the second embodiment.

One example of a method of detecting the position of a person using a weighing sensor will now be explained using FIG. 6. FIG. 6 and FIG. 32 are schematic views showing a system configuration for detecting the position of a person using the weighing sensor WSEN. In this system, the person detecting device 103 is configured by the weighing sensor WSEN, and a sensor processing device 141 into which the output information from the weighing sensor WSEN is input and that is connectable to the article management database 102.

The weighing sensors WSEN are lined in a grid and the like in the floor of the environment as shown in FIGS. 6 and 32, when detecting the position of the person using the weighing sensor WSEN. Each weighing sensor WSEN is configured so that, when weighed by foot and the like of a person, it outputs a value thereof and all the weighing sensors are connected to the sensor processing device 141. The sensor processing device 141 is registered with the coordinate of each weighing sensor WSEN in advance so as to constantly sense the data of the weighing sensor WSEN. When detecting that a certain weighing sensor WSEN has been weighed, the coordinate at which the weighing sensor WSEN is arranged is immediately obtained by the sensor processing device 141.

In order to find out the position of the person in the simplest manner using such system, the coordinate value of the weighing sensor WSEN that has been weighed is assumed as the position of the person. However, distinction cannot be made if a plurality of persons are present in the environment. In order to counter such issue, a process of grouping the sensing data in which the weighing of the weighing sensor WSEN is substantially the same, and lining them in order of time is added to the sensor processing device 141. The precision of person detection is thereby enhanced.

<Method Using Tag TG>

Figure 7:
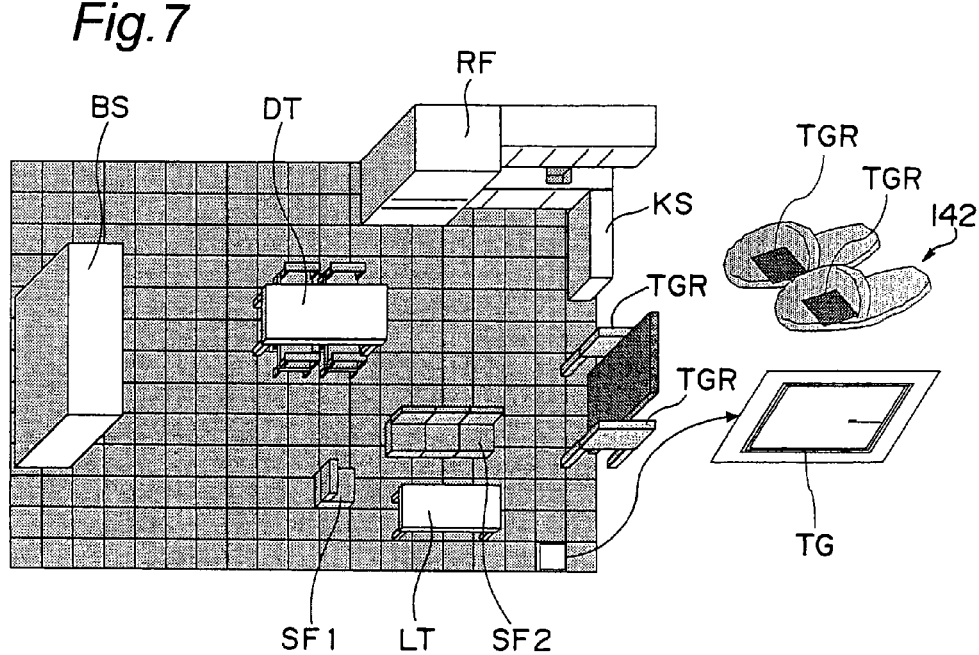
FIG. 7 is a schematic view showing a system configuration for detecting the position of a person using a tag, serving as another example of the person detecting device of the article search system.

One example of a method of detecting the position of a person using the tags TG will now be explained using FIG. 7. FIG. 7 is a schematic view showing a system configuration for detecting the position of a person using the tags TG. Detection of the position of a person using the tags TG is effective when the assumption that a person moves around the environment wearing foot wears (e.g., slippers) 142 with tag reader TGR is allowed. In this system, the person detecting device 103 is configured by tags TG, and a tag reader TGR that detects the tags TG and that is connectable to the article management database 102 by radio and the like.

In this method, the tags TG are lined in a grid and the like in the floor of the environment, as shown in FIG. 7. The tag reader TGR for reading the ID information on the tags TG lined in the floor is attached to the foot wear 142. The correspondence information (not shown) corresponding the ID information and the positional information (e.g., position coordinate information) of the location where the tag TG having the ID information is placed is stored in the tag reader TGR.

Based on such configuration, when the person walks in the environment, the tag reader TGR attached to the foot wear 142 communicates with the tags TG under at the moment the foot is placed on the floor and reads the ID information on the tags TG, and checks the value of the ID information against the correspondence information to specify the position of the person. Of course, this is merely an example, and the tag reader TGR may be attached to other places other than the foot wear 142, and the tag TG may be attached to other places other than the foot of the person. For instance, if the tag TG with ID of an individual is embedded in a wrist watch worn around the wrist, the person may be detected with the tag reader TGR for the article detecting device 101 described above. In order to respond to the detection of a plurality of people, the ID of each person simply needs to be distinguished. On the contrary to the present example, the person may also be detected with a configuration in which the tag readers TGR are lined in the floor, and the tag TG is attached to the slipper 142.

<Method Using Camera Image>

The position of a person may also be detected using the camera image. The general procedure is to cut out a person from the image (step 1), and to convert the position coordinate of the cut out person in the camera image to a world coordinate system (step 2).

First, in step 1, various methods have been developed for cutting the person out from the image, but the simplest method or a background subtraction method will be explained herein.

The background subtraction method is a method of preparing a model image serving as a background in advance, and obtaining the object to be processed from the image by taking the subtraction between the current input image and the model image.

Figure 8:
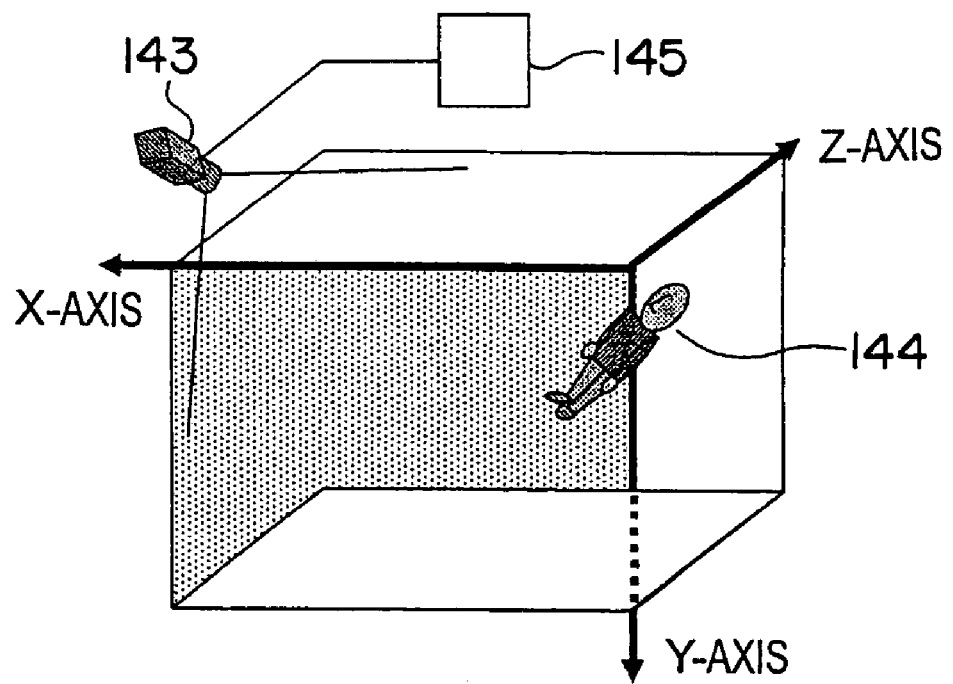
FIG. 8 is an auxiliary view for specifically explaining a background subtraction method as another further example of the person detecting device of the article search system.
Figure 9A:
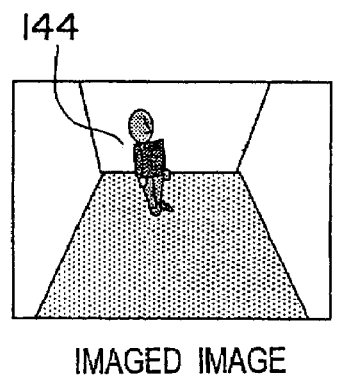
FIG. 9A is a view showing an input image at a certain time imaged using the same camera used in imaging the background image to specifically explaining the background subtraction method.
Figure 9B:
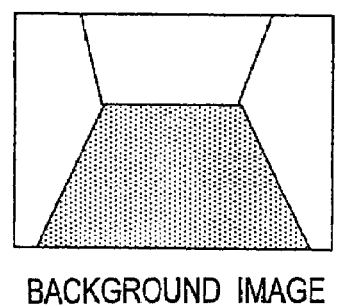
FIG. 9B is a view showing an example of the background image for specifically explaining the background subtraction method.
Figure 9C:
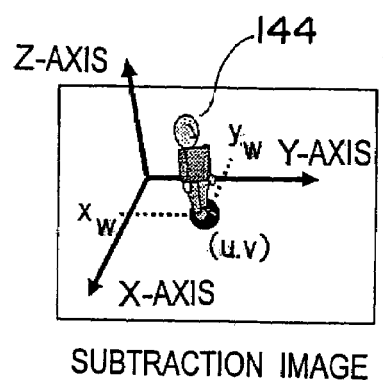
FIG. 9C is a view showing the coordinate system of the environment added to the background subtraction image obtained by subtracting the background image of FIG. 9B from the input image of FIG. 9A for specifically explaining the background subtraction method.

First, in regards to the creation of the background image, one image in which not a single person is present in the environment may be used if there is no environmental change, and an image obtained by averaging the images continuously imaged at a certain time may be used if the environmental change is large. FIG. 8 arid FIG. 9A to FIG. 9C are auxiliary views for specifically explaining the background subtraction method. FIG. 8 is a schematic view in which a camera 143 is arranged in the environment and the world coordinate system is set to the environment, FIG. 9B is a view showing an example of the background image, FIG. 9A is a view showing an input image (imaged image) at a certain point imaged using the camera 142 same as that used for imaging FIG. 9B, and FIG. 9C is a view in which the coordinate system of the relevant environment is added to the background subtraction image obtained by subtracting the background image of FIG. 9B from the input image of FIG. 9A. As apparent from FIG. 9C, since the person 144 is included in the input image of FIG. 9A and the person 144 is not included in the background image of FIG. 9B, the person 144 stands out from the background subtraction image of FIG. 9C or the difference between the two images. The person 144 in the environment can be detected by taking out only the standing out portion.

With regards to the person 144 detected in this manner, the coordinate of the foot of the person 144 in the image can be obtained through image processing. However, since the coordinate in the world coordinate system of the person 144 is desired to be ultimately obtained by the person detecting device 103, the method thereof will be explained using FIG. 10.

Figure 10:
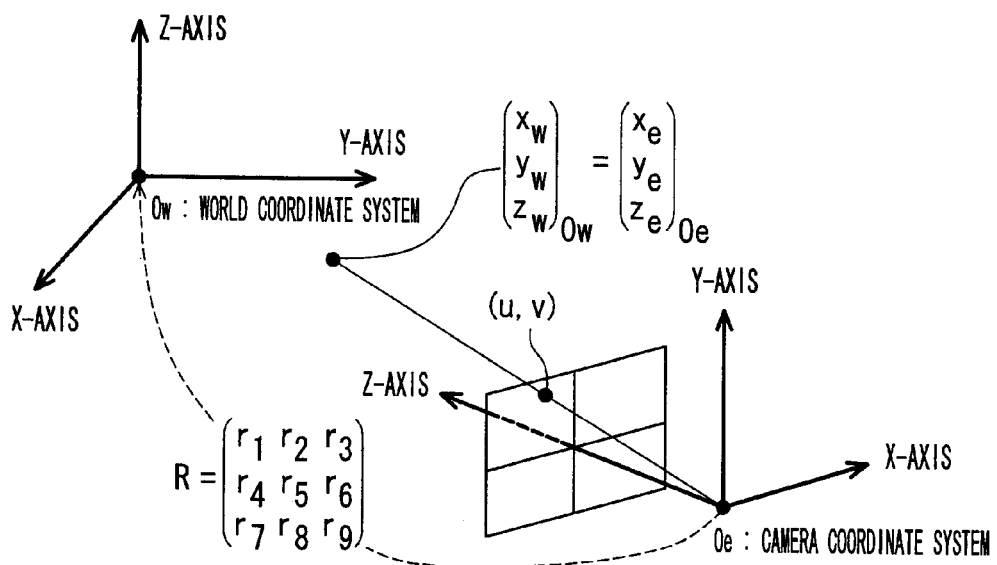
FIG. 10 is an explanatory view explaining the calculation of converting the position coordinate of the cut out person in the camera image to the world coordinate system.

FIG. 10 is a view for explaining the calculation of converting the position coordinate of the cut out person 144 in the camera image to the world coordinate system. In FIG. 10, the coordinate system including the X axis, the Y axis, and the Z axis with $O_w$ as the origin is the world coordinate system, in which coordinate system, the position coordinate of the person 144 is expressed as $(x_w, y_w, z_w)$. $O_e$ is the camera coordinate system with the center of the lens of the camera 143 as the origin, in which coordinate system, the position coordinate of the person 144 is expressed as $(x_e, y_e, z_e)$. Further, (u, v) is the coordinate detecting the foot position of the person 144 in the camera image. Under the above definition, the relationship of equation (1), equation (2), and equation (3) is met for $(x_w, y_w, z_w)$, $(x_e, y_e, z_e)$, (u, v), wherein ($r_1$ to $r_9$) in equation (1) is a rotation matrix about the three axes configuring the camera coordinate system, and $(t_x, t_y, t_z)$ is the parallel movement vector for coinciding the origin of the camera coordinate system to the origin of the world coordinate system and is a part of what is referred to as an external parameter of the camera 143 while f in equation (2) and equation (3) indicates the focal length of the camera 143 and is a part of what is referred to as an internal parameter of the camera 143. The external parameter and the internal parameter can be obtained in advance using a technique of camera calibration or the like.

The simultaneous equation obtained by substituting the coordinate (u, v) of detecting the foot position of the person 144 in the camera image to the equations (1) to (3) is insufficient in obtaining the foot position of the person 144 in real world. This is because only an indefinite solution that it is somewhere on a line connecting $(x_e, y_e, z_e)$ and $O_e$ can be determined with the simultaneous equation. Therefore, the position coordinate $(x_w, y_w, z_w)$ of the person 144 is obtained by adding a restraint condition of $z_w=0$ in the actual world coordinate system. The restraint condition only determines the actual world coordinate system so that the foot position of the person 144 becomes the floor surface (i.e., $z_w=0$).

This is the outline of the method of detecting the person 144 using the camera image. If a plurality of people are detected in the camera 143, the process simply needs to be performed individually. Further, when using the camera image in the person detecting device 103, the image imaged with the imaging device 111, which is another component of the first embodiment of the present invention, may be commonly used. In this system, the person detecting device 103 is configured by the camera 143, and a calculating means 145 that is input with image information from the camera 143, that performs calculation process such as background subtraction process, coordinate conversion process etc., and that is connectable to the article management database 102.

Three types of methods, the method using weighing sensor, the method using tag TG, and the method using image have been explained as an example of a method of detecting the person, but none of the method is guaranteed in terms of wholly detecting the person. Therefore, to perform person detection of higher precision, the methods may be combined for use, or other methods may be used, or the above methods and other methods may be combined. For instance, the method used in the article detecting device 101 and the method used in the person detecting device 103 may be commonly used with respect to each other. It is to be noted that one example of a method suited for each means is merely introduced, and may be combined in accordance with the environment in which the present invention is actually applied or the cost.

<<Person Management Database 104>>

The person management database 104 stores the identification information (ID) of the persons detected in the person detecting device 103, the information on the detected locations of the persons, and the information (detected time information) of the time output from the timer means 120 in detection as the person movement history information (person management information) for every unit time. FIG. 11A and FIG. 11B are views showing in tabular form an example of the person management information (e.g., person movement history information including information such as identifying information, position coordinate, and time thereof of a person) contained in the person management database 104 according to the first embodiment of the present invention, where the person management database 104 is a collection of person management information. In the present example, the person management information (person movement history information) corresponding to the father of FIG. 11A and the mother of FIG. 11B are shown. For instance, the person management information (person movement history information) related to the father of FIG. 11A is, passes the tag reader TGR of the "porch" at time 19:29, and thereafter, the person movement history information until the next detection is stored in history data MF-Data 01;

passes the tag reader TGR of the "living room" at time 19:30, and thereafter, the person movement history information until the next detection is stored in history data MF-Data 02;

passes the tag reader TGR of the "living room" at time 22:29, and thereafter, the person movement history information until the next detection is stored in history data MF-Data 03;

passes the tag reader TGR of the "bathroom" at time 22:30, and thereafter, the person movement history information until the next detection is stored in history data MF-Data 04;

passes the tag reader TGR of the "bathroom" at time 22:59, and thereafter, the person movement history information until the next detection is stored in history data MF-Data 05;

passes the tag reader TGR of the "living room" at time 23:00, and thereafter, the person movement history information until the next detection is stored in history data MF-Data 06;

passes the tag reader TGR of the "living room" at time 23:01, and thereafter, the person movement history information until the next detection is stored in history data MF-Data 07;

passes the tag reader TGR of the "study room" at time 23:02, and thereafter, the person movement history information until the next detection is stored in history data MF-Data 08;

passes the tag reader TGR of the "study room" at time 23:29, and thereafter, the person movement history information until the next detection is stored in history data MF-Data 09;

passes the tag reader TGR of the "living room" at time 23:30, and thereafter, the person movement history information until the next detection is stored in history data MF-Data 10; and passes the tag reader TGR of the "living room" at time 23:50, and thereafter, the person movement history information until the next detection is stored in history data MF-Data 11. This is also the same for the example of the mother of FIG. 11B, and thus the explanation thereof is omitted. The person movement history information may have new person movement history information added to the person management database 104 each time the person passes the tag reader TGR in the subsequent process.

The difference between the person management information (person movement history information) and the article management information is that the detected location and the detected time of the person are detected for every unit time, and such information are contained in the person management information as person movement history information. The person movement history information is obtained by finely detecting the state in which the person is actually moving, and storing the detected information (information such as identifying information, location (position coordinate), and time thereof of a person). The person movement history information will be explained in detail using FIG. 12.

FIG. 12 shows an example of person movement history information in a tabular form. For the sake of convenience of explanation, the example of FIG. 12 shows the history data MF-Data 02 in the "living room" contained in the person movement history information (FIG. 11A) of the father. In the history data MF-Data 02 is described the person movement history information after the father passes the tag reader TGR of the "living room" at time 19:30 until the father passes the tag reader TGR of the "living room" at time 22:29. The person movement history information on the table is configured by three elements of time, X coordinate value, and Y coordinate value, where time is the elapsed time from the start of recordation, and the coordinate values of X, Y show the coordinate values in the coordinate system of the floor plan shown in FIG. 2 in units of mm. In the example of FIG. 12, the table suggests that the father was at the coordinate (5766, 2304) at time 1 after passing the tag reader TGR of the "living room" at time 19:30. The unit of time is omitted as the interval of information recording differs depending on the ability of the system, and thus is appropriately (e.g., 1 second interval etc.) determined according to the ability of the system.

Various information are obtained by performing various processes on the person movement history information. This example is explained using FIG. 13.

Figure 13:
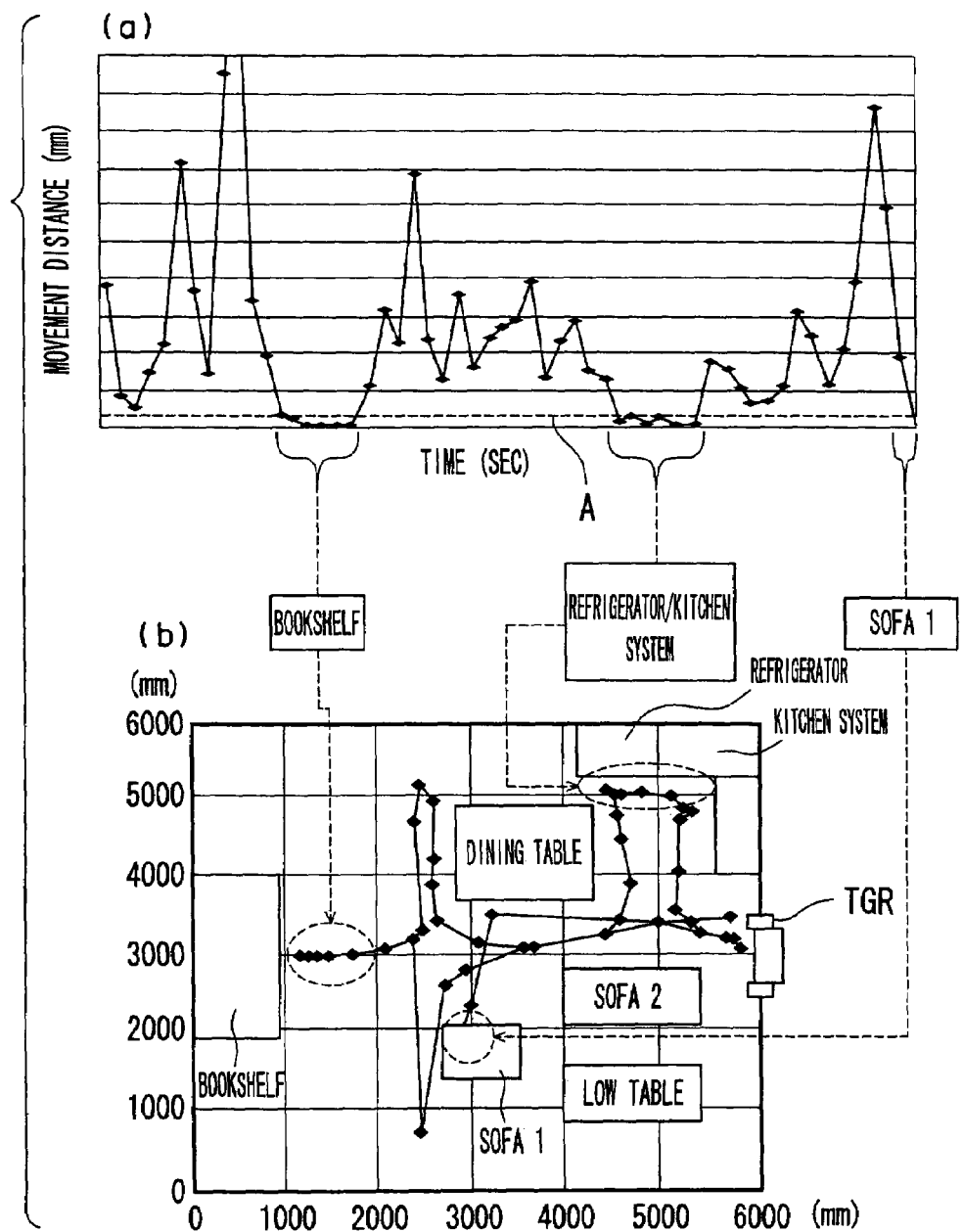
FIG. 13($a$) and FIG. 13($b$) are a graph in which the movement amount (movement distance) at the relevant time is plotted for every time with reference to the person movement history information in the article search system and a view in which the person movement history information is plotted in the floor plan of the "living room" taken out from the floor plan of FIG. 2, respectively.

The graph (a) on the upper side of FIG. 13 is a graph obtained by referencing the person movement history information, and calculating the movement distance between two consecutive times (hereinafter referred to as unit time) and plotting the movement distance on the vertical axis and the time on the transverse axis. Therefore, the graph (a) on the upper side of FIG. 13 shows that those in which the value of the vertical axis is large has large movement amount at unit time, and those in which the value is small has small movement amount at unit time. In other words, when non-small values continue, the person is moving during the relevant time, and when small values continue, the person is stayed during the relevant time (stay (for a short time period) at location (in the house)). For instance, in the example of the graph (a) on the upper side of FIG. 13, a dotted line A is drawn in parallel to the transverse axis slightly above the transverse axis, but if "stay" is defined as a collection of portions where below or equal to the dotted line A continue, three "stay" portions (i.e., "book shelf", "refrigerator and kitchen system", "sofa 1") are found as shown in the example of the graph (a) on the upper side of FIG. 13.

What value to take on the vertical axis of the dotted line A changes the reference of determining "staying" or moving, but the simplest method is a method of fixing a value on the vertical axis of the dotted line A to a constant value. However, the value may be changed according to the person, or may be changed according to what kind of article the person is handling. For instance, if the detecting subject is an elderly or when handling the article to be detected that is heavy or fragile, determination is made most often as "moving" instead of "stay" even if the portion in which the movement distance is small continues. To prevent from determining as "stay" by mistake, the value on the vertical axis of the dotted line A is desirably made much smaller than for other person or article when the detecting subject is an elderly or when handling heavy or fragile articles. The information on the article being handled is obtained from the article detecting device and the article management database. Changing the reference by the detecting subject refers to determining the reference according to the normal movement speed of the detecting subject. That is, it is equivalent to focusing on the difference between the normal movement speed and the movement speed at a certain point. Further, the reference value may be changed according to the position (e.g., unit of room) where the person is present. For instance, considering the entire house as illustrated in FIG. 2, since obstacles are usually not placed in the hallway so as to allow easy movement, the movement speed tends to increase with respect to the same person. Since articles and small furniture that are used daily such as a sofa, a table, and the like are arranged in the living room, the movement speed tends to decrease. The bath room is narrow and slippery, and thus the movement speed tends to be smaller. The average movement speed for each room is calculated from the stored movement history of the person, and the reference value is determined based on the average movement speed. As described above, the method of determining by detecting subject, by article to be detected, and by room may be freely combined to determine the reference value.

When detecting and accumulating the movement history information on the person, if the person moving at a large movement speed compared to the accumulated time interval repeatedly moves (rotate, reciprocate etc.) in the local region, the movement speed (movement speed between the accumulated times) at the measured value becomes small, and may be mistakenly determined as "staying". FIG. 36A shows a graph PH showing the relationship between the time and the actual position of the person at the relevant time. FIG. 36B shows the position coordinate $P_K$ of the person accumulated at time interval $\Delta t$. The movement speed of the person is expressed by the slope of the line in FIG. 36A and FIG. 36B, but the line segment ($P_K$-$P_{K+1}$) is smaller than the actual movement speed. Therefore, the accumulating interval may be determined by the movement speed of the person measured in advance. When intentionally including the fact that the person repeatedly moves in the local region to "stay", the accumulating interval is simply increased.

On the contrary, when not intentionally including the fact that the person repeatedly moves in the local region to "stay", the accumulating interval is simply decreased. For instance, in the daily life, as a specific example of repeatedly moving in the local region, a case of the mother and the daughter placing the food in the refrigerator and the food product storage or placing the groceries on the table and the like from the bag or shopping cart with food products bought in shopping in the vicinity of the kitchen system is assumed. In such case, the mother and the daughter repeatedly moves between the position of the bag or the shopping cart and the position of the refrigerator, food product storage or table, but the accumulating time interval can be made sufficiently small when such case is not intentionally included to "stay".

The plan view (b) on the lower side of FIG. 13 is a diagram with the person movement history information in the graph (a) on the upper side of FIG. 13 plotted on the floor plan with only the "living room" taken out from the floor plan of FIG. 2. Since the information on time is originally contained in the person movement history information, it can be corresponded to the graph (a) on the upper side of FIG. 13. In this example, when the "stay" portion of the graph (a) on the upper side of FIG. 13 is corresponded (refer to dotted line with arrow) to the floor plan or the plan view (b) on the lower side of FIG. 13 in time order from earliest; determination is made that stay is found around the "book shelf", around the "refrigerator and kitchen system", and around the "sofa 1".

Figure 14:
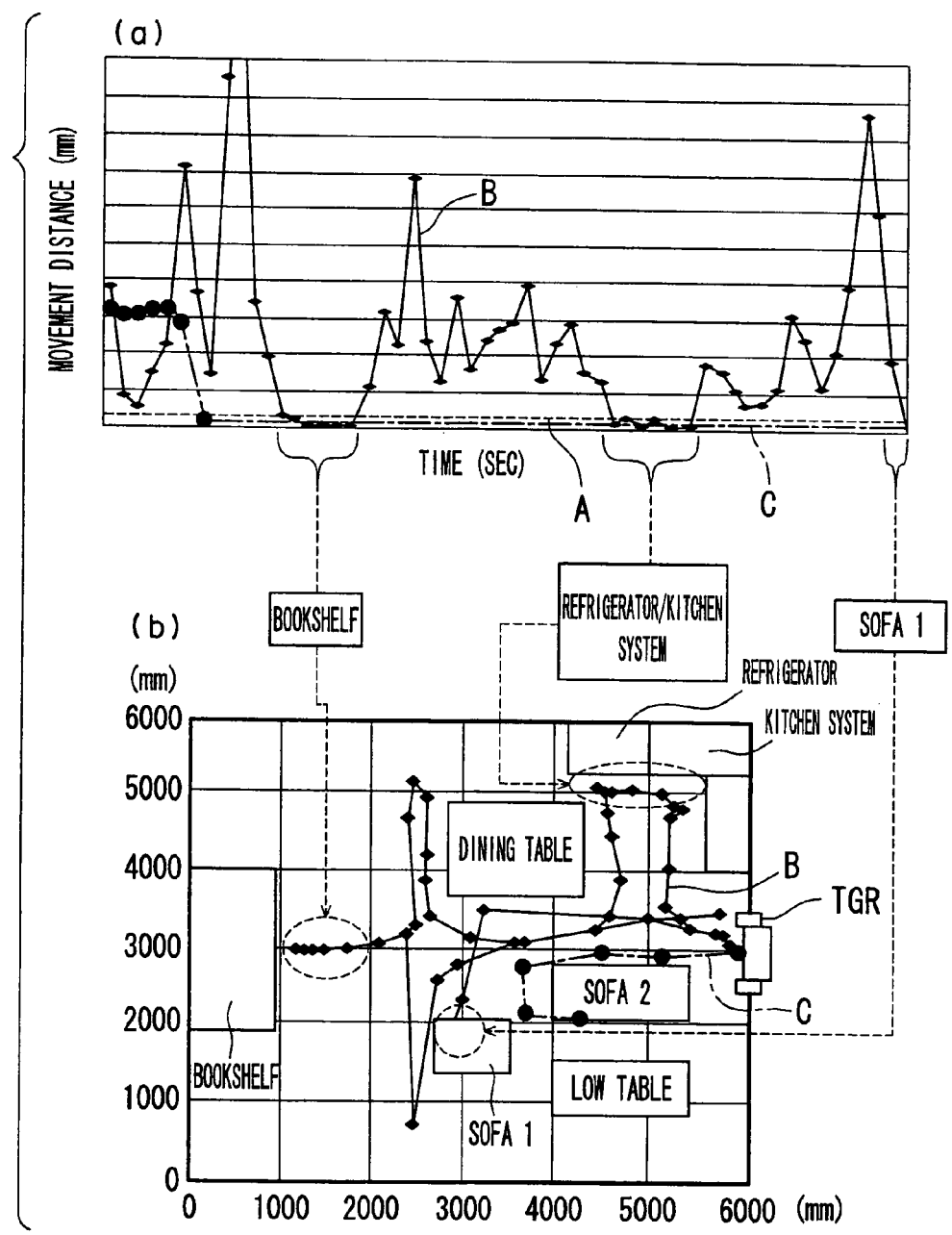
FIG. 14($a$) and FIG. 14($b$) are a graph in which when the data worth of two people are plotted in the article search system, the movement amount (movement distance) at the relevant time is plotted for every time with reference to the person movement history information in the article search system, and a view in which the person movement history information is plotted in the floor plan of the "living room" taken out from the floor plan of FIG. 2.

In FIG. 13, only the example related to the movement history information on one person is shown, but similar processes are obviously performed for two or more people. For instance, the graph (a) on the upper side of FIG. 14 is a view plotted with data worth of two people, where one person is shown with the solid line B same as the data of FIG. 13, and the data of the other person is shown with a chain dashed line C. In the data of the chain dashed line C, movement is found only at the beginning, and thereafter, movement is not found. The movement in the actual space corresponding thereto is shown with the chain dashed line C similar to the plan view (b) on the lower side of FIG. 14. That is, referring to the plan view (b) on the lower side of FIG. 14, it is apparent that the other person shown by the chain dashed line C corresponds to the result of the graph (a) on the upper side of FIG. 14 in that the person is sitting on the "sofa 2" immediately after entering the room.

The aspect of narrowing down the position of the article using the result of analysis of the person movement history information on the movement of the person in such manner is an essential feature of the first embodiment of the present invention, and the specific processes thereof are performed in the article presence region estimating means 107 and the article position candidate weighting means 108, which are components of the first embodiment of the present invention. The details thereof will be hereinafter described.

<<Equipment Operation Detecting Device 105>>

Into the equipment operation detecting device 105 is input the information (operation time information) on the time output from the timer means 120 is input, the equipment operation detecting device 105 detects the equipment operation, and outputs the detected identification information (ID) of each equipment, and the information (operation information) of the operating state of the equipment, and the information (operation time information) of the time output from the timer means 120 in operation to the equipment management database 106 for every equipment operation detection. "Equipment" used herein refers to those having a function of storing the article in a state enclosing the article, and those other than that and is not an article is referred to as "installation". For instance, in the example of FIG. 3, "bookshelf" and "refrigerator" are "equipment" and "kitchen system", "dining table", "sofa 1", "sofa 2", "low table" are "installation". The "kitchen table" can be further finely divided, whereby the storage shelf or the storage of the "kitchen system" is "equipment" and the cooking table thereof is "installation".

Various methods are considered to detect the equipment operation, but a method using a simple contact sensor TSEN is used in the present example.

Figure 15A:
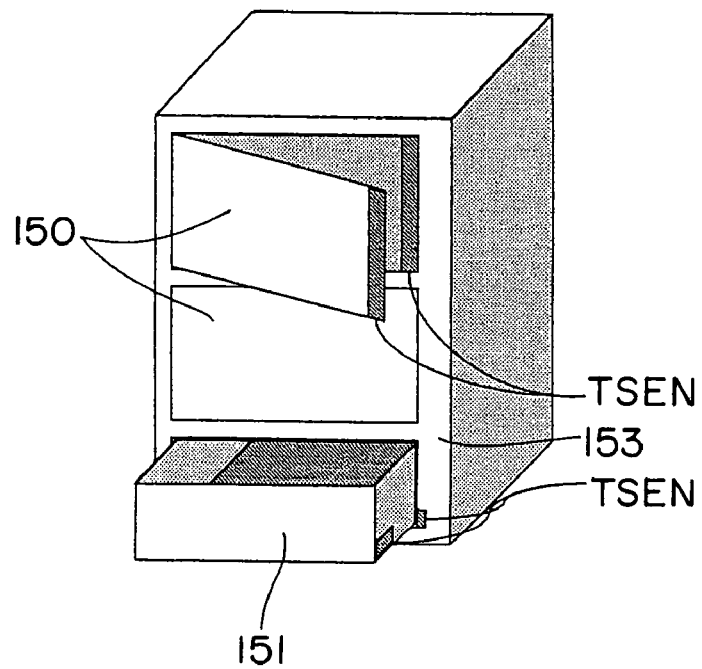
FIG. 15A is a schematic view showing an example of an equipment arranged with an equipment operation detecting device with respect to the equipment having storage function in the article search system.
Figure 15B:
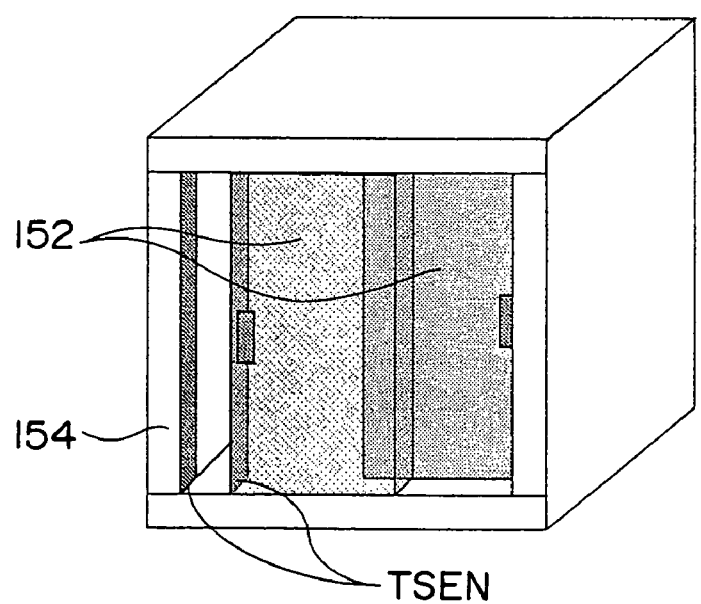
FIG. 15B is a schematic view showing an example of an equipment arranged with an equipment operation detecting device with respect to the equipment having storage function in the article search system.

FIG. 15A and FIG. 15B are both schematic views showing an example of an equipment arranged with an equipment operation detecting device 105 with respect to the equipment having a storage function. In FIG. 15A and FIG. 15B, the portion indicated as TSEN is a sensor serving as one example of the equipment operation detecting device 105, and an example using the contact sensor TSEN is shown herein. Specifically, FIG. 15A shows a state with two types of openable and closable doors 150, 151 arranged at the storage section, and the contact sensors TSEN are respectively arranged at the door 150 and a fixed supporting frame 153. FIG. 15B shows a state with a sliding door 152 arranged at the storage section, and the contact sensors TSEN are respectively arranged at the door 152-side and the fixed frame 154-side. In either FIG. 15A and FIG. 15B, the state of the equipment is recognized such that when the contact sensor TSEN on the door 150, 151, 152-side and the contact sensor TSEN on the fixed frame 153, 154-side are in a contacting state contacting each other, the door 150, 151, 152 of the storage section is closed, whereas when the contact sensor TSEN on the door 150, 151, 152-side and the contact sensor TSEN on the fixed frame 153, 154-side are in a non-contacting state separated from each other, the door 150, 151, 152 of the storage section is opened. The operation of the equipment is assumed to have been performed when the above state changes, and this is accumulated in the equipment management database 106.

An example of the contact sensor TSEN has been illustrated herein, but other sensors, such as an optical non-contacting sensor may obviously be used, and other methods other than the sensor may be used.

<<Equipment Management Database 106>>

The equipment management database 106 stores the identification information (ID) of each equipment detected in the equipment operation detecting device 105, the information (operation information) of the operating state of the equipment, and the information (operation time information) on the time output from the timer means 120 in operation as the equipment management information for every equipment operation detection. FIG. 16A and FIG. 16B are views showing in a tabular form an example of the equipment management information contained in the equipment management database 106 of the article search system according to the first embodiment of the present invention. FIG. 16A and FIG. 16B provide the "bookshelf" and the "refrigerator" by way of example of the equipment, which are independent equipment management information. The information on either opened or closed is described as the information on time the equipment is operated and the information (operation information) of the operation state in the content of the equipment management information. The present example is the simplest example, but when two or more equipment operation detecting devices 105 are arranged in one equipment, as shown in FIG. 15A, the equipment management information may be prepared independently.

<<Article Present Region Estimating Means 107>>

The article present region estimating means 107 references the article management information stored in the article management database 102 and the person management information stored in the person management database 104 (also equipment management information stored in the equipment management database 106, as necessary), and estimates the movement region of the person as the article present region of the article to be searched. The estimation of the article present region is performed focusing on the fact that there is an important correlation between the movement of the person and the article present location, as stated in the section of "DISCLOSURE of THE INVENTION". Embodying such in more detail, the position of the article can be estimated based on the following two rules.

(Rule 1) The article is most likely to be present on the path the person has moved or in the surrounding thereof, and the possibility the article exists becomes lower away from the movement path of the person.

(Rule 2) In the environment where the article is desired to be detected, on the assumption that a plurality of devices for detecting the article are arranged, the reliability is higher the more recent the article management information on the plurality of article detection information detected in the devices (higher possibility of the presence of the article).

The processes of estimating the article present region based on the rules will now be explained. FIG. 17 is a flow chart showing the flow of process in the article present region estimating means 107. The flow of process for estimating the article present region will now be explained according to the flow chart.

In step S1701, the user specifies the article to be detected which position is desired to be detected in the input device 109, and the article to be detected that is specified in the input device 109 is input to the article present region estimating means 107.

After that in step S1702, the article management information on the article management database 102 is referenced by the article present region estimating means 107 based on the specified article to be detected, and the time and location at when the specified article is detected last are acquired. Specifically, the final row (row described with the most recent information in the article management information on tabular form) of the article management information on the article is referenced by the article present region estimating means 107. This is a process performed according to (rule 2).

After that in step S1703, the person management information on the person management data 104 is referenced by the article present region estimating means 107, and all the people detected in the location within a predetermined time including the above time (same time or around the same time as the above time) are acquired by the article present region estimating means 107 as candidates for handling the specified article. The search is performed not only with the person detected at the same time as the above time, but also including the person detected around the above time in order to respond to when there is a time difference in the detecting process itself between the article detecting device 101 and the person detecting device 103, and when there is a time difference in the detecting process between the article detecting device 101 and the person detecting device 103 due to a distance between the article and the person. An example in which a distance is formed between the article and the person includes a case in which the article is held with the arm stretched out since the article is large etc., and a case in which the article is conveyed placed on a conveying instrument such as a cart. The predetermined time (around time width) may vary depending on the identification information (ID) of the article or the identification information (ID) of the person. For instance, if the person is an elderly, or when the article is an article of large weight, of large size etc., the moving speed most likely becomes small, and thus the time width is preferably set large. Therefore, in the present specification and the claims, a case in which the person and the article are detected with the person detecting device and the article detecting device at a predetermined time including the time at which the article is detected the last, that is, at the same time as the time the article is detected last and the times before and after that time can be referred to as a case in which the person and the article are simultaneously detected with the person detecting device and the article detecting device, as necessary.

Next, in step S1704, the article present region estimating means 107 acquires the person movement history information in which the time and the movement of the person are associated with reference to the person management information on the person management database 104 for all the detected candidates.

The movement path (i.e., movement region of person) connecting the position coordinate of the person in time order indicated by the person movement history information obtained in step S1703 becomes the estimated result of the article present region, and is the result following the (rule 1). In step S1701, the input device 109 is used to specify the article which position is to be detected, and the input method in the conventional article search may be used such as inputting the article name by voice or keyboard using a portable terminal, a personal computer, or the like, or displaying the article list and selecting the article therefrom for the input device 109.

Next, the way of performing processes in the article present region estimating means 107 will be specifically explained with regards to a case in which the user is the father and the juice is specified as the article to be detected using the article management database 102 of FIG. 5A and FIG. 5B, and the person management database 104 of FIG. 11A and FIG. 11B.

In step S1701, the father uses the input device 109 to input to the article present region estimating means 107 to specify the juice as the article to be detected which position is to be detected.

After that in step S1702, the information on time "19:30" and the location "living room" at where the specified juice is detected last is acquired by the article present region estimating means 107 with reference to the last row of FIG. 5B or the article management information on the juice of the article management database 102.

After that in step S1703, all the people detected in the "living room" within a predetermined time with time "19:30" as the center by referencing the person management information on FIG. 11A and FIG. 11B of the person management database 103 is acquired by the article present region estimating means 107 as the candidate for handling the specified article. Assuming the predetermined time is three minutes, the people detected in the "living room" from 19:27 to 19:33 are searched by the article present region estimating means 107 from the person management information on FIG. 11A and FIG. 11B of the person management database 104, and consequently, only the "father" detected at the location "living room" at time "19:30" is acquired by the article present region estimating means 107.

After that in step S1704, the history data "MF-Data02" of FIG. 12 corresponding to the detected person management information is acquired by the article present region estimating means 107.

FIG. 18 shows the result of article present region estimation by the article present estimating means 107 obtained as above in a tabular form. Only one history data acquired in the present example is present, but if a plurality of people that has a possibility of moving with the article are present, all the history data corresponding to the plurality of people are acquired.

The above description is the article present region estimating process in the article present region estimating means 107, and is sufficiently usable by simply displaying the result of mapping the history data obtained in this manner on the floor plan of the environment by the article present region estimating means 107 (e.g., image of plan view (b) on the lower side of FIG. 13) on the display device 110. That is, the user looks at the past movement path of himself shown on the screen, and traces the path in order or looks at the equipment or installation near the path to look for the article. Since the location to look for the target article is not the entire room but is narrowed to near the past movement path of himself, the trouble of searching greatly becomes efficient.

On the other hand, by using the information on further detailed analysis result or equipment operation and the like of the history data according to the first embodiment of the present invention, the article being looked for can be narrowed to where the article is most likely to be on the path of the past, that is, the weighting process of the article position candidate becomes possible. The article position candidate weighting means 108 for performing such process will now be explained in detail.

<<Article Position Candidate Weighting Means 108>>

The article position candidate weighting means 108 references the article management information stored in the article management database 102, the person management information stored in the person management database 104, or the equipment management information stored in the equipment management database 106 and performs weighting on the plurality of article present regions estimated in the article present region estimating means 107 so that the weight of the article present region where the article is most likely to be present is higher. In other words, when the position of the article is narrowed to a certain extent by the article present region estimating means 107 explained right before, and the article present region where the article is most likely to be is narrowed therefrom. In the first embodiment of the present invention, the high and low of the article present possibility is referred to as "weighting of the article position candidate". In weighting, various methods are adopted, where two appropriate narrowing methods are further taken into consideration in view of the rule 1, that is, further considering the idea that the movement of the person and the position of the article have correlation. One narrowing method is a method that utilizes the result from a general observation result that the movement speed of the person lowers or becomes zero when the person places or takes the article. The other narrowing method is a method utilizing the operation information (e.g., information on presence of operation) of the equipment since operations of the equipment for storing (or stored) article are often performed when the person places or takes the article, similar to the above. In relation to association between the two methods and the first embodiment of the present invention, the former corresponds to the third aspect of the present invention and the latter corresponds to the eighth aspect of the present invention.

The processing examples of each method will now be explained in order.

The first method is based on the idea that the slower the person moves (in extreme case, when stopping), the article is most likely handled at such point.

Figures 19, 20:
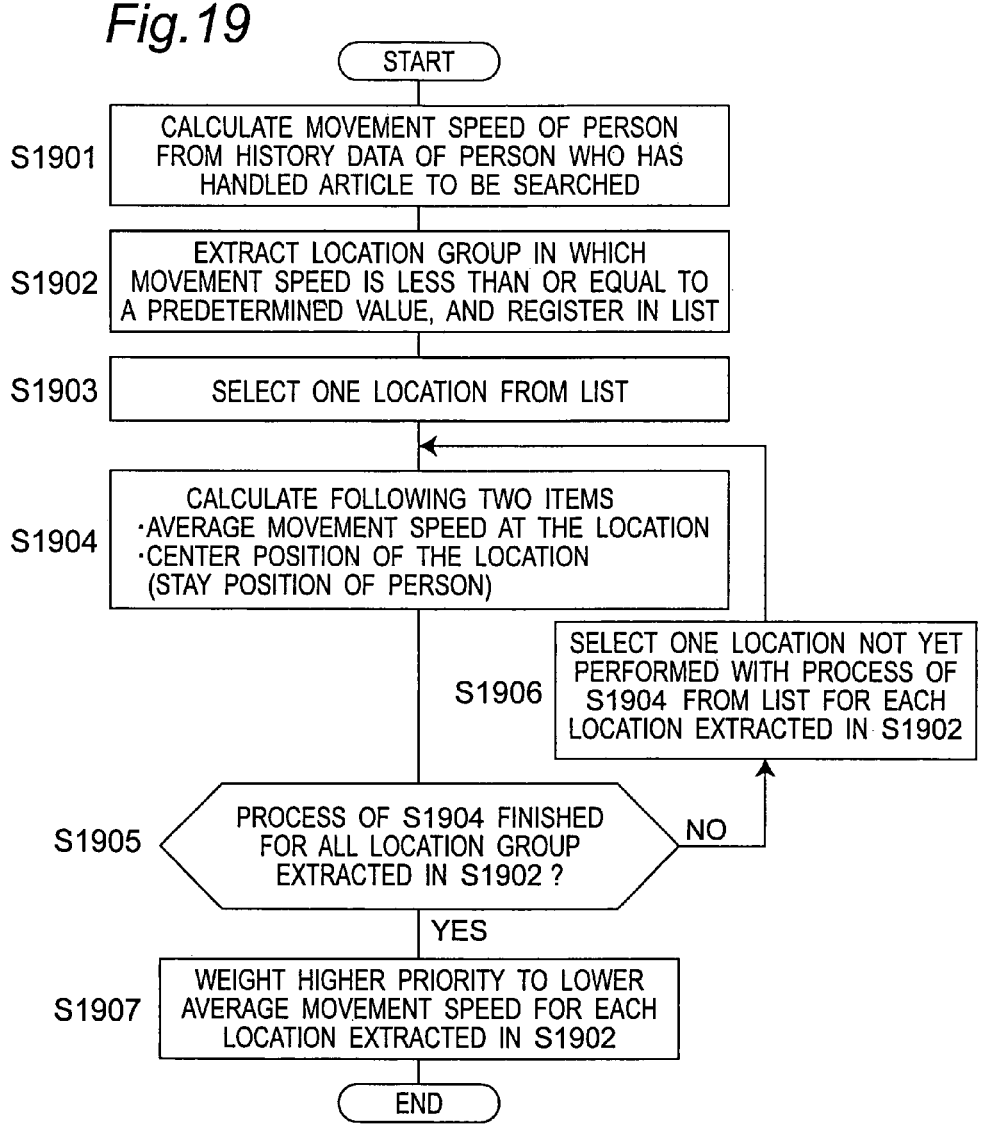
FIG. 19 is a flow chart showing a process of performing weighting using movement speed of a person in the article search system.
FIG. 20 is a view showing in tabular form the processing result in an article position candidate weighting means in the article search system.

Based on this idea, FIG. 19 shows the process of performing weighting using the movement speed of the person by the article position candidate weighting means 108 in a form of a flow chart.

In step S1901, since the history data of the person who has handled the article to be searched is obtained in the article present region estimating means 107, the movement speed of the person is calculated by the article position candidate weighting means 108 using the history data. The calculation of the movement speed is easily obtained since the distance moved in unit time from the position coordinate value of each time is calculated in the history data of the example of FIG. 12, and the distance is divided by the article position candidate weighting means 108 in unit time.

In step S1902, the location group where the movement speed obtained by the article position candidate weighting means 108 is below or equal to a predetermined value (threshold value) as the stay state of the person is extracted by the article position candidate weighting means 108, and registered as the weighting list in the temporary storage of the article position candidate weighting means 108 or the article management database 102 and the like by the article position candidate weighting means 108.

Next, in step S1903, one location is first selected from the weighting list by the article position candidate weighting means 108.

Next, in step S1904, two items of
the average movement speed at the relevant location,
the center position coordinate of the relevant location, are calculated by the article position candidate weighting means 108 at the location selected in step S1903 by the article position candidate weighting means 108. As the calculation of the center position coordinate, the average or the like of the position coordinate in the stay state of below or equal to the threshold value is obtained by the article position candidate weighting means 108. The first average movement speed is used for the index in weighting, and the other center position coordinate is used in indicating the location of the article to the user. The calculation result is registered to the weighting list of the temporary storage in the article position candidate weighting means 108 or the article management database 102 and the like by the article position weighting means 108.

Next, in step S1905, if the location not performed with step S1904 with respect to each location extracted in step S1902 is present, the process proceeds to step S1906, and if the location not preformed with step S1904 is not present, the process proceeds to step S1907.

In step S1906, with respect to each location extracted in step S1902, one location not performed with step S1904 is selected from the list, and after repeating step S1904, the process proceeds to step S1905.

At the same time in step S1907, for all the locations extracted in step S1902, weighting is performed by the article position candidate weighting means 108 so that high priority is fixed in the order from lower average movement speed calculated in step S1904. This is based on the idea that the slower the person is moving (in extreme case, when stopped), the possibility that the article is being handled there is higher. The weighting result is registered in the weighting list of the temporary storage in the article position candidate weighting means 108 or the article management database 102 or the like by the article position candidate weighting means 108.

The process will be explained with specific example. By way of example, on the assumption that the article "juice" is to be searched, the history data MF-Data02 of FIG. 12 is obtained in the article present region estimating process by the article present region estimating means 107, and the state of performing the article position candidate weighting process in the article position candidate weighting means 108 is picked up.

In step S1901, the movement speed of the person is calculated from the history data MF-Data02 of the person by the article position candidate weighting means 108. The above described graph (graph (a) on the upper side of FIG. 13) shows the calculation result.

Next, in step S1902, the location group in which the movement speed obtained by the article position candidate weighting means 108 is less than or equal to a predetermined value (threshold value) is extracted by the article position candidate weighting means 108 as the stay state of the person, and registered, for example, in the temporary storage of the article position candidate weighting means 108 or the article management database 102 as the weighting list by the article position candidate weighting means 108. In the example, the presence of three stay portions is determined from the graph (a) on the upper side of FIG. 13. When associated with the plan view (b) on the lower side of FIG. 13 plotted to the floor plan, determination is made that stay occurs near the "book shelf", near the "refrigerator and kitchen system", and near the "sofa 1" in the time order from the earliest, and thus, each stay state is referred to as "book shelf", "refrigerator and kitchen system" and "sofa 1" for the sake of convenience.

Next, through the processes of step S1903 to step S1906, the two items of, average movement speed, and center position coordinate are each calculated by the article position candidate weighting means 108 in the stay state of "book shelf", "refrigerator and kitchen system" and "sofa 1". The calculation result is registered in the weighting list of the temporary storage of the article position candidate weighting means 108 or the article management database 102 by the article position candidate weighting means 108.

In step S1907, the weighting of the "book shelf", "refrigerator and kitchen system" and "sofa 1" is performed by the article position candidate weighting means 108 from the calculation result.

FIG. 20 shows the result of the article position candidate weighting obtained in the above manner, in a tabular form. The table includes, from the left, the average movement speed at the relevant location, the center position coordinate of the relevant location (the name of the location additionally written for the coordinate to show which location in the room in the present example), weighting result (represent order)

with respect to the three extracted stay states, and the result of step S1904 and step S1907 of FIG. 19 are stored in the weighting list of the temporary storage of the article position candidate weighting means 108 or the article management database 102 or the like by the article position candidate weighting means 108.

The stay time of the person may also be used as information for performing weighting. This uses the knowledge that a certain time is required to handle the article in addition to the knowledge that the movement speed of the person lowers or becomes zero when the person is placing or taking the article. For instance, even if the average movement speed is a minimum, if the duration of the stay time is small, the possibility that the handling of the article is not performed is considered high and may be deleted from the candidate order. The threshold value with respect to the stay time is determined according to the ID and the location of the handler of the article (person to be detected) or the handling article (article to be detected). For instance, if the handler is an elderly, or when the handling article is heavy or fragile, the handling time of the article is assumed to be long, and thus the threshold value is set relatively large. Further, at the location where the storage equipment with door is arranged, time is required to open or close the door, and thus the time of stay is assumed to be long. The threshold value is set relatively large in this case as well. On the other hand, if the stay time is long (if stay time is long at sofa or the like), the handler is most likely assumed to be resting, and thus is not particularly used as the information.

Figure 37:
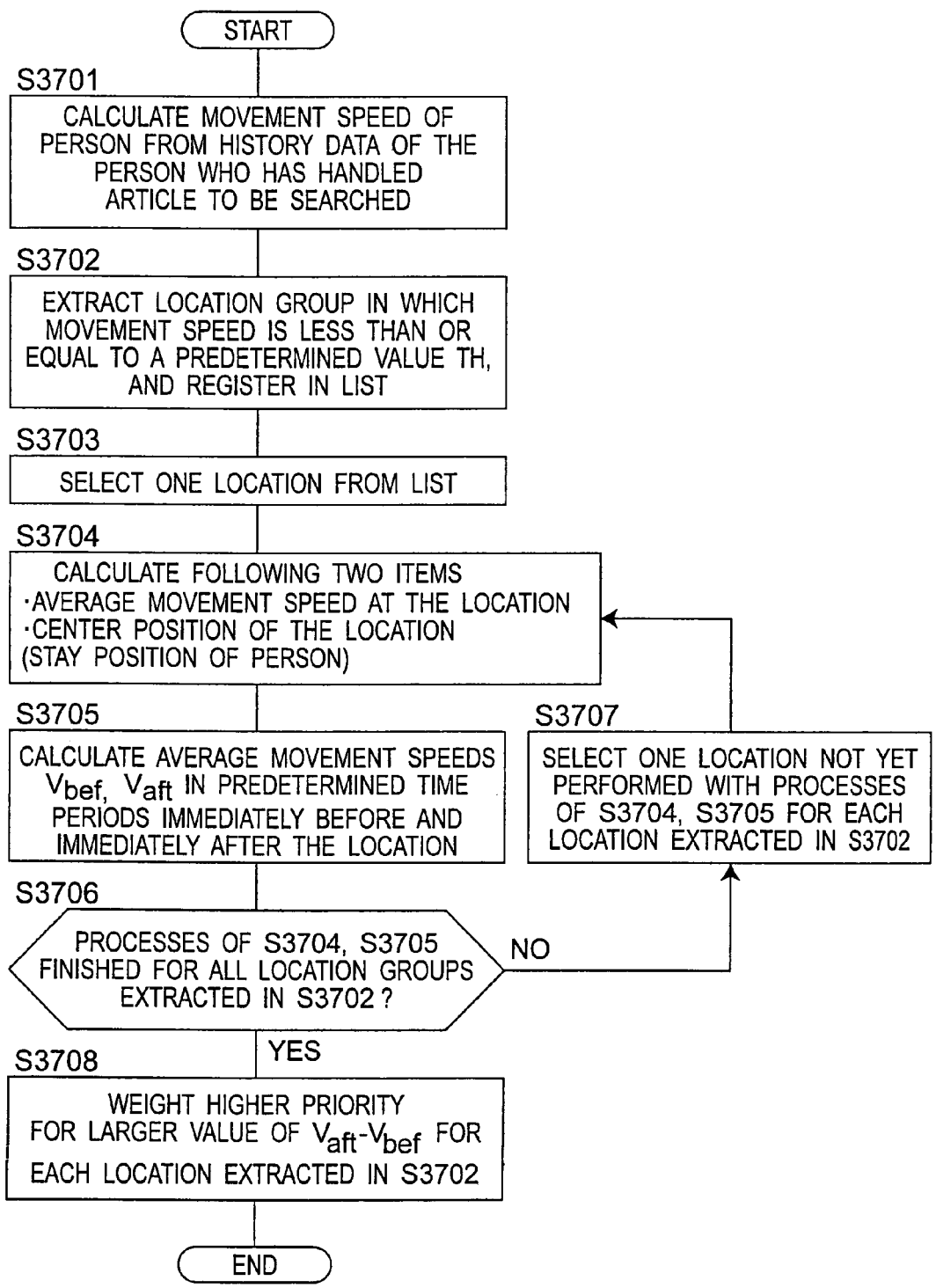
FIG. 37 is a flow chart showing the algorithm with which determination is made that the possibility the article being carried has been discharged if the average movement speed in a predetermined time period after stay is larger than the average movement speed in a predetermined time period before stay.

Further, the weighting can be performed according to the difference in the average movement speed of before and after the stay of the handler. When the handler is carrying a heavy weight article, a fragile article, a container with liquid or the like, the movement speed of the handler is likely to slow down. Thus, if the average movement speed at a predetermined time period after stay is greater than the average movement speed at a predetermined time period before stay, the handler is most likely assumed to have discharged that article he/she was carrying. Taking this into consideration, the algorithm performed by the article position candidate weighting means 108 can be explained using the flow chart of FIG. 37.

The processes of step S3701 to S3704 are similar to the processes of step S1901 to S1904 in FIG. 19 performed by the article position candidate weighting means 108, and thus the explanation thereof is omitted.

Figure 38:
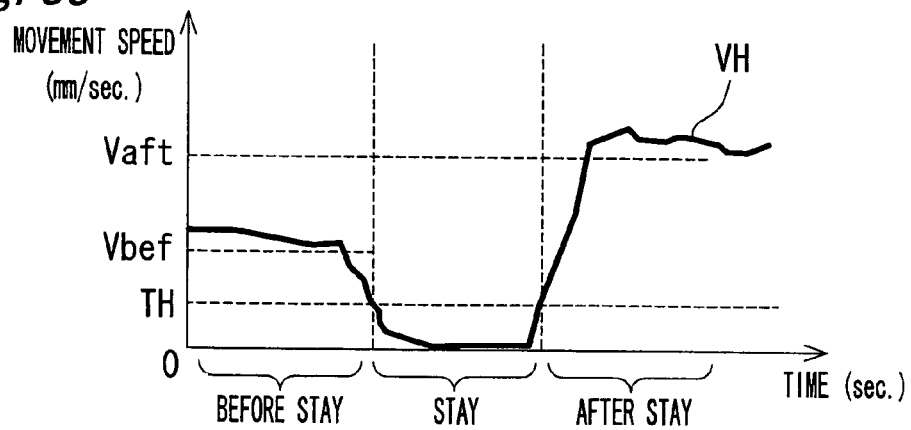
FIG. 38 is a graph showing the processing result in step S3705 of FIG. 37.

In step S3705, the average movement speeds $V_{bef}$, $V_{aft}$ in a predetermined time period of immediately before and immediately after the relevant location are calculated by the article position candidate weighting means 108. FIG. 38 shows the processing result in step S3705 on a graph where transverse axis: time, vertical axis: movement speed. FIG. 38 shows the graph VH of the change in the movement speed with respect to time regarding a certain person serving as one example of the handler. The movement history data corresponding to the time of less than or equal to a threshold value TH of the movement speed is determined as "stay" by the article position candidate weighting means 108. The length of the stay time is used as the time width for determining the predetermined time periods immediately before and immediately after the stay by the article position candidate weighting means 108. A predetermined value set in advance may of course be used.

For each location extracted in step S3702, if the location not performed with step S3704 and S3705 by the article position candidate weighting means 108 exists in step S3706, the process proceeds to step S3707, and when the location not performed with the process does not exit, the process proceeds to step S3708.

In step S3707, the article position candidate weighting means 108 selects one location not performed with step S3704 and S3705 from the list for each location extracted in step S3702, and the process proceeds to step S3706 after repeating the steps S3704 and S3705.

In step S3708, the article position candidate weighting means 108 weights each location extracted at step S3702 with higher priority from the larger value of ($V_{aft}$-$V_{bef}$).

If the articles must be rapidly conveyed for business and the like, the movement speed may become slower after placing the article. To respond to such case, the absolute value of ($V_{aft}$-$V_{bef}$) is calculated by the article position candidate weighting means 108.

Two or more of the average movement speed, the stay time, and the difference in the average movement speed at before and after the stay described above may be combined for use. The stay time can be used by being deleted from the candidate order if the stay time is less than the threshold value TH as described above. When using the combination of the average movement speed and the difference in the average movement speed at before and after the stay time, the candidate order can be set in the order of larger evaluation value S by the article position candidate weighting means 108 by using the following evaluation equation:

$$S = \alpha * \frac{1}{v} + \beta |V_{aft} - V_{bef}|$$

wherein v is the average movement speed, $V_{aft}$ is the average movement speed after stay time, $V_{bef}$ is the average movement speed before stay time and α and β are weighting coefficients. α and β are defined in advance through pre-experiment.

If a plurality of handlers are present, the handling article may be handed over among a plurality of people. The present invention also responds to such case. The handing over of the article will be explained using FIG. 39A and FIG. 39B.

Figure 39A:
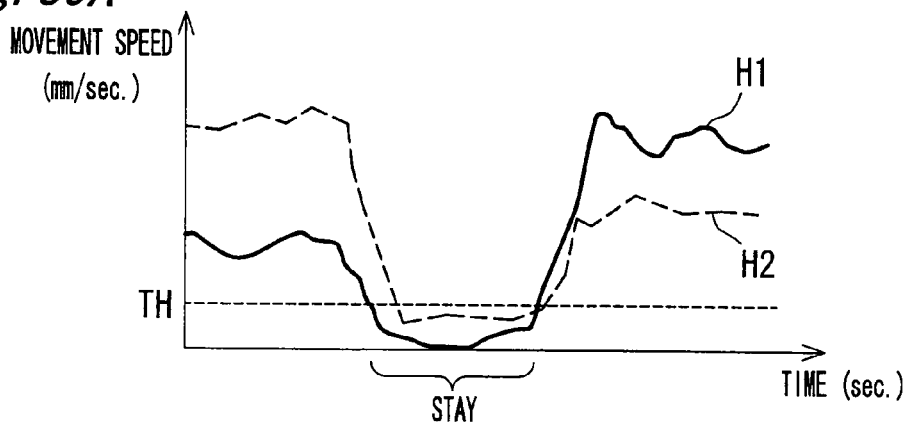
FIG. 39A is a graph showing time change of the movement speeds of two people H1, H2.
Figure 39B:
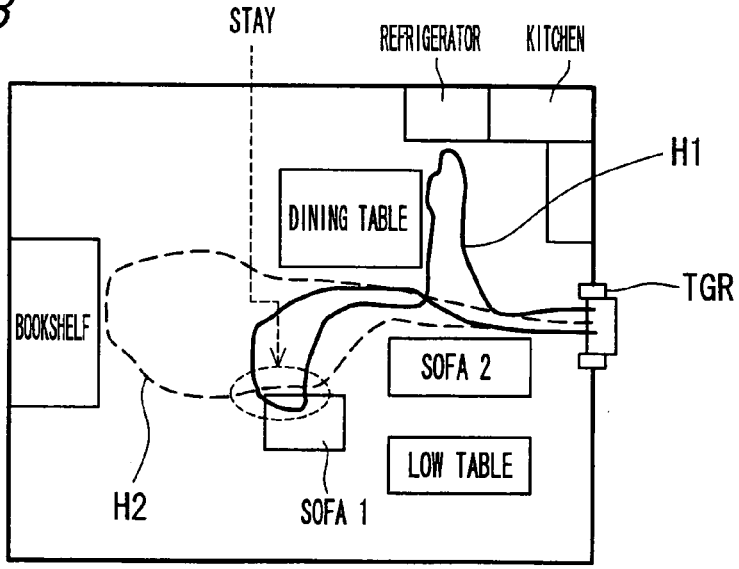
FIG. 39B is a view showing the movement path of the two people H1, H2 on the floor plan of the room.

The graph of FIG. 39A shows the time changes in the movement speeds of two people H1 and H2 serving as an example of the handler. The person H1 is the person selected as the handler candidate of the article to be searched in step S1703, and the person H2 is the person not selected as the handler candidate of the article to be searched in step S1703. TH is a threshold value related to the movement speed for determining whether or not stay at a certain time by the article position candidate weighting means 108, and both people H1, H2 are determined by the article position candidate weighting means 108 when staying at a certain time at the movement speed of less than or equal to the threshold value TH. FIG. 39B shows the movement path of the two people H1, H2 over the floor plan of the room, where the two people H1, H2 are determined as being near the sofa 1 of FIG. 39B at the stay time of FIG. 39A by the article position candidate weighting means 108. That is, the people H1 and H2 are staying at the same time and at the same location, at which point the article position candidate weighting means 108 determines that the article was most likely handed over. Since the person H1 is the candidate handling the article to be detected, the article position candidate weighting means 108 determines that the handing over most possibly occurred from person H1 to H2. If the person H2 is not the handler candidate, the person H2 must newly be treated in a manner complying with the handler candidate, and the article position candidate weighting means 108 determines that there is a possibility the article to be searched is present in the movement path after being handed over to the person H2.

The processes in the article present region estimating means 107 taking into consideration the handing over will now be explained using the flow chart of FIG. 40 and data of FIG. 41. Unless specifically stated, the subject of operation of each step is the article present region estimating means 107.

<<Article Present Region Estimating Means 107>>

The processes from step S4001 to step S4003 are similar to processes from step S1701 to step S1703. In step S4001, the user specifies the object article to be detected which position is desirably detected by means of the input device 109, and the article to be searched specified at the input device 109 is input to the article present region estimating means 107.

Next, in step S4002, the time and location (position in the room) where the specified article is detected last are acquired with reference to the article management information on the article management database 102 based on the article to be searched that has been specified. FIG. 41 shows the detection result at the location where the specified article is detected last in time series, showing that the time when the specified article was detected last is Tx.

Next, In step S4003, the article present region estimating means 107 acquires all the people detected at the location within a predetermined time period TZ1 including time Tx as the candidate (hereinafter referred to as handler candidate) for handling the specified article with reference to the person management information on the person management database 104. In FIG. 41, person H3 (entering the room to be detected at time T1) and person H4 (entering the relevant room at time T2) are acquired as handler candidate of article.

Next, In step S4004, the article present region estimating means 107 acquires all the people detected at the relevant location from the time (within time period TZ1) at which the candidate (person H3, person H4) acquired in step S4003 is detected for the first time (i.e., when entering) at the location acquired in step S4002 to a time at which it is detected for the second time (i.e., when exiting) as the candidate (hereinafter referred to as hand over candidate) who has been handed over the article with reference to the person management information on the person management database 104, and creates the hand over candidate list. In FIG. 41, the article present region estimating means 107 acquires, as the hand over candidate, the person H5 (whether entering and exiting) detected during the time period TZ2 until time T5 at which the person H3 exited last out of the candidates (person H3, person H4) detected during the time period TZ1, and enters the person H5 to the hand over candidate list.

Next, in step S4005, the article present region estimating means 107 acquires the person movement history information (history data) in which the time and the movement of the person are associated with reference to the person management information (person movement history information) of the person management database 104 for all the handler candidates acquired in step S4003 and for all the hand over candidates acquired in step S4004.

Next, in step S4006, the movement speed of the person (handler candidate) is calculated by the article present estimating means 107 from the history data of the handler candidate acquired in step S4005. Since the calculation of the movement speed is similar to the process in step S1901, the explanation thereof is omitted.

Next, in step S4007, the article present region estimating means 107 registers the (time, location) combined data in which the movement speed of the handler candidate is less than or equal to a predetermined value in the stay point list as a stay point. In a case of the history movement history data shown in FIG. 12, the elements of the stay point list (i.e., element of movement history information) becomes the three dimensional data of (time, X coordinate value, Y coordinate value).

Next, in step S4008, the article present region estimating means 107 selects one candidate from the hand over candidate list created in step S4004.

Next, in step S4009, the article present region estimating means 107 calculates the movement speed of the person (selected candidate) with reference to the history data acquired in step S4005 for the candidate selected in step S4008. The calculation of the movement speed is similar to the process in step S1901 and thus the explanation thereof is omitted.

Next, in step S4010, the article present region estimating means 107 extracts all the (time, location) combined data in which the movement speed of the candidate is less than or equal to a predetermined value as the stay point, and compares each stay point with each stay point registered in the stay point list. In this comparison, the article present region estimating means 107 determines whether or not the locations at the same time are within a predetermined distance, and when the locations at the same time are within the predetermined distance, the process proceeds to step S4011. If the locations at the same time are not within the predetermined distance, the process proceeds to step S4012. The predetermined distance, that is, the threshold value of the distance is determined with whether or not the distance between the people is the distance that allows hand over of the article as the determination reference. For example, since the person stretches the arm when handing over the article, the length of the arm of the person can be made as the reference. The average length of the arm of the person can be used, and when the ID of the person is acquired by the person detecting device 103, it can be determined based on the length of the arm of the person and the like stored in the person management database 104 on the basis of the acquired ID. Of course, since error may be superimposed on the sensing result of the position of the person, the threshold value is determined taking the error into consideration. The above explanation is made for the case in which the time of recording the movement history is synchronized among a plurality of people, but if not synchronized, the datum in which the time difference is within a predetermined threshold value (range in which the time is assumed to be simultaneous) are compared.

In step S4011, the article present region estimating means 107 compares the history data of selected candidate with the stay point registered in the stay point list. When a plurality of stay points are present in which the distance between the locations at the same time are within the predetermined distance, the non-used flag is given to all the history data before the stay point of earliest time. For the history data of the hand over candidate, the knowledge that the article to be searched does not exist in the location before a certain time at when the hand over has possibly occurred is reflected on the article present region estimating process. Thereafter, the process proceeds to step S4013.

In step S4012, the article present region estimating means 107 deletes the candidate currently selected from the hand over candidate list. The knowledge that hand over of the article does not occur is reflected on the article present region estimating process since the history data of the candidate currently being selected does not overlap the history data of the handler candidate in terms of location and time. Thereafter, the process proceeds to step S4013.

In step S4013, the article present region estimating means 107 checks whether or not the process of S4010 is finished for all the people registered in the candidate list. If YES (process of S4010 is finished), the present article present region estimating process is finished, and if NO (process of S4010 is not finished), the process proceeds to step S4014.

In step S4014, the article present region estimating means 107 selects one person from the hand over candidate list of the people not yet performed with the process of S4010 for each person registered in the hand over candidate list, and returns to step S4009.

The article present region estimating process in the article present region estimating means 107 that takes into consideration the hand over of the article is as described above. The result of mapping the above-obtained history data of the handler candidate and the hand over candidate on the floor plan of the environment by the article present region estimating means 107 on the display device 110, and thus the user is able to look for the article to be detected, at the vicinity of the movement path along the movement path (i.e., movement region of the person).

Figure 42A:
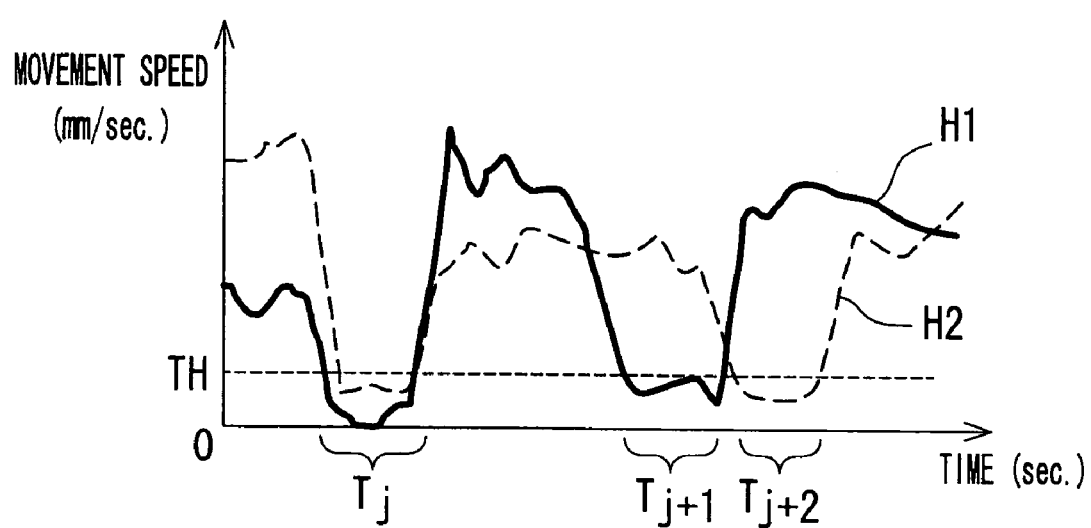
FIG. 42A is a view showing the data representing the change in movement speed of two people H1, H2 used in the article present region estimating process in the article present region estimating means of when taking the hand over of the article into consideration.
Figure 42B:
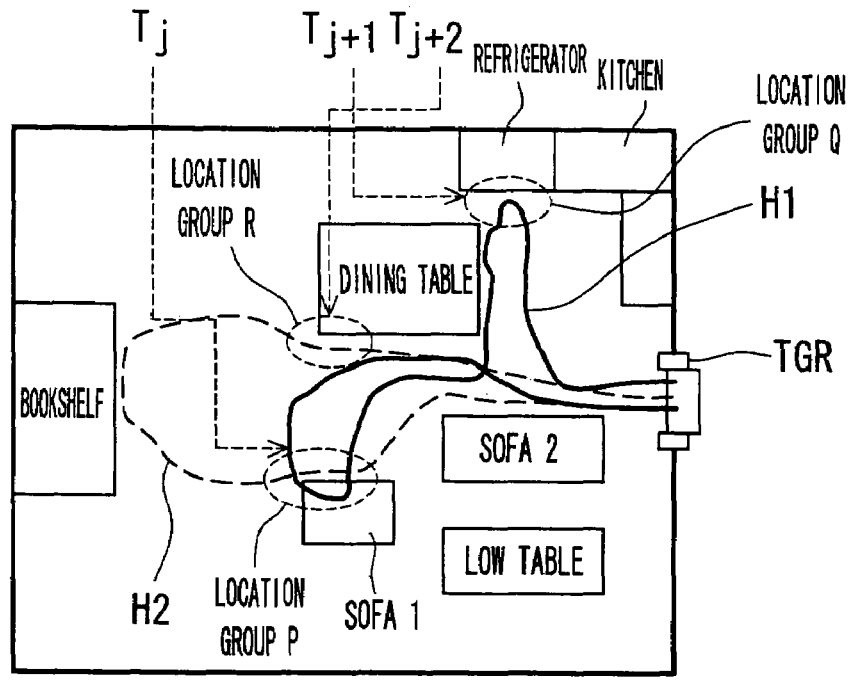
FIG. 42B is a view showing the movement trajectory data of the two people H1, H2 on the floor plan of the room in the article present region estimating process in the article present region estimating means of when taking the hand over of the article into consideration.
Figure 42C:
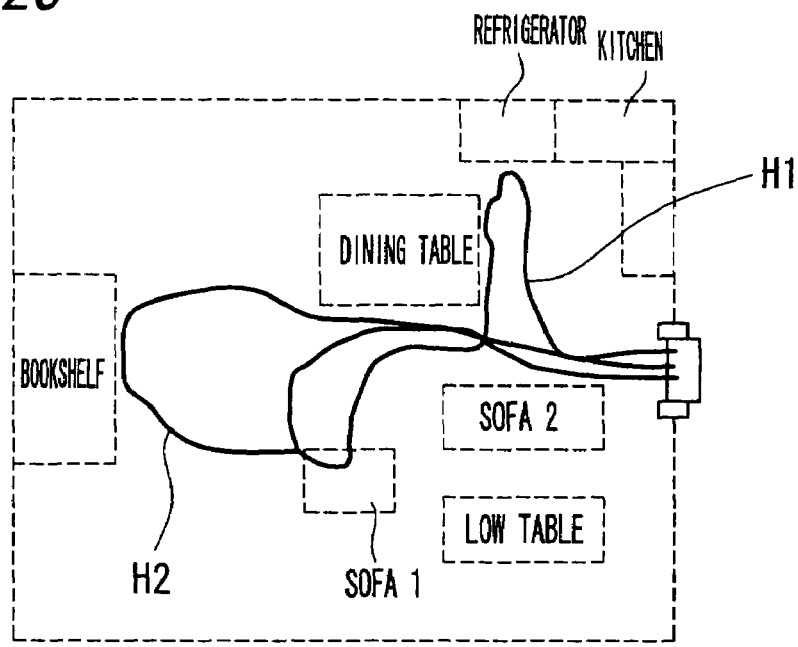
FIG. 42C is a view showing the movement trajectory shown on the display device in the article present region estimating process in the article present region estimating means of when taking the hand over of the article into consideration.

FIG. 42A, FIG. 42B, and FIG. 42C show examples of the display result of the data used in the article present region estimating process. FIG. 42A is the data (solid line is data of person H1, dotted line is data of person H2 in FIG. 42A) representing the changes in movement speeds of two people H1, H2. The person H1 is the person selected as the handler candidate of the article in step S4003, and the person H2 is the person not selected as the handler candidate of the article in step S4003 but is the person selected as the hand over candidate in step S4004. TH is the threshold value related to the movement speed for determining whether or not stay is occurring by the article position candidate weighting means 108. In FIG. 42A, determination is made by the article position candidate weighting means 108 that the data contained in the time periods $T_j$, $T_{j+1}$, $T_{j+2}$ are stay points. The data in the time period $T_j$ includes the stay points of both person H1 and person H2. The data in the time period $T_{j+1}$ includes the stay point of only the person H1. The data in the time period $T_{j+2}$ includes the stay point of only the person H2. FIG. 42B is a view showing the movement trajectory data of the same two people H1, H2 over the floor plan of the room. The movement trajectory (solid line of FIG. 42B) of the person H1 and the movement trajectory (dotted line of FIG. 42B) of the person H2 in the time period $T_j$ both pass through the location group P, the movement trajectory of the person H1 corresponding to the time period $T_{j+1}$ passes through the location group Q, and the movement trajectory of the person H2 corresponding to the time period $T_{j+2}$ passes through the location group R. If the stay points of the person H1 and H2 corresponding to the same time contained in the location group P are determined as within a predetermined distance with respect to each other by the article present region estimating means 107 in step S4010, the movement history data of the person H2 is also ultimately selected by the article present region estimating means 107 as having the possibility that the article is present. Finally, the movement trajectory displayed on the display device 110 is as shown in FIG. 42C. The data before the time period $T_j$ in the movement history data of the person H2 is given the non-used flag by the article present region estimating means 107, and thus is deleted from the display on the display device 110. Thus, the data given the non-used flag in the history data of the hand over candidate is not displayed on the display device 110 to avoid displaying the region where the article is less likely to be present to the user.

As described above, taking the hand over into consideration, the movement path of the person who has a high possibility of being hander over the article (i.e., movement region of the person) is simultaneously displayed, and thus the movement path of the other person who has been subjected to the hand over (i.e., movement region of the other person) can be searched.

Similarly, the weighting of the article position candidate that takes into consideration the possibility of a hand over can be also performed. The weighting process in the article position candidate weighting means 108 that takes into consideration the possibility of the hand over will now be explained using the flow chart of FIG. 43. Unless specifically stated, the subject of operation of each step is the article position candidate weighting means 108.

<<Article Position Candidate Weighting Means 108>>

In step S4301, the article position candidate weighting means 108 prepares the stay point data of the handler candidate and the stay point data (excluding those given non-use flag) of the hand over candidate acquired in the article present region estimating means 107 (flow chart of FIG. 40) and registers the data collection of the data of the same person and in which the locations and the times are close to the weighting list as the stay state. The weighting list is arranged, for example, in the temporary storage of the article position candidate weighting means 108 or in the article management database 102. Determining whether or not locations and times are close utilizes whether or not the distance between the locations is within a predetermined threshold value, and whether or not the time difference between the times is within the predetermined threshold value.

Next, in step S4302, the article position candidate weighting means 108 first selects one stay state from the weighting list.

Next, in step S4303, the article position candidate weighting means 108 calculates two items, the average movement speed at the relevant stay state; and
the center position coordinate of the relevant stay state, in the stay state selected in step S4302. The calculation of the center position coordinate includes obtaining the average or the like of the position coordinates in the stay state of below or equal to the threshold value by the article position candidate weighting means 108. The first item or the average movement speed is used as the index of weighting, and the other item or the center position coordinate is used to display the location of the article to the user. The calculation result is registered in the weighting list in the temporary storage of the article position candidate weighting means 108 or in the article management database 102.

In step S4304, the article position candidate weighting means 108 proceeds to step S4305 if the stay state not yet performed with step S4303 is present for each stay state registered in the weighting list, and proceeds to step S4306 if the stay state not yet performed with step S4303 is not present.

In step S4305, the article position candidate weighting means 108 selects one stay state not yet performed with step S4303 from the weighting list for each stay state registered in the weighting list, and returns to step S4303.

At the same time in step S4306, the article position candidate weighting means 108 weights to give higher priority from low average movement speed calculated in step S4303 for all the stay states registered in the weighting list. This is based on the idea that the slower the person is moving (in extreme case, when the person is stopped), there is a high possibility that the person is handling the article at the time. The weighting result is registered in the weighting list of the temporary storage of the article position candidate weighting means 108 or the article management database 102 or the like.

Figure 44A:
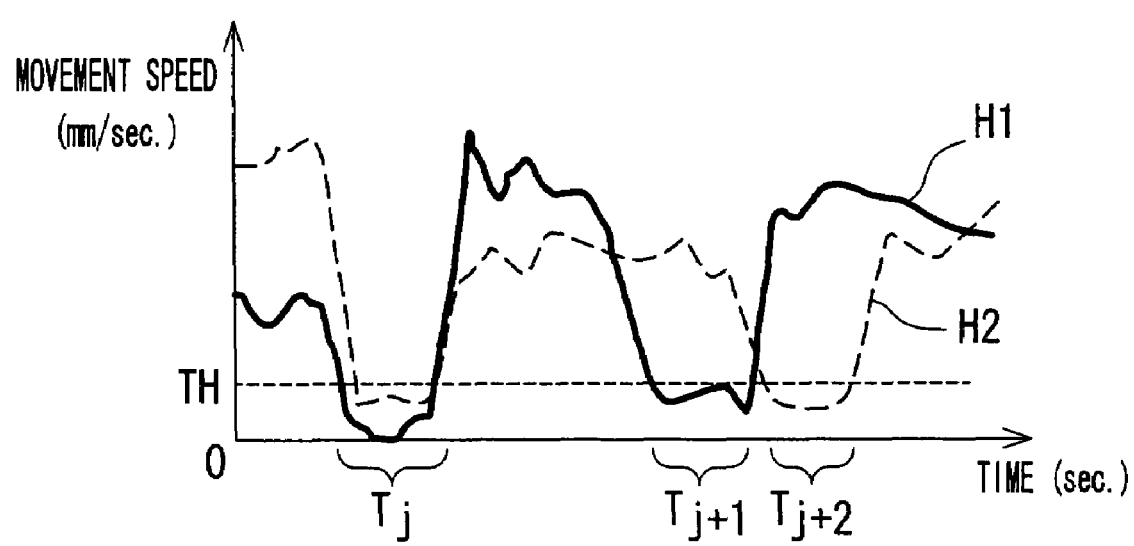
FIG. 44A is a view showing the data representing the change in movement speed of two people H1, H2 used in the article present region estimating process in the article present region estimating means that takes the hand over of the article into consideration, similar to FIG. 42A.
Figure 44B:
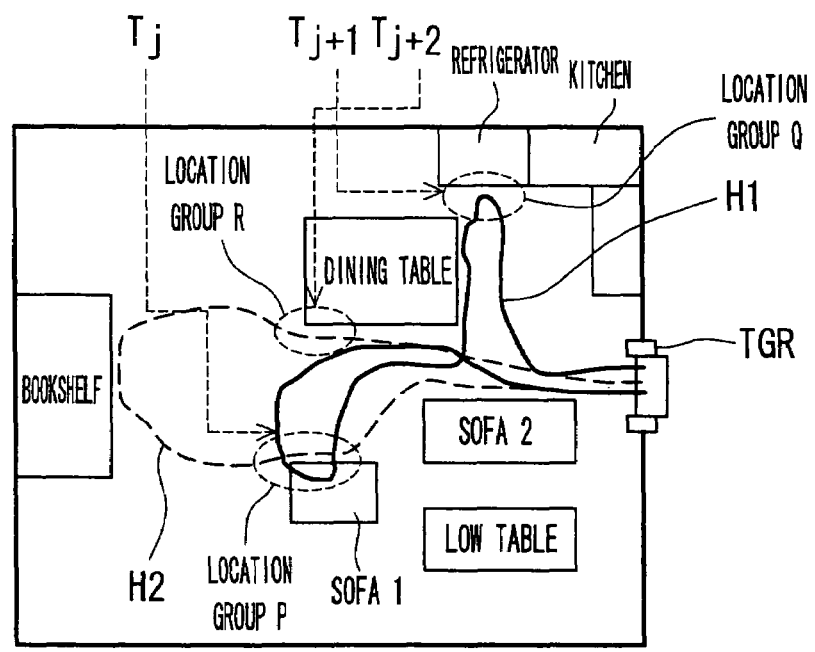
FIG. 44B is a view showing the movement trajectory data of the two people H1, H2 on the floor plan of the room in the article present region estimating process in the article present region estimating means of when taking the hand over of the article into consideration, similar to FIG. 42B.
Figure 44C:
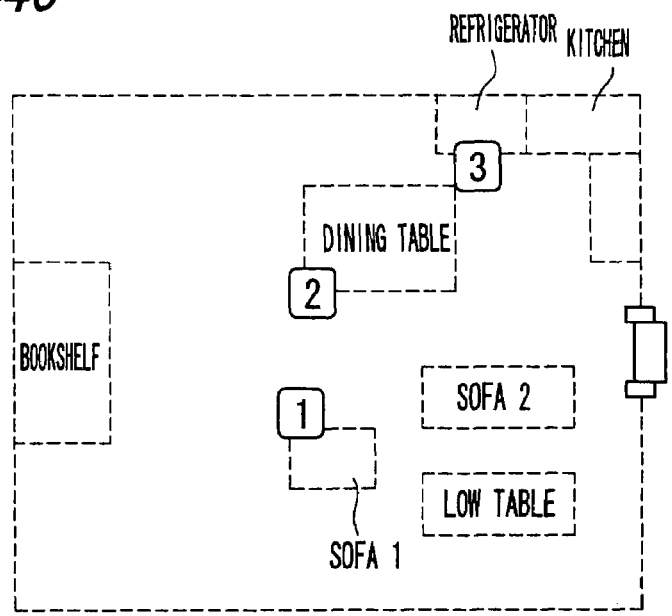
FIG. 44C is a view showing the result of mapping the obtained article present region on the floor plan of the environment in the article present region estimating process in the article position candidate weighting means that takes the hand over of the article into consideration.

FIG. 44A, FIG. 44B, FIG. 44C show the data and the display result used in the weighting process in the article position candidate weighting means 108 taking the possibility of a hand over into consideration. FIG. 44A, FIG. 44B are the same as FIG. 42A, FIG. 42B. FIG. 44C shows the priority obtained by executing the process in step S4306 at the corresponding location. In this case, since the result of weighting of the priority, of step S4306 is "average movement speed at location group P<average movement speed at location group R<average movement speed at location group Q", the location group P has the highest priority, then the location group R and the location group Q. If the hand over the article is not taken into consideration, only the vicinities of the location groups P, Q on the movement history of the person H1 or the handler candidate of the article (location group R is not selected since it is not on the movement history of person H1) are selected as the location where the article is most likely to be present. However, if the hand over of the article is taken into consideration, the vicinity of the location group R on the movement history of the person H2 or the hand over candidate of the article (location group R is not on the movement history of the person H1 but is selected since the person H1 moves near the location group R) is also selected.

The above description is the article present region estimating process in the article position candidate weighting means 108 when the hand over of the article is taken into consideration. The results and the like of mapping the article present region obtained therefrom on the floor plan of the environment by the article present region estimating means 107 (e.g., FIG. 44C) is displayed on the display device 110, so that the user can look for the article not only at the candidate location on the path that he/she has moved but also at the candidate location on the path of the person who is possibly handed the article.

Even if the person who was handling the article first has forgotten that he/she has handed the article over to another person, the location on the movement trajectory of the person who is likely to have been handed the article is displayed as the candidate of the article present location by performing the above processes.

When carrying a heavy article, a fragile article or the like, the movement speed of the person is likely to slow down compared to when the person is not carrying the article. Using this fact, evaluation can be performed with how much certainty the hand over of the article between people was performed and reflected on the weighting by the article position candidate weighting means 108 in step S4306.

The movement history of two people H1, H2 are considered as in FIG. 45A, FIG. 45B, and FIG. 45C. The person H1 is the handler candidate, and the person H2 is the hand over candidate. FIG. 45A shows the data (solid line of FIG. 45A is the date of person H1 and dotted line is data of person H2) representing the time change in the movement speed of the two people H1, H2. TH is the threshold value related to the movement speed for determining as stay by the article position candidate weighting means 108. Determination is made that the time periods S2, S4, S5 are in stay state by the article position candidate weighting means 108. The time periods S1 and S3 will be hereinafter described. FIG. 45B is a table showing the-average movement speeds $V_{H1}$, $V_{H2}$ of the persons H1, H2 in time periods S1 to S5 obtained by the article position candidate weighting means 108 based on the graph of FIG. 45A. FIG. 45C displays the movement trajectory of the two people H1, H2 over the floor plan of the room. Determination is made by the article position candidate weighting means 108 that the locations of the persons H1, H2 in time period S2 correspond to the common location group P. Since the time period S2 at which the stay state where the time and the location overlap for the two people exists, the article position candidate weighting means 108 determines that the article was mostly likely handed over from the person H1 to person H2 in the time period S2 that is the stay time.

The change in the movement speed of each person H1, H2 before and after the common time period S2 or the stay state will now be explained. Determination is made in that with regards to the person H1 from FIG. 45A, the movement speed after the time period S2 in the stay state increase compared to the movement speed of before the time period S2 in the stay state, and with regards to the person H2, the movement speed after the time period S2 in the stay state decreases compared to the movement speed of before the time period in the stay state. The present process uses this fact and also uses the fact that the possibility that the article has been handed from the person H1 to the person H2 is high.

Considering the fact that the speed change occurs only when a heavy article, a fragile article, or the like is being carried, the article ID detected in the article detecting device 101 and the article information (e.g., accessory information such as heavy or fragile), stored in the article management database 102 may be used. That is, the following processes are executed only for the heavy article or the fragile article.

The process of reflecting the changes in the movement speeds of before and after the stay state on the weighting by the article position candidate weighting means 108 will now be explained using the flow chart of FIG. 46. Unless specifically stated, the subject of operation of each step is the article position candidate weighting means 108.

First, in step S4601, the article position candidate weighting means 108 prepares the stay point data of the handler candidate and the stay point data (excluding those given the non-use flag) of the handler candidate acquired in the article present region estimating means 107 (flow chart of FIG. 40), and registers the data collection of the data of the same person, and in which the location and time are close, to the weighting list as the stay state by the article position candidate weighting means 108. The process is the similar to the process in step S4301 in the flow chart of FIG. 43, and thus the explanation thereof is explained.

Next, in step S4602, the history data of all the handler candidates and the hand over candidates corresponding to the stay point data acquired in S4601 are acquired by the article position candidate weighting means 108. The acquisition of the history data is similar to step S4005 in the flow chart of FIG. 40, and thus the explanation thereof is omitted.

Next, in step S4603, one stay state is selected from the weighting list created in step S4601 by the article position candidate weighting means 108. The present process is similar to the step S4302 in the flow chart of FIG. 43, and thus the explanation thereof is omitted.

Next, in step S4604, the article position candidate weighting means 108 calculates, the average movement speed at the relevant stay state, and the center position coordinate (stay position coordinate of person) of the relevant stay state, for the stay state selected in step S4603. The present process is similar to step S4303 in the flow chart of FIG. 43, and thus the explanation thereof is omitted.

Next, in step S4605, determination is made on whether or not the selected stay state is common to the handler candidate and the hand over candidate by the article position candidate weighting means 108. In determination, whether or not the stay point contained in both stay states satisfies the determination criteria used in step S4010 in the flow chart of FIG. 40 is used. When determined as common between the handler candidate and the hand over candidate by the article position candidate weighting means 108, the process proceeds to step S4606, and when determined as not common, the process proceeds to step S4607.

In step S4606, the average movement speeds of before and after in terms of time of the time period in the stay state in the history data of the handler candidate and the hand over candidate are calculated by the article position candidate weighting means 108. For instance, in the history data (time change in movement speed) of FIG. 45A, the time period S1 is set before time period S2, and the time period S3 is set after the time period S2 by the same amount of length as the length of the time period S2 of the common stay time by the article position candidate weighting means 108 with regards to the history data of person H1 and person H2. The length of the time period may not be the length of the time period S2 of the common stay time, and may be a predetermined value set in advance. The average movement speed of all the handler candidates and the hand over candidates (persons H1 and H2 in FIG. 45A) in the set time periods S1 and S3 are calculated by the article position candidate weighting means 108. The result of calculation is $V_{H1,S1}$, $V_{H2,S1}$, $V_{H1,S3}$, $V_{H2,S3}$ of FIG. 45B. That is, the average movement speeds in the predetermined time periods S1, S3 of immediately before and immediately after the time period S2 of the stay state in the person H1 are calculated by the article position candidate weighting means 108 as $V_{H1,S1}$ and $V_{H1,S3}$, and similarly, the average movement speeds in the predetermined time periods S1, S3 of immediately before and immediately after the time period S2 of the stay state in the person H2 is calculated by the article position candidate weighting means 108 as $V_{H2,S1}$ and $V_{H2,S3}$. The process then proceeds to step S4607.

In step S4607, determination is made by the article position candidate weighting means 108 on whether or not the process of 4606 is finished for each stay state registered in the weighting list. If the process of S4604 is finished, the process proceeds to step S4609, and if the process of S4604 is not finished, the process proceeds to step S4608.

In step S4608, the article position candidate weighting means 108 selects one stay state not yet performed with the process of S4604 from the weighting list for each stay state registered in the weighting list, and returns to step S4604.

In step S4609, the article position candidate weighting means 108 uses the average movement speed and the average movement speeds of before and after the common stay state for each stay state registered in the weighting list, and performs weighting. In step S4306 of FIG. 43 described above, the average movement speeds are ranked from smaller value without distinguishing between the handler candidate and the hand over candidate. In addition to the average movement speed, the ranking is performed taking the possibility of a hand over into consideration.

Assuming the average movement speeds in time periods S2, S4 of the stay state for person H1 are $V_{H1,S2}$, $V_{H1,S4}$, respectively, and the average movement speeds in time periods S2, S5 of the stay state for person H2 is $V_{H2,S2}$, $V_{H2,S5}$, respectively, the possibility that the article has been handed over from the person H1 or the handler candidate of the article to the person H2 or the hand over candidate of the article in the time period S2 of the common stay state is evaluated by the article position candidate weighting means 108 using the equation of evaluation value $Z=(V_{H1,S3}-V_{H1,S1})+(V_{H2,S1}-V_{H2,S3})$. That is, if the average movement speed after stay is larger than the average movement speed before stay for the person H1, and the average movement speed before stay is larger than the average movement speed after stay for the person H2, determination is made that the possibility that the article has been handed from person H1 to person H2 is high by the article position candidate weighting means 108. With regards to the stay state (for FIG. 45A, time period S4 or stay state of person H1, and time period S5 or stay state of person H2) of each person after time period S2 of the common stay state for person H1 and H2, the evaluation value Z is reflected by the article position candidate weighting means 108. Specifically, since the article is most likely to have been handed from the person H1 or the handler candidate to the person H2 with respect to the average movement, speed V in the stay state after the time period S2 of the common stay state, constant number a times the evaluation value Z is subtracted from $$\text{Score} \frac{1}{V}$$

by the article position candidate weighting means 108. The person H2 or the hand over candidate is most likely to have received the article from person H1, and thus adds constant number y times the evaluation value Z to $$\text{Score} \frac{1}{V}$$

by the article position candidate weighting means 108. Thus, the scores for the three states of time periods S2, S4, S5 in the stay state or acting as the article present region candidate becomes $$\frac{1}{V_{H1,S2}} - \gamma Z,$$
$$\frac{1}{V_{H1,S4}} - \gamma Z,$$
$$\frac{1}{V_{H2,S5}} + \gamma Z$$

and the ranking of the possibility of article presence is performed in the order of scores by the article position candidate weighting means 108. With regards to S2 or the common stay state with respect to the person H1, H2, the score is calculated by the article position candidate weighting means 108 using the average movement speed $V_{H1,S2}$ of the person H1 or the article handler. Of course, the average movement speed $V_{H2,S2}$ of person H2 or the person handed over with article may also be used, for example, $$\frac{1}{(V_{H1,S2}+V_{H2,S2})/2} - \gamma Z$$

may be used as the score of the time period S2 of the stay state.

Through the above processes, not only the average movement speed in the stay state, but the ranking that takes into consideration the handing over of the article can be performed by the article position candidate weighting means 108.

An appropriate value is determined as a constant number y through pre-experiment or the like.

Figure 21:
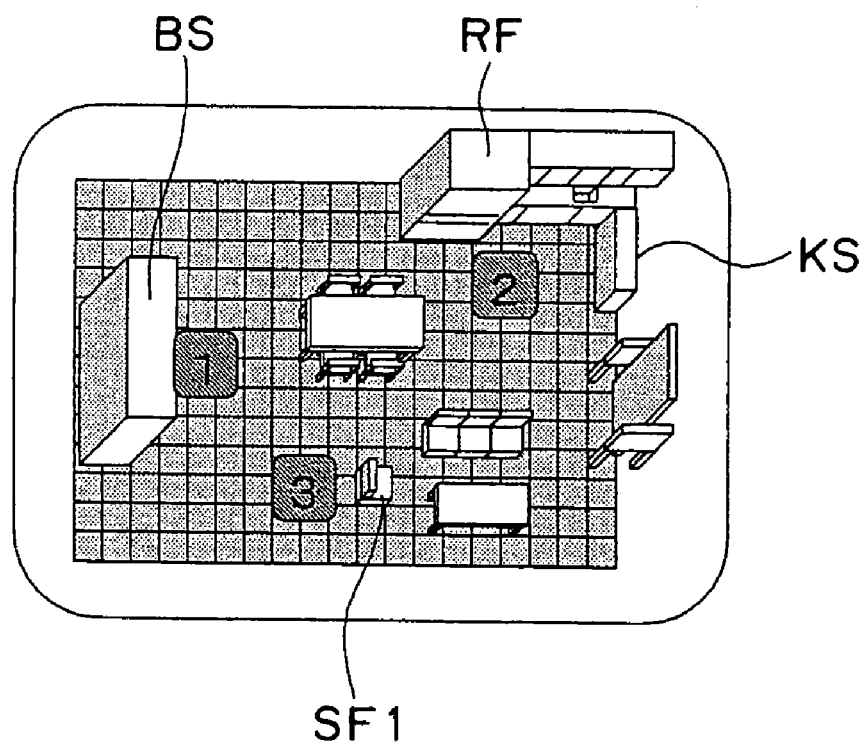
FIG. 21 is a schematic view showing an example displaying an article search result in CG (computer graphic) on the display device in the article search system.

In the display device 110 of the article search system according to the first embodiment of the present invention, the actual search result is displayed based on the article position candidate weighting process result in the article position candidate weighting means 108. FIG. 21 is a schematic view showing an example displaying an article search result in CG (computer graphic) on the display device 110. In FIG. 21, the state in which the locations having the possibility that the article is actually present are overwritten by numerical values expressing the order of high possibility (order obtained as article position candidate weighting process result) in a bird's-eye view that shows the entire article present location. The user looks at the result in the display device 110 to efficiently search for the article by narrowing the locations to look for in advance such as the "bookshelf" and the vicinity thereof, and if not found, the "refrigerator and kitchen system" and the vicinity thereof, and if not found, the "sofa 1" and the vicinity thereof.

In the weighting of the article position candidate based on the movement speed of the person explained above, if a plurality of equipments or installations to which the article are placed or from which the article is taken out are present in the vicinity of the stayed location, the user must look thoroughly at all the equipments and facilities, which is a troublesome task. As a method of responding to such issue, it is effective to narrow the location for actually placing or taking out the article by using the operation information on the equipment.

Figure 22:
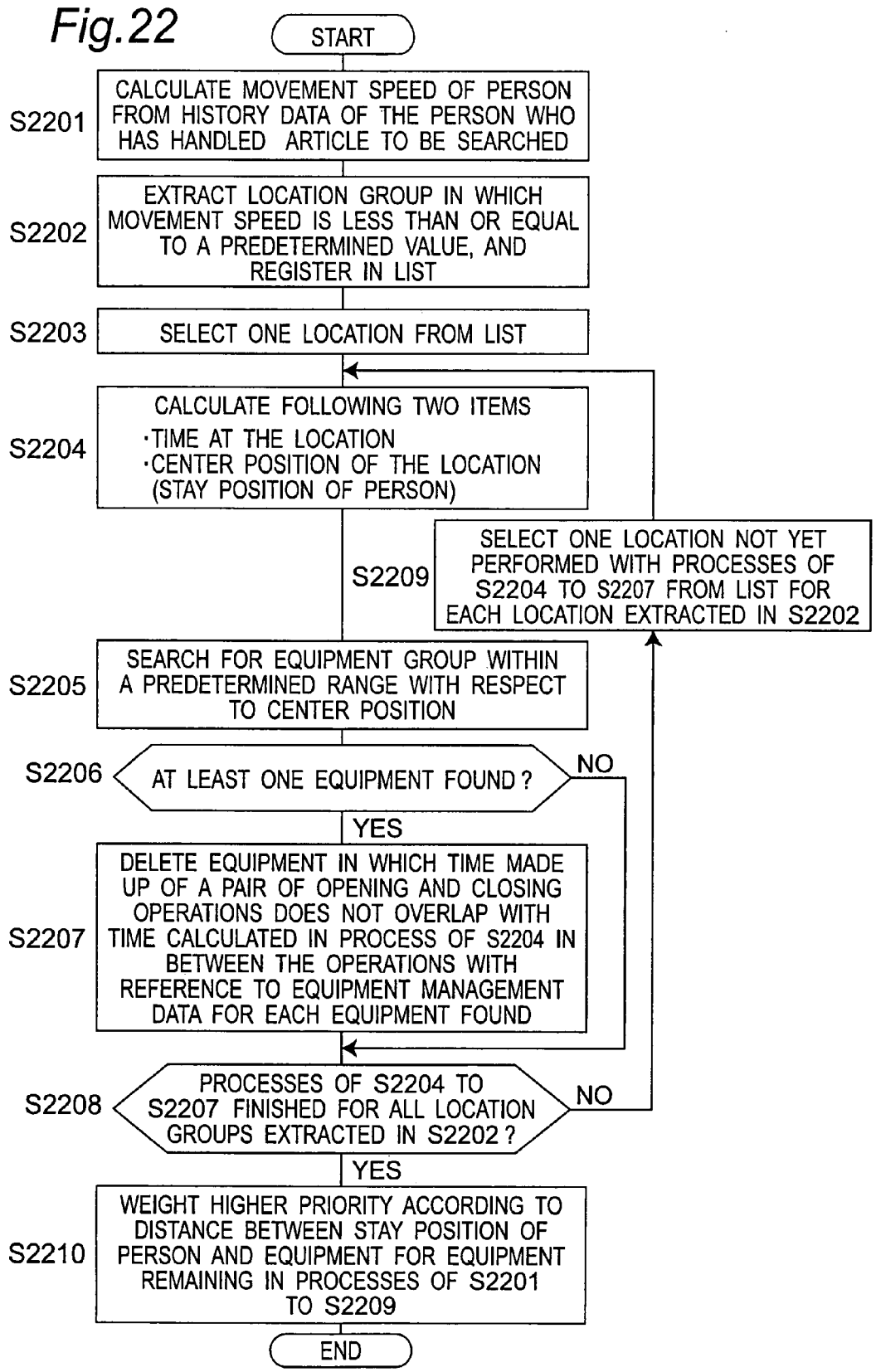
FIG. 22 is a flow chart showing the process of performing weighting using the equipment management information in the article search system.
Figures 23, 24, 26:
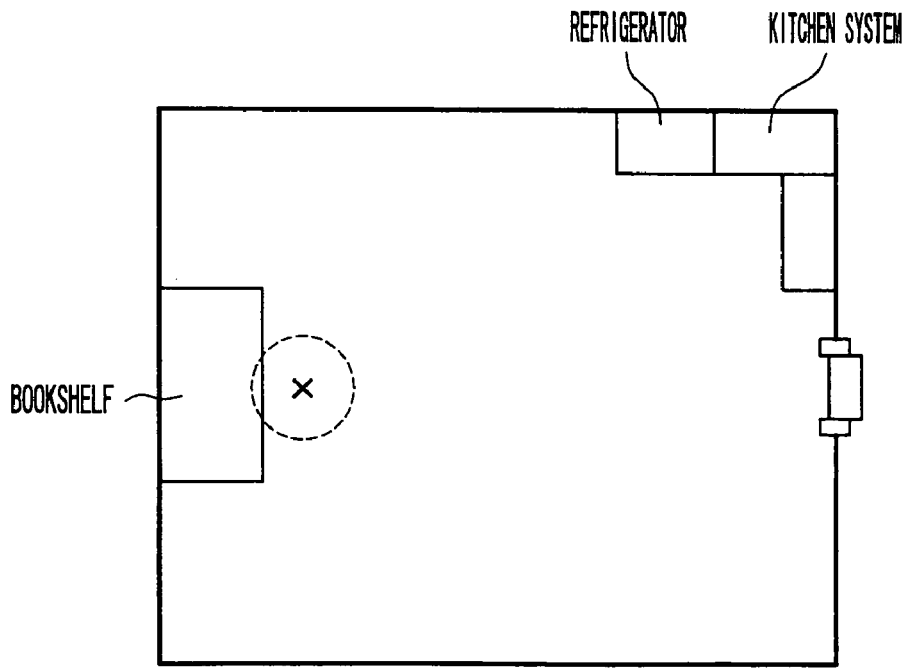
FIG. 23 is a view showing in tabular form the database for managing the location of the equipment in the article search system.
FIG. 24 is a floor plan showing the equipment arranged in the environment.
FIG. 26 is a view showing in tabular form the result of the weighting process corresponding to the distance between the stay position of the person and the equipment in the article search system.

Hereinbelow, a method of performing weighting by the article position candidate weighting means 108 using the operation information on the equipment will now be explained. FIG. 22 is a view showing in a form of a flow chart the process of performing weighting using the operation information on the equipment. In the present process, the equipment management information managing the location of the equipment is prepared in advance in order to search for the position of the equipment that is sufficiently close to the position of the person. FIG. 23 is a view showing in a tabular form the database for managing the location of the equipment (includes installation). The table shows the state in which the position of the equipment is managed in a simple manner in a rectangular form with respect to the equipment in the environment, where the position coordinates of the upper left and the lower right of the rectangular are given. Simplifying the position of all the equipments into a rectangle may not necessarily be appropriate, in which case, the occupying region of the equipment is determined by a polygon and the vertex thereof is expressed by vector data.

The weighting process of the article position candidate will now be explained but steps S2201 to S2203 are the same as steps S1901 to S1903 of the flow chart of FIG. 19, and thus the detailed explanation thereof will be omitted.

In step S2201, the movement speed of the person is calculated from the history data of the person handling the article to be searched by the article position candidate weighting means 108.

Next, in step S2202, the location group in which the movement speed obtained by the article position candidate weighting means 108 is less than or equal to a predetermined value (threshold value) is extracted by the article position candidate weighting means 108 as the stay state of the person, and registered in the weighting list in the temporary storage of the article position candidate weighting means 108 or the article management database 102 or the like by the article position candidate weighting means 108.

Next, in step S2203, one location is first selected from the weighting list by the article position candidate weighting means 108.

Next, in step S2204, in the location selected in step S1903 by the article position candidate weighting means 108, the time at the relevant location and the center position coordinate of the relevant location is calculated by the article position candidate weighting means 108.

Next, in step S2205, the equipment group within a predetermined range with respect to the center position is searched by the article position candidate weighting means 108. The search of the equipment may be performed by various methods, where a simple example will be explained herein using FIG. 24. FIG. 24 is a floor plan showing the equipment placed in the environment, the× mark in FIG. 24 being the center position. When a circle having a radius of the size of the predetermined range appropriately defined with respect to the center position is drawn (circle of dotted line in FIG. 24), if at least one part of a region of the equipment is within the circle, the equipment is extracted as the search result by the article position candidate weighting means 108. Although the equipment found by the article position candidate weighting means 108 is only the "bookshelf" in the example of FIG. 24, if a plurality of equipments are found by the article position candidate weighting means 108, all the equipments are extracted.

Next, in step S2206, if at least one equipment is found, the process proceeds to step S2207, and if not found, the process proceeds to step S2208.

Next, in step S2207, the equipment management information for each equipment found is referenced by the article position candidate weighting means 108, and the equipment in which the time calculated in step S2204 and the time from when the equipment is opened until closed does not overlap is deleted by the article position candidate weighting means 108 from the weighting list of the temporary storage of the article position candidate weighting means 108 or the article management database 102 where the weighting result is stored. This is a process of reflecting that the article is less likely to be present at the equipment when the equipment that has not accommodated the article is present even if a person stays at a certain location, and thus the equipment where the person has actually stayed and accommodated the article can be narrowed.

In step 2208, if the steps S2204 to S2207 are finished for all the location groups extracted in process 2202, the process proceeds to step S2210 and if not, the process proceeds to step S2209.

In step S2209, for each location extracted in step S2202, one location not yet performed with step S2204 is selected from the weighting list of the temporary storage of the article position candidate weighting means 108 or the article management database 102 by the article position candidate weighting means 108, and step S2204 is repeated.

In step S2210, for all the equipments extracted in step S2207, the distance is weighted by the article position candidate weighting means 108 so as to have higher priority from smaller values according to the distance between the stay position of the person and the equipment.

Figure 25:
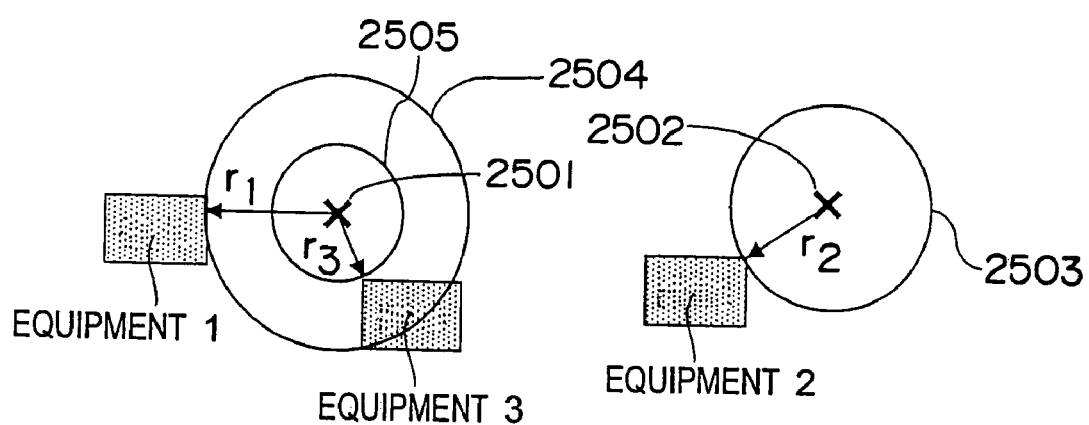
FIG. 25 is a view explaining the weighting process corresponding to the distance between the stay position of the person and the equipment in the article search system.

A specific explanation of the weighting process corresponding to the distance will now be made using FIG. 25. In FIG. 25, three equipments (equipment 1, equipment 2, equipment 3) are present in the environment, and two stay positions (stay position 2501, stay position 2502) are found in step S2202, where "equipment 1" is at a distance $r_1$ (stay position 2504) from the stay position 2501, "equipment 2" is at a distance $r_2$ (stay position 2503) from the stay position 2502, and "equipment 3" is at a distance $r_3$ (stay position 2505) from the stay position 2501. $r_1$(stay position 2504)>$r_2$(stay position 2503)>$r_3$ (stay position 2505). Since weighting is performed so that the priority is higher from smaller distance according to the distance between the stay position of the person and the equipment, the orders of 1, 2, 3 are given in the order of "equipment 3", "equipment 2", "equipment 1" by comparing the sizes of $r_1$(stay position 2504), $r_2$(stay position 2503), $r_3$(stay position 2505). This result is shown in the table of FIG. 26. In this example, weighting is very simply performed by a scale of the distance between the stay position of the person and the equipment, but weighting may obviously be performed adding the stay time and the like of the person.

Next, the process will now be explained with a specific example. As examples, similar to the above, the article position candidate weighting process performed by the article position candidate weighting means 108 will be explained by obtaining the history data MF-Data02 of the person in the article present region estimating process in the article present region estimating means 107 on the assumption that the article to be searched is "juice".

Next, in step S2201, the movement speed of the person is calculated from the history data MF-Data02 of the person by the article position candidate weighting means 108. The calculation result is shown in the previous graph (graph (a) on the upper side of FIG. 13).

Next, in step S2202, the location group in which the movement speeds obtained by the article position candidate weighting means 108 are below or equal to a predetermine value (threshold value) is extracted as the stay state of the person by the article position candidate weighting means 108, and registered as the weighting list in the temporary storage in the article position candidate weighting means 108 or the article position database 102 by the article position candidate weighting means 108. In the present example, the presence of three stay portions is determined. When associated with the floor plan on the lower side of FIG. 13 on which floor plan those are plotted, determination is made that stay occurs in the order from earliest time of the vicinity of the "bookshelf", the vicinity of the "refrigerator and kitchen system", and the vicinity of the "sofa 1". Each stay state is referred to as the "bookshelf", the "refrigerator and the kitchen system", and the "sofa 1" for the sake of convenience. For the sake of convenience of explanation, the time of each stay time is as follows.

"bookshelf": 19:31 to 19:32
"refrigerator and kitchen system": 19:32 to 19:33
"sofa 1": 19:34 to 19:35

The "bookshelf" and the "refrigerator" are then obtained as equipments where the article is most likely to be present through the processes of step S2203 to step S2209. A specific processing process will now be described.

Next, in step S2204, the time and the center position coordinate of stay in the "bookshelf", the "refrigerator and kitchen system", and the "sofa 1" are calculated by the article position candidate weighting means 108.

Next, in step S2205, the equipment group within a predetermined range is searched by the article position candidate weighting means 108 with respect to the center position, and the "bookshelf" and the "refrigerator" are extracted by the article position candidate weighting means 108.

Next, in step S2206, since at least one equipment is found, the process proceeds to step S2207, where the equipment without a pair of opening and closing operations having the time calculated in step S2204 in between is deleted by the article position weighting means 108 with reference to the equipment management information by the article position candidate weighting means 108 for each equipment found and (step S2208 to S2204 to S2208).

Next, since two equipments of the "bookshelf" and the "refrigerator" are obtained as the accommodating locations of the juice as a result of the above process, weighting of the two equipments is performed by the article position candidate weighting means 108 according to the distance with the position stayed in the vicinity of the equipment in step S2210.

Figure 27:
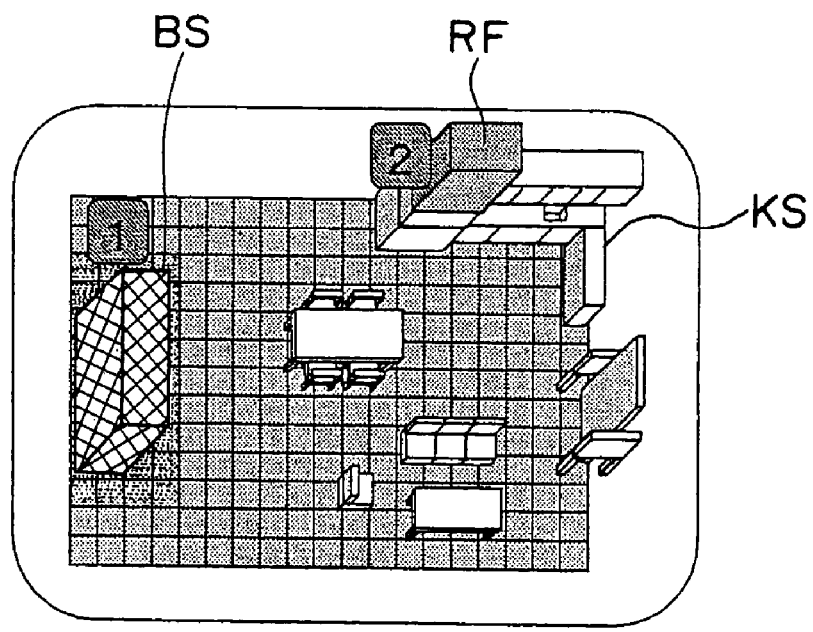
FIG. 27 is a schematic view showing an example displaying an article search result in CG (computer graphic) on the display device in the article search system according to the second embodiment of the present invention.

In the display device 110 of the article search system of the first embodiment of the present invention, the actual search result is displayed based on the article position candidate weighting process result in the article position candidate weighting means 108. FIG. 27 is a schematic view showing an example in which the article search result is displayed on the display device 110 in CG (computer graphic). In FIG. 27, the equipment serving as a location where the article may actually exist is displayed in different colors on a bird's-eye view showing the entire article present locations, and shows the numerical values representing the order of high possibility written thereon. The difference with FIG. 21 is that the article present location is narrowed to the equipment level. If a plurality of accommodating portions are arranged in one equipment, it can be further finely narrowed by the present process if the equipment management information for each accommodating portion can be accumulated. For instance, the "refrigerator" shown as a second candidate in the example of FIG. 27 is displayed not as a single equipment but in a manner distinguishing which accommodating portion of the "refrigerator" (In FIG. 27, the upper most accommodating portion of the refrigerator), so that the user can narrow the location to search for and search for the article more efficiently.

As explained above, the article present region estimating means 107 and the article position candidate weighting means 108 are the features of the first embodiment of the present invention, whereby the position of the article is narrowed using the result obtained by analyzing the history data of the person, and further, the operation information on the equipment.

In the first embodiment, a method of weighting the article present location using the history data of the person and the operation information on the equipment has been explained in detail, but weighting may obviously be performed using methods other than the above. Two examples of such will now be explained.

The first alternative useful method is a method of weighting, when the region where a certain article is present is estimated by the article present region estimating means 107, in the order from the location in the region and in which the article is most likely to be present (not shown). In this case, a normal positional information storing one or more location where the article is normally placed is stored in advance in the article management database 102 as the article management information, or in some cases, the normal positional information may be updated according to the situation the person handles the article, and the updated normal positional information may be used.

The second alternative useful method is a method in which the article present region estimating means 107 uses the article owner information related to the owner of the article, and is particularly effective when the history data for a plurality of people are acquired in the article present region estimating means 107. The history data for a plurality of people means that when a certain article is carried to a certain location, a plurality of people are simultaneously in the relevant location. In this case, distinction cannot be made as to who has the article, the history data of each person is acquired. However, if the article owner information on who out of a plurality of people most likely has the article is obtained in advance, the weighting of certainty can be performed on the acquired history itself. The article owner information is, as shown in FIG. 33, classical music CD: owning possibility of mother 100%
book related to technology: owning possibility of father 100%
book on fashion: owning possibility of daughter 60%, owning possibility of mother 40%.

By using both the result of weighting of the history data and the result of weighting in the article position candidate weighting means 108, an appropriate narrowing becomes possible even in a complicated situation where a plurality of people handled the article.

Specifically, the method of narrowing is, for example, performed in the following manner. In an example in which the history datum of a plurality of people are obtained, the history data for two people shown in FIG. 14 are obtained, the history data being of the "father" and the "mother", and the article to look for is "book related to technology". In this case, the location where the "book related to technology" is present is not searched for all the history data of the two people, but only the history data of the "father", whose possibility of owning the "book related to technology" is 100%, is retrieved and weighted. More specifically, in step S1907 in the flow of FIG. 19, in addition to simply weighting higher priority from the lower average movement speed, value thereof is multiplied and weighted by the possibility value of who owns the article. When the owning possibility of the "book related to technology" is applied, 100% is multiplied to the weighted value obtained from the history data of the "father" and thus the relevant value is held, but 0% is multiplied (that is, no weighting) to the weighted value obtained from the history data of the "mother", which is the same as excluding the "mother" from the candidate.

The first embodiment has the advantages described below. With regards to the article position estimation mainly intended for the article search in the house, when targeting the environment of the house, the detection result of the article becomes rough, and thus, the article search is not simplified by merely looking at the detection result in the device since the device for detecting the article cannot be arranged in great number in terms of cost. With respect to such issue, focusing on the fact that the movement of the person and the article present location have an important correlation, estimation of the article position can be performed using the history data containing the movement speed of the person, the operation information on the equipment, or the like. That is, in the article position estimating apparatus, the article detecting device 101 detects the article, and the information on the location and the information on the time of the detected article are stored in the article management database 102. The person detecting device 103 detects the person, and the information on the location and the information on the time of the detected person are stored in the person management database 104. Further, the equipment operation of the equipment for accommodating and imagining the article is detected by the equipment operation detecting device 105, and the operation information on each detected equipment is stored in the equipment management database 106. The article present region estimating means 107 references the information stored in the article management database 102 and the information stored in the person management database 104 (reference information stored in the equipment management database 106 as necessary), and estimates the location where the article is most likely to be present out of the path which the person has moved as the article present region. The article position candidate weighting means 108 uses the information on the knowledge in movement of the person, location where the article is normally arranged, or the like, as necessary, to perform weighting of high and low possibility out of the locations having the possibility of the article being present is performed, and such information is displayed on the display device 110.

When the user uses the article search system including the article position estimating apparatus, priority is given to the location to look for by referencing the weighted article present location, and the article to be searched is searched from the order of high priority. Therefore, the searching efficiency is enhanced, and the trouble is greatly reduced compared to the prior art.

The present invention is not limited to the first embodiment, and may be performed in various aspects. For example, a simple example of showing the location on the bird's-eye view of the entire environment has also been shown for the display with which the user performs the article search. It is effective to perform the article search by looking at the display screen. An example using an image will now be shown as an example of a method of displaying other screens as an article search system according to a second embodiment of the present invention.

People acquire most of the information on the outside world through vision. Therefore, there are many cases in which, for the forgotten action in the past, the memory can be recalled by displaying the situation at the time by means of an image. The displaying method in the article search system shown below is an example of a method of displaying based on the above idea, and relates to the article search system described in the eleventh aspect of the present invention. More specifically, if the time and location at which the article was handled in the past are detected, how the article was handled at the location at the relevant time can be recalled by showing the picture of the location at the relevant time.

Thus, in the present article search system, in addition to each component of the article position estimating apparatus, a configuration of including an imaging device 111 for imaging an environment where article search is performed; an image database 112 for accumulating the imaged image information; an image searching means 113 for estimating the location and the time at where the article to be searched is assumed to have been placed using the process result in the article present region estimating means 107 or the article position candidate weighting means 108, imaging the estimated location and extracting the image information including the estimated time from the image database 112; and a display device 110 for displaying the image information extracted by the image search means 113 along with the information from the article present region estimating means 107 or the article position candidate weighting means 108 as necessary, is shown, as shown in FIG. 1.

Each component will now be described, and thereafter, the process of showing the picture of the time and the location using the components on the assumption that the time and the location at where the article being looked for was handled in the past can be detected.

<<Imaging Device 111>>

The imaging device 111 takes images of the environment where the article search is performed. As one example of the imaging device 111, a camera using an imaging element such as CMOS or CCD is generally used in practice, but a special camera such as of near infrared or the like may be used depending on the location. If the entire environment cannot be completely imaged with one imaging device, a plurality of imaging devices are obviously prepared, and the camera used in the person detecting device 103 may also be simultaneously used. In each imaging device arranged in this manner, the information indicating to which position in the actual world the image taken by each device corresponds to is added. For the simplest description form of the information, the correspondence description is formed (the present description is hereinafter referred to as corresponding method 1) so that each pixel of each imaging device and the coordinate of the actual world is (u,v)-(x,y,z). As a method of slightly reducing the information amount, each imaging device 110 and the vector data of the range of the floor surface imaged by each device can be corresponded and described as (present description hereinafter referred to as corresponding method 2), camera 1: $(x_{11},y_{11})$-$(x_{12},y_{12})$-$(x_{13},y_{13})$-$(x_{14},y_{14})$
camera 2: $(x_{21},y_{21})$-$(x_{22},y_{22})$-$(x_{23},y_{23})$-$(x_{24},y_{24})$.

In the correspondence method 2, assuming one vector data represents one floor surface region, at least one vector data is necessary for one imaging device, but if two or more floor surface regions are in the image of one imaging device 111, a plurality of the same may be prepared as necessary. Further, if the model of the actual world is known, and the position or direction in the actual world of the camera are known, the actual world coordinate of each location of the actual world imaged on the camera can be obtained by calculation from the above information. For the information as to which position of the actual world the image taken in the imaging device corresponds to, it only needs to be created once at the beginning as long as the imaging device is not moved, and does not need to be changed.

<<Image Database 112>>

Figure 28:
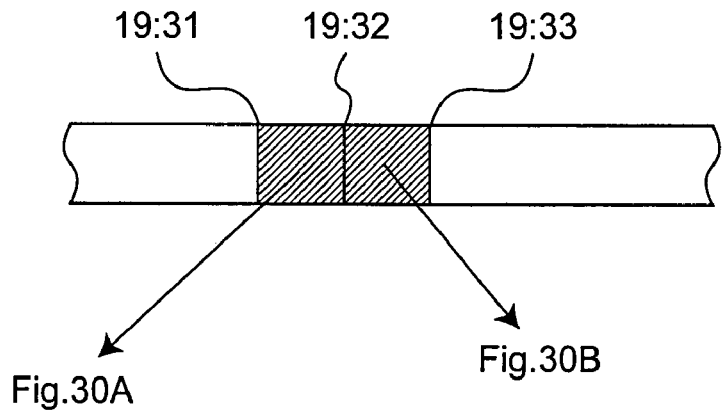
FIG. 28 is a schematic view showing the state of providing a time stamp to a moving picture and accumulating it in the article search system according to the second embodiment of the present invention.

The image information imaged in each imaging device is accumulated in the image database 112 provided with time stamp (provided with information on time output from the timer means 120). The image may be a moving image or a still image, and is respectively used according to the performance of the system. FIG. 28 is a schematic view showing the state in which the moving images are accumulated provided with the time stamp. In FIG. 28, an example in which the time stamp is provided every one minute is shown, but may obviously be more minutely provided, and thus is determined according to the requirement spec of the system.

<<Image Searching Means 113>>

The image searching means 113 obtains the location and the time estimated that the article requested to be searched is present in the article present region estimating means 107 or the article position candidate weighting means 108, and subsequently, takes images of the locations and extracts the image information containing the times from the image database and displays the same on the display device 110.

Figure 29:
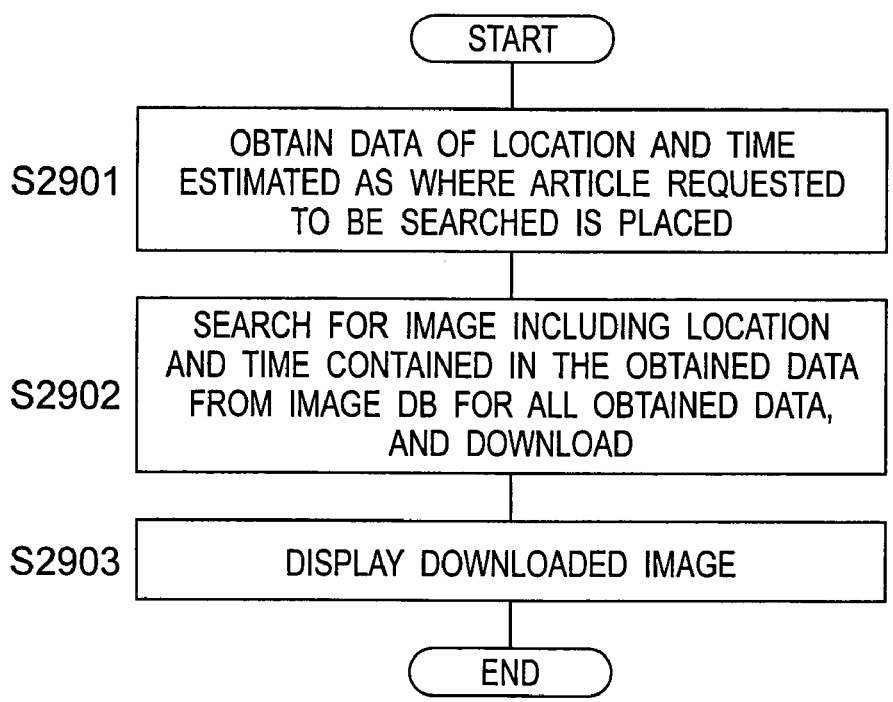
FIG. 29 is a flow chart showing the flow of process in an image searching means in the article search system according to the second embodiment of the present invention.

FIG. 29 is a flow chart showing the flow of the image searching process in the image searching means 113, and the flow of the process will now be explained according to the figure.

In step S2901, the location and the time estimated that the article to be searched is present using the process result in the article position candidate weighting means 108 are obtained.

In step S2902, for all the acquired information and datum, the image information containing the location and time contained in the information or data are searched and downloaded from the image database 112.

A method of selecting the imaging device including the location differs depending on the description form of the information on which position of the actual world the imaging device and the image taken thereat corresponds to.

For example, with the corresponding method 1, the imaging device is selected when (x,y) that matches the location exists, or even if not matched, when a plurality of (x,y) groups capable of surrounding the location exists out of the pair of the described (u,v)-(x,y,z). With the corresponding method 2, the imaging device containing the vector data is selected when the region formed by the described vector data contains the location. If a plurality of imaging devices that are imaging the location are present, all the devices may be selected.

After one or more imaging device imaging the location is selected in this manner, the image information containing the time is searched and downloaded from the image database 112 that accumulates the image information imaged with the relevant imaging device. The form of the image information to be downloaded, for example, may be determined according to the requirement spec of the system such as the moving image information containing two minutes before and after the time, or one still image information per one second.

Figure 30A:
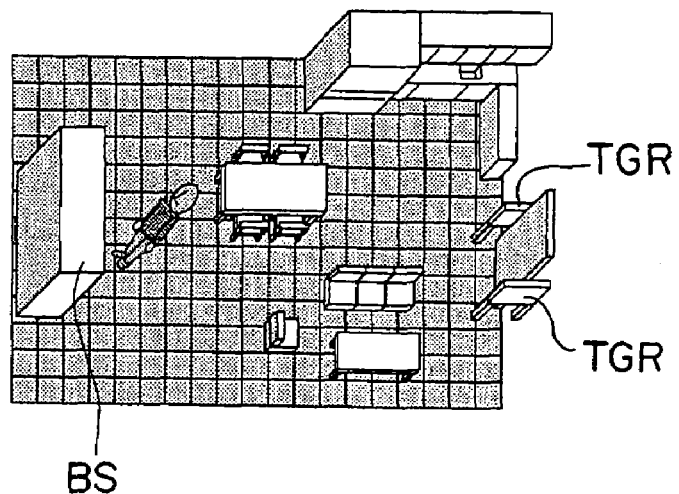
FIG. 30A is a schematic view showing the state of searching and displaying the image of 19:31 from the image database in FIG. 28 in the article search system according to the second embodiment of the present invention.
Figure 30B:
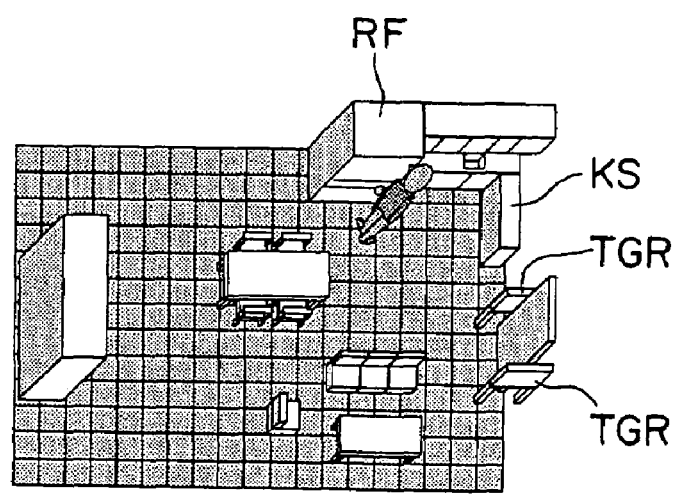
FIG. 30B is a schematic view showing the state of searching and displaying the image of 19:32 from the image database of FIG. 28 in the article search system according to the second embodiment of the present invention.

Next, in step S2903, the downloaded image information is displayed. FIG. 30A, FIG. 30B are schematic views showing the state in which the image information on 19:31 and 19:32 are each searched from the image database 112 of FIG. 28 and displayed. The display of the image information may be suddenly displayed or may be displayed in steps. When displaying in steps, only the process result at the position candidate weighting means is first displayed. Specifically, the screen as shown in FIG. 21 or FIG. 27 is displayed. The position candidate of where the article may be present is specified, and the associated image information is displayed.

The flow of the process in the image searching means 113 has been explained.

A method of estimating the article position using the history data including the movement speed of the person or the operation information on the equipment, which method is the feature of the second embodiment of the present invention, has been explained using the specific example. On the assumption that the estimation of the position of the article to be searched is performed, a method of showing the location of the article to be searched using CG (computer graphic) or actual image is explained.

The flow of the article position estimating process in the article position estimating apparatus according to the first and second embodiments of the present invention illustrated in the first and the second embodiments is merely an example, and is not limited thereto. That is, as long as the idea of using the history data including the movement speed of the person and the operation information on the equipment is included in the estimation of the article position is included in the process, the flow of the process may vary, or the description form of the necessary data may vary.

In the article position estimating apparatus of the first and second embodiments of the present invention, the input device 109, the article detecting device 101, the person detecting device 103, the equipment operation detecting device 105, and the display device 110 out of the devices configuring the article position estimating apparatus are arranged at suitable locations according to the requirements of the system. The article management database 102, the person management database 104, and the equipment management database 106 may be arranged near the article detecting device 101, the person detecting device 103, and the equipment operation detecting device 105 for acquiring the information to be stored respectively, or may be arranged near the article present region estimating means 107 and the article position candidate weighting means 108, which are the remaining means of the device, and send the information acquired by the article detecting device 101, the person detecting device 103, and the equipment operation detecting device 105 to the respective databases via the network. In either case, the installation form of each means or device is merely to arrange at suitable locations according to the requirement of the system, and the installing location or the like are not particularly restricted.

In the article search system of the second embodiment of the present invention, the image searching means 113, the image database 12, and the imaging device 111 or the components other than the device or the means previously explained as the component of the system only needs to be arranged at suitable locations according to the requirement of the system, and the installation location or the like is not particularly restricted.

Further, the article search system of the first and second embodiments of the present invention has been explained to be mainly intended for the house, but is obviously not limited to home application, and may be used in office and the like.

Figure 34:
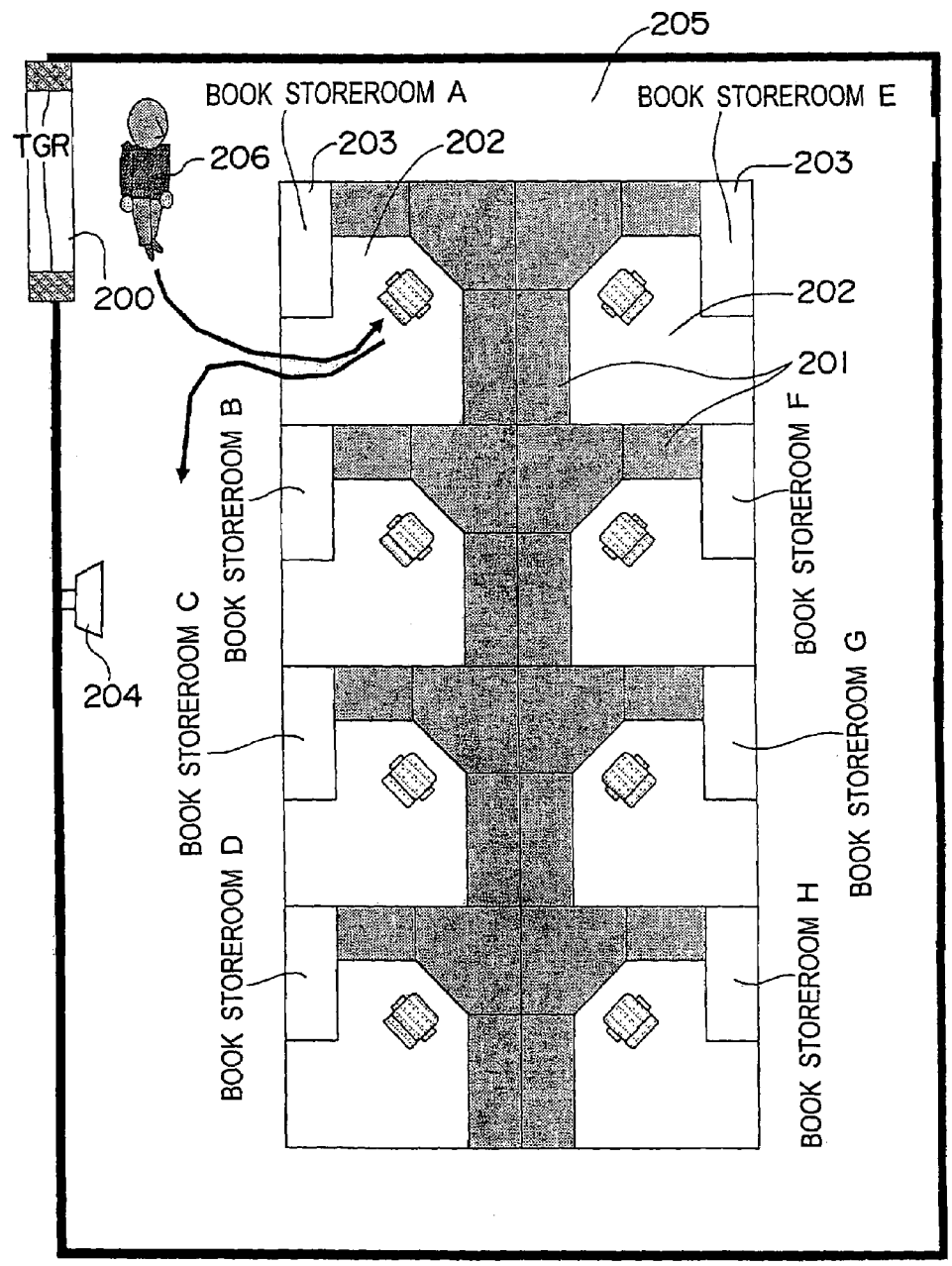
FIG. 34 is a floor plan showing an example of an office environment where the article detecting device in the article search system is arranged.

FIG. 34 is a floor plan showing the state in which the tag reader TGR serving as one example of the article detecting device 101 is arranged. In the present example, the gate shaped tag reader TGR is arranged at the entrance 200 of a certain room 205 of the office. In the room 205, work spaces 202 partitioned with partitions 201 worth of eight people are arranged, and the tag reader TGR is arranged at the opening and closing part of each book shelf 203 arranged in the work space 202. The user can detect that the article is in the room 205, when the article is brought into the room 205. If the person detecting device such as a camera 204 or a floor sensor or the like that can distinguish and detect the movement of the person are arranged in the room 205 in advance, the history data of the person 206 can be obtained (e.g., solid line with arrow shown in FIG. 34 is an example of the detection result of the person 206), and thus by using the article position searching method according to the first and second embodiments of the present invention explained so far, weighted estimation of the article present location of which location of the room 205 the article brought into the room 205 is most likely to be present becomes possible.

In office use, at which location the article is generally arranged can be specified to a certain extent by combining the detection result of the article and the history data of the person. That is, the owner of a certain article is defined, and the correct location of where the article is present can be assumed to be that the article is being carried by the owner or in the work space 202 of the owner. Therefore, if the tag reader TGR of the entrance 200 of the room 205 detects that the article has been carried out by another person, determination is made as an illegal carrying, and response of ringing a buzzer or the like for security is taken to prevent the article from being stolen.

A part of the article search system including the article present region estimating means 107 or the like other than the various detecting devices may be recorded on a recording medium such as CD-ROM as the article position estimating program for executing: the step S3001 of identifying the different article so as to be distinguished, and storing the information on the detected location and the information on the detected time detected in the article detecting device in the article management database; the step S3002 of distinguishing the positions of the persons for each person and storing the movement history information on the persons detected in the person detecting device in the person management database; and the step S3003 of associating the information stored in the article management database and the person management database with the person and the article based on the movement history information on the person management database and the detected location and the time of the article management database and estimating the article present region of the article, as shown in FIG. 35 in a form of a flow chart, and the program may be read from the CD-ROM and used, as necessary, in a computer. Specifically, for instance, in the system (not shown) realizing the article search system, which is connected with the display serving as one example of the display device, the keyboard serving as one example of the input device, the hard disc and memory for accumulating various databases and various means as examples, a CD-ROM drive, or the like, the article search system can be executed after the article position estimating program recorded on the CD-ROM is installed in the hard disc through the CD-ROM drive.

In the embodiment, the information on time is used when detecting the article or the person to simplify the explanation, but the time of day may be used instead of time. If time of day is used, the article position estimating operation according to the present invention can be performed over different days.

The present invention is not limited to the above embodiments, and may be performed in various forms. For example, subsequent to simultaneously detecting the person and the article with the person detecting device and the article detecting device, the article present region estimating means may estimate the movement region of the detected person as the article present region of the article, but the estimation of the article present region of the article may be stopped after the detected person exits the room.

By properly combining the arbitrary embodiments of the aforementioned various embodiments, the effects possessed by the embodiments can be produced.

The article position estimating apparatus, method of estimating article position, article search system, and article position estimating program according to the present invention relates to the article position estimating apparatus, method of estimating article position, article search system, and article position estimating program for managing the articles in a general household or in office, and in particular, the position of the article being looking for is appropriately shown when the user inquires the article being looking for when the positions of various articles such as daily necessaries used in living in the general household or portable articles used in office or the like are managed using the RFID tag technique or the like, and thus the trouble of looking for the article is simplified and the trouble is greatly reduced compared to the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An article position estimating apparatus comprising:
an article detecting device, arranged in a vicinity of an entrance of a room through which at least persons enter and exit, for identifying and detecting different articles so as to distinguish the different articles;
an article management database for storing identification information, information on detected locations, and information on detected times of the articles detected in the article detecting device, as article management information;
a person detecting device for distinguishing and detecting positions of the persons in the room for each individual;
a person management database for storing person movement history information of the persons detected in the person detecting device; and
an article present region estimating means for specifying the person detected within a predetermined time including the detected time of the article using the information on the detected times of the articles stored in the article management database and the movement history information of the persons stored in the person management database, and for estimating, when the person and the article are simultaneously detected by the person detecting device and the article detecting device based on the movement history information of the specified person of the person management database, a subsequent movement region of the detected person as an article present region of the article;
further comprising an article position candidate weighting means for performing weighting so that a weight of the article present region where the article is likely to be present is high based on possibility that the article is present with respect to a plurality of estimated article present regions with reference to the information stored in the article management database or the person management database;
wherein the article position candidate weighting means extracts information on a detected location and information on a detected time out of the movement history information in which the movement speed is less than or equal to a predetermined value set in advance in the movement history information of the person, respectively as stay state, and performs weighting so that the weight of the article present region where the article is likely to be present is high for a region in which an average value of the movement speed of the person is low using the average value of the movement speed of the person obtained with reference to each information configuring the stay state.

2. An article position estimating apparatus comprising:
an article detecting device, arranged in a vicinity of an entrance of a room through which at least persons enter and exit, for identifying and detecting different articles so as to distinguish the different articles;
an article management database for storing identification information, information on detected locations, and information on detected times of the articles detected in the article detecting device, as article management information;

a person detecting device for distinguishing and detecting positions of the persons in the room for each individual;

a person management database for storing person movement history information of the persons detected in the person detecting device; and an article present region estimating means for specifying the person detected within a predetermined time including the detected time of the article using the information on the detected times of the articles stored in the article management database and the movement history information of the persons stored in the person management database, and for estimating, when the person and the article are simultaneously detected by the person detecting device and the article detecting device based on the movement history information of the specified person of the person management database, a subsequent movement region of the detected person as an article present region of the article;

further comprising an article position candidate weighting means for performing weighting so that a weight of the article present region where the article is likely to be present is high based on possibility that the article is present with respect to a plurality of estimated article present regions with reference to the information stored in the article management database or the person management database;

wherein the article position candidate weighting means extracts information on a detected location and information on a detected time out of the movement history information in which the movement speed is less than or equal to a predetermined value set in advance in the movement history information of the person, respectively as stay state, and performs weighting so that the weight of the article present region where the article is likely to be present is high for a region in which an average value of the movement speed of the person is low using the average value of the movement speed of the person obtained with reference to each information configuring the stay state;

wherein the article position candidate weighting means extracts, as stay state, information on a detected location and information on a detected time out of the movement history information in which the movement speed is less than or equal to a predetermined value set in advance in the movement history information of the person, and performs weighting so that the article present region where the article is likely to be present is high using change in the movement speed of the person obtained with reference to the information on the detected locations and the information on the detected times before and after the stay time.

3. The article position estimating apparatus according to claim 1, wherein the article position candidate weighting means performs weighting so that a weight of the article present region where the article is likely to be present is high by also using a time in which the stay state continues when performing weighting of possibility the article is present.

4. An article position estimating apparatus comprising:
an article detecting device, arranged in a vicinity of an entrance of a room through which at least persons enter and exit, for identifying and detecting different articles so as to distinguish the different articles;

an article management database for storing identification information, information on detected locations, and information on detected times of the articles detected in the article detecting device, as article management information;

a person detecting device for distinguishing and detecting positions of the persons in the room for each individual;

a person management database for storing person movement history information of the persons detected in the person detecting device; and an article present region estimating means for specifying the person detected within a predetermined time including the detected time of the article using the information on the detected times of the articles stored in the article management database and the movement history information of the persons stored in the person management database, and for estimating, when the person and the article are simultaneously detected by the person detecting device and the article detecting device based on the movement history information of the specified person of the person management database, a subsequent movement region of the detected person as an article present region of the article;

wherein the article present region estimating means estimates the article present region of the article through change in movement speed of the person obtained with reference to the movement history information stored in the person management database;

wherein the article present region estimating means extracts, as stay state, information on a detected location and information on a detected time out of the movement history information in which a movement speed is less than or equal to a predetermined value set in advance in the movement history information of the person, and estimates the article present region in consideration of a hand-over of the article between a plurality of persons by relationship between stay states with respect to the plurality of persons.

5. The article position estimating apparatus according to claim 1, comprising:
an equipment operation detecting device for detecting equipment operations of equipments for accommodating and managing the article; and an equipment management database for storing the operation information of each equipment detected in the equipment operation detecting device; wherein a high weighting is performed on the equipment of an article position candidate so that the weight of the equipment used is high based on presence of the operation of the equipment in the operation information stored in the equipment management database.

6. The article position estimating apparatus according to claim 1, wherein the article present region estimating means estimates, subsequent to when the person and the article are simultaneously detected at the person detecting device and the article management device, a movement region of the detected person as the article present region of the article, and stops the estimation of the article present region of the article after the detected person exits the room.

7. An article search system comprising:
an input device for inputting an article to be searched;
the article position estimating apparatus for estimating the article present region of the article by the article present region estimating means and for searching for the article to be searched input by the input device from articles performed with estimating process, arranged in a vicinity of an entrance of a room through which at least persons enter and exit, for identifying and detecting different articles so as to distinguish the different articles;

an article management database for storing identification information, information on detected locations, and information on detected times of the articles detected in the article detecting device, as article management information;

a person detecting device for distinguishing and detecting positions of the persons in the room for each individual;

a person management database for storing person movement history information of the persons detected in the person detecting device; and an article present region estimating means for specifying the person detected within a predetermined time including the detected time of the article using the information on the detected times of the articles stored in the article management database and the movement history information of the persons stored in the person management database, and for estimating, when the person and the article are simultaneously detected by the person detecting device and the article detecting device based on the movement history information of the specified person of the person management database, a subsequent movement region of the detected person as an article present region of the article; and a display device for displaying the article present region where the article to be searched is present using estimation result in the article present region estimating means or, the article present region estimating means.

8. The article search system according to claim 7, comprising:

an imaging device for imaging an environment where article search is performed;

an image database for accumulating image information imaged in the imaging device; and an image searching means for estimating a location and a time at where the article to be searched is assumed to have been placed with the article present region estimating means or, the article present region estimating means and the article position candidate weighting means, and extracting the image information imaging the location and including the time from the image database using estimation result; wherein the display device displays the image information searched in the image searching means.

9. A method of estimating article position, comprising:

identifying and detecting different articles with an article detecting device so as to distinguish the different articles in a vicinity of an entrance of a room through which at least persons enter and exit;

storing identification information, information on detected location and information on detected times of the articles detected in the article detecting device in an article management database as article management information;

distinguishing and detecting positions of the persons in the room for each individual with a person detecting device;

storing movement history information of the persons detected in the person detecting device in a person management database; and specifying the person detected within a predetermined time including the detected time of the article using the information on the detected times of the articles stored in the article management database and the movement history information of the persons stored in the person management database, and when the person and the article are simultaneously detected by the person detecting device and the article detecting device based on the movement history information of the specified person of the person management database, estimating a subsequent movement region of the detected person as the article present region of the article; and performing weighting so that a weight of the article present region where the article is likely to be present is high based on possibility that the article is present with respect to a plurality of estimated article present regions with reference to the information stored in the article management database or the person management database;

extracting information on a detected location and information on a detected time out of the movement history information in which the movement speed is less than or equal to a predetermined value set in advance in the movement history information of the person, respectively as stay state, and performs weighting so that the weight of the article present region where the article is likely to be present is high for a region in which an average value of the movement speed of the person is low using the average value of the movement speed of the person obtained with reference to each information configuring the stay state.

10. The method of estimating article position according to claim 9, further comprising performing weighting so that the article present region where the article is most likely to be present is high based on possibility that the article is present with respect to a plurality of estimated article present regions estimated in estimating the article present region with reference to the information stored in the article management database or the person management database.

11. An article position estimating program stored in a computer readable medium executed by a computer, the program comprising of:

storing identification information, information on detected locations and information on detected times of different articles identified and detected in an article detecting device so as to distinguish the different articles in a vicinity of an entrance of a room through which at least persons enter and exit in an article management database as article management information;

storing movement history information of the persons detected in the person detecting device distinguishing positions of the persons in the room for each individual with a person detective device in a person management database;

specifying the person detected within a predetermined time including the detected time of the article using the information on the detected times of the articles stored in the article management database and the movement history information of the persons stored in the person management database, and when the person and the article are simultaneously detected by the person detecting device and the article detecting device based on the movement history information of the specified person of the person management database, estimating a subsequent movement region of the detected person as the article present region of the article;

performing weighting so that a weight of the article present region where the article is likely to be present is high based on possibility that the article is present with respect to a plurality of estimated article present regions with reference to the information stored in the article management database or the person management database; and extracting information on a detected location and information on a detected time out of the movement history information in which the movement speed is less than or equal to a predetermined value set in advance in the movement history information of the person, respectively as stay state, and performs weighting so that the weight of the article present region where the article is likely to be present is high for a region in which an average value of the movement speed of the person is low using the average value of the movement speed of the person obtained with reference to each information configuring the stay state.

* * * * *